United States Patent
Hughes et al.

(10) Patent No.: US 12,071,973 B2
(45) Date of Patent: Aug. 27, 2024

(54) UNIVERSAL QUICK-RELEASE VACUUM CONNECTOR

(71) Applicant: Mighty Ventures, Inc., Rahway, NJ (US)

(72) Inventors: Jonathan Hughes, Wyndmoor, PA (US); Israel Harry Zimmerman, Los Angeles, CA (US)

(73) Assignee: Harry Zimmerman, Los Angeles, CA (US)

( * ) Notice: Subject to any disclaimer, the term of this patent is extended or adjusted under 35 U.S.C. 154(b) by 402 days.

(21) Appl. No.: 17/648,100

(22) Filed: Jan. 14, 2022

(65) Prior Publication Data

US 2023/0228290 A1   Jul. 20, 2023

(51) Int. Cl.
  *F16B 47/00*   (2006.01)
  *F16M 11/04*   (2006.01)
  *H04M 1/04*   (2006.01)

(52) U.S. Cl.
  CPC ........... *F16B 47/00* (2013.01); *F16M 11/041* (2013.01); *H04M 1/04* (2013.01)

(58) Field of Classification Search
  CPC ............ F16B 47/003; A45C 2011/002; A45C 11/00; A45C 2011/003; A45C 11/22;
  (Continued)

(56) References Cited

U.S. PATENT DOCUMENTS

| | | |
|---|---|---|
| 1,518,943 A | 12/1924 | Story |
| 1,753,611 A | 4/1930 | Lower |
| 1,778,175 A | 10/1930 | Thune |
| 1,840,400 A | 1/1932 | Lebherz |

(Continued)

FOREIGN PATENT DOCUMENTS

| | | |
|---|---|---|
| CN | 1079886 A1 | 12/1993 |
| CN | 203987324 U | 12/2014 |

(Continued)

OTHER PUBLICATIONS

KIPO, PCT International Search Report, PCT International Application No. PCT/2022/070932 entitled "Object Holder, Handheld Electronic Device Case, And Universal Vacuum Connector With Quick-Release Anchoring Capability", Jul. 11, 2022, 3 pages.
KIPO, Written Opinion Of The International Searching Authority, PCT International Application No. PCT/2022/070932 entitled "Object Holder, Handheld Electronic Device Case, And Universal Vacuum Connector With Quick-Release Anchoring Capability", Jul. 11, 2022, 9 pages.

(Continued)

*Primary Examiner* — Tan H Trinh
(74) *Attorney, Agent, or Firm* — Walter W. Duft

(57) ABSTRACT

A universal quick-release vacuum connector includes a base removably attachable to an object. A vacuum formation-and-release actuator includes a movable anchor member that establishes a releasable vacuum connection with a reference surface. The anchor member includes a flexible outer seal member, a central hub integrally formed with the flexible outer seal member, and a vent port extending through the central hub. A vent port closure member closes or assists in closing a vent port inner end depending on the position of the anchor member relative to the base to establish a controlled pressure zone that maintains a negative pressure differential relative to an external ambient pressure. The releasable vacuum connection is releasable by virtue of the anchor member and the base being movable relative to each other in a manner that vents the controlled pressure zone while the base remains attached to the object.

20 Claims, 37 Drawing Sheets

(58) Field of Classification Search
CPC .............. A45C 13/001; A45C 15/00; A45C
2011/001; A45C 2200/15; B60R 11/02;
B60R 2011/0056; B60R 2011/0068;
B60R 2011/008; B60R 2011/0003; B60R
2011/0073; B60R 11/0241; B60R
2011/0005; B60R 2011/0026; A45F
2200/0516; A45F 5/00; A45F 2005/006;
G06F 1/1632; G06F 1/1628; G06F
1/1607; G06F 1/1626; H04M 1/04; H04M
1/185; A47G 1/17; A47G 25/0635; B65D
25/22; B65D 77/225; B65D 81/2023;
B65D 81/2038; B65D 85/07; H04B
1/3888; H04B 1/3877; Y10T 137/7879;
Y10T 428/24008; Y10T 428/24174; Y10T
428/24182
USPC ...................................................... 455/576.8
See application file for complete search history.

(56) References Cited

U.S. PATENT DOCUMENTS

| | | |
|---|---|---|
| 2,083,299 A | 6/1937 | Hunter |
| 2,233,870 A | 3/1941 | Muter |
| 2,542,400 A | 2/1951 | Donofrio |
| 2,565,793 A | 8/1951 | Weismantel |
| 2,601,279 A | 6/1952 | Hacus |
| 2,740,545 A | 9/1956 | Bates |
| 2,782,948 A | 2/1957 | Steinberg |
| 2,839,260 A | 6/1958 | Jacobi, Jr. |
| 2,895,636 A | 7/1959 | Martin |
| 2,908,473 A | 10/1959 | Snyder |
| 2,910,264 A | 10/1959 | Lindenberger |
| 2,932,119 A | 4/1960 | Borah |
| 2,936,139 A | 5/1960 | Lindstrom |
| 2,963,256 A | 12/1960 | Borah |
| 2,968,888 A | 1/1961 | Borah |
| 3,094,235 A | 6/1963 | Lunning |
| 3,159,370 A | 12/1964 | Rubinstein |
| 3,383,001 A | 5/1968 | Wei |
| 3,675,886 A | 7/1972 | Kampmier |
| 3,847,324 A | 11/1974 | Uchanski et al. |
| 4,040,549 A | 8/1977 | Sadler |
| 4,127,211 A | 11/1978 | Zerbey |
| 4,133,575 A | 1/1979 | Mader |
| 4,137,356 A | 1/1979 | Shoemaker et al. |
| 4,726,553 A | 2/1988 | Wischusen, III |
| 4,756,497 A | 7/1988 | Lan |
| 4,759,525 A | 7/1988 | Cross et al. |
| 4,760,987 A | 8/1988 | Lan |
| 4,836,488 A | 6/1989 | Ross |
| 4,872,721 A | 10/1989 | Sniadach |
| 4,890,760 A | 1/1990 | Nicoll, Sr. et al. |
| 4,928,848 A | 5/1990 | Ballway |
| 4,940,138 A | 7/1990 | Hornstein |
| 4,941,635 A | 7/1990 | Lan |
| 4,955,493 A | 9/1990 | Touzani |
| 4,978,566 A | 12/1990 | Scheurer et al. |
| 5,040,719 A | 8/1991 | Ballway |
| 5,065,973 A | 11/1991 | Wang |
| 5,071,096 A | 12/1991 | Hartman et al. |
| 5,076,527 A | 12/1991 | Yung-Huei |
| 5,133,524 A | 7/1992 | Liu |
| 5,180,132 A | 1/1993 | Pearson et al. |
| 5,186,350 A | 2/1993 | McBride |
| 5,192,043 A | 3/1993 | Fa |
| 5,207,076 A | 5/1993 | Sciarrillo |
| 5,273,182 A | 12/1993 | Laybourne |
| 5,282,541 A | 2/1994 | Chen |
| 5,292,140 A | 3/1994 | Laing |
| 5,381,990 A | 1/1995 | Belokin et al. |
| D357,170 S | 4/1995 | Wellsfry |
| 5,413,302 A | 5/1995 | Ferster |
| 5,511,752 A | 4/1996 | Trethewey |
| 5,531,353 A | 7/1996 | Ward et al. |
| 5,667,180 A | 9/1997 | Duckworth |
| 5,742,971 A | 4/1998 | Salinger |
| D397,915 S | 9/1998 | McNaughton |
| D400,763 S | 11/1998 | Taylor et al. |
| 5,992,806 A | 11/1999 | Adams |
| 6,000,575 A | 12/1999 | LaCour et al. |
| 6,039,206 A | 3/2000 | DeFrancesco |
| 6,059,138 A | 5/2000 | Labruyere |
| D439,116 S | 3/2001 | White |
| 6,264,054 B1 | 7/2001 | Miyake et al. |
| 6,315,153 B1 | 11/2001 | Osborn |
| 6,318,683 B1 | 11/2001 | Savoy |
| 6,367,652 B1 | 4/2002 | Toida et al. |
| 6,439,418 B1 | 8/2002 | Immerman et al. |
| 6,491,265 B2 | 12/2002 | Tracy |
| 6,497,394 B1 | 12/2002 | Dunchock |
| 6,511,031 B2 | 1/2003 | Lin |
| 6,520,368 B1 | 2/2003 | Chiu |
| 6,543,637 B1 | 4/2003 | Osborn |
| 6,571,976 B1 | 6/2003 | Sonnabend |
| 6,596,374 B1 | 7/2003 | Adjeleian |
| 6,666,420 B1 | 12/2003 | Carnevali |
| 6,745,987 B2 | 6/2004 | Rousselet et al. |
| 6,776,368 B1 | 8/2004 | Duncan et al. |
| 6,895,642 B2 | 5/2005 | Huang |
| 7,090,183 B2 | 8/2006 | Heybl et al. |
| 7,201,285 B2 | 4/2007 | Beggins |
| 7,306,113 B2 | 12/2007 | El-Saden et al. |
| 7,458,541 B1 | 12/2008 | Chang |
| 7,481,329 B2 | 1/2009 | Camp, Jr. |
| 7,726,715 B2 | 6/2010 | Nagasawa et al. |
| 7,950,422 B2 * | 5/2011 | Perlman .................. F04F 5/20 294/64.2 |
| 8,025,169 B2 | 9/2011 | Zimmerman |
| 8,028,850 B2 | 10/2011 | Zimmerman |
| 8,272,523 B1 | 9/2012 | DeMusis, Sr. |
| 8,757,418 B2 | 6/2014 | Zimmerman |
| 9,521,919 B1 | 12/2016 | Reyes |
| 9,651,229 B1 | 5/2017 | Huang |
| 9,801,483 B2 | 10/2017 | D'Alesio |
| 9,814,332 B2 | 11/2017 | Zimmerman |
| 10,520,009 B2 | 12/2019 | Smith et al. |
| 11,255,482 B1 | 2/2022 | Zimmerman |
| 2002/0130133 A1 | 9/2002 | Immerman et al. |
| 2003/0075666 A1 | 4/2003 | Dunchock |
| 2003/0102320 A1 | 6/2003 | Park |
| 2004/0238541 A1 | 12/2004 | Camp, Jr. |
| 2004/0238542 A1 | 12/2004 | Camp, Jr. et al. |
| 2006/0175506 A1 | 8/2006 | Lan |
| 2007/0012706 A1 | 1/2007 | Deadman |
| 2007/0205205 A1 | 9/2007 | Kliewer |
| 2008/0093370 A1 | 4/2008 | Darsey |
| 2008/0190948 A1 | 8/2008 | Sayasithsena |
| 2009/0250467 A1 | 10/2009 | Schmidt |
| 2009/0256043 A1 | 10/2009 | Lan |
| 2010/0155550 A1 * | 6/2010 | Weiss-Vons ............ F16B 47/00 248/363 |
| 2012/0287560 A1 | 11/2012 | Fan |
| 2014/0171157 A1 | 6/2014 | Ho |
| 2014/0326630 A1 | 11/2014 | Henry |
| 2015/0230638 A1 | 8/2015 | Jagger |
| 2018/0149302 A1 | 5/2018 | Papapanos |
| 2019/0022874 A1 | 1/2019 | Mutch et al. |
| 2019/0024699 A1 * | 1/2019 | Mutch .................. A47G 19/10 |
| 2019/0203759 A1 | 7/2019 | Zimmerman |
| 2020/0400267 A1 | 12/2020 | Garza |
| 2022/0282753 A1 * | 9/2022 | Hughes ................ F16M 11/041 |
| 2022/0329679 A1 * | 10/2022 | Hughes .................. F16B 47/00 |
| 2023/0091926 A1 * | 3/2023 | Zimmerman ...... A47G 23/0225 220/23.89 |
| 2023/0228373 A1 * | 7/2023 | Hughes ................ A45C 11/00 206/320 |

FOREIGN PATENT DOCUMENTS

| | | |
|---|---|---|
| CN | 204015832 U | 12/2014 |
| CN | 204105618 U | 1/2015 |

(56) References Cited

FOREIGN PATENT DOCUMENTS

| CN | 104545306 A | 4/2015 |
|---|---|---|
| CN | 204291083 U | 4/2015 |
| CN | 204500194 U | 4/2015 |
| CN | 105996687 A | 10/2016 |
| DE | 3742636 | 1/1989 |
| EP | 1649788 | 4/2006 |
| JP | H05187430 A | 7/1993 |
| JP | 2000104724 A | 4/2000 |
| JP | 2003501315 | 1/2003 |
| JP | 2004160079 | 10/2004 |
| JP | 2006314739 | 11/2006 |
| JP | 2014173709 A | 9/2014 |
| WO | WO2012008942 | 1/2012 |
| WO | WO2019097212 A1 | 5/2019 |

OTHER PUBLICATIONS

J. Lamont, "Apple's updated Accessory Design Guidelines include rules for MagSafe", <https://mobilesyrup.com/2020/11/03/apple-accessory-design-guidelines-magsafe-rules/>, Nov. 3, 2020, 6 pages.
Zimmerman, "List of patents or Patent Applications Treated as Related", Apr. 4, 2022, 2 pages.

* cited by examiner

FIG. 1
FIG. 2
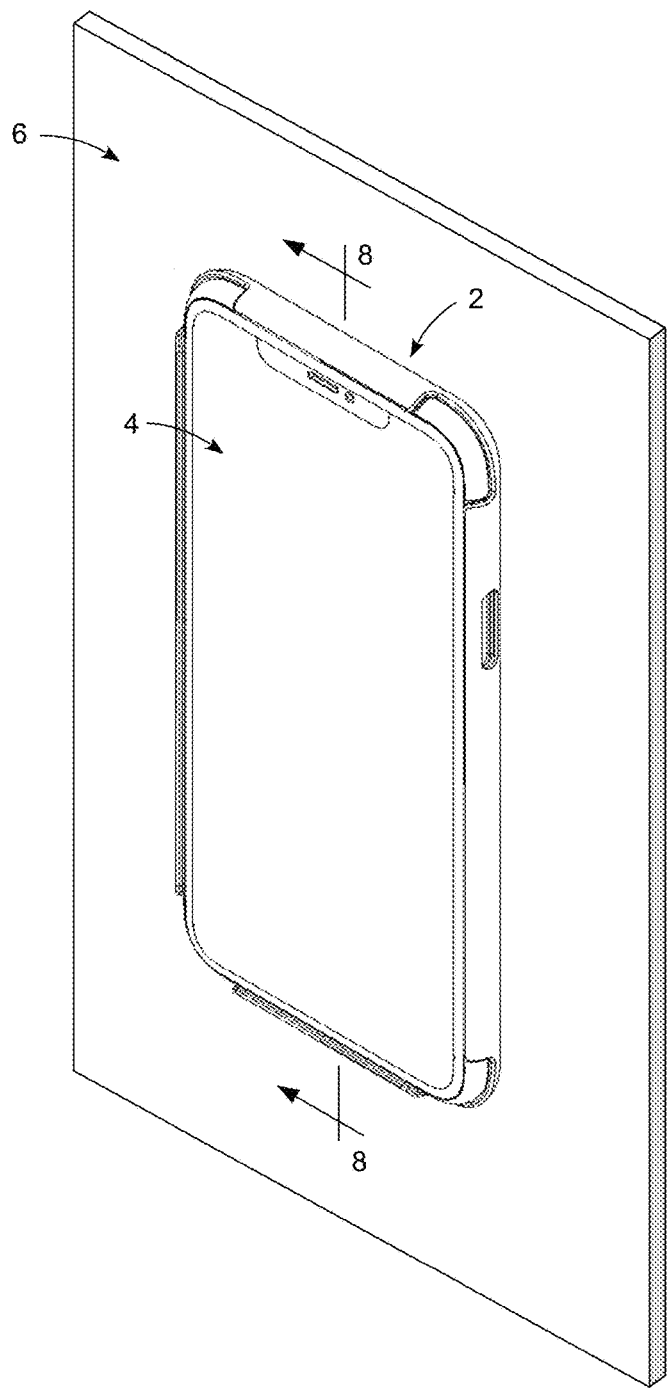
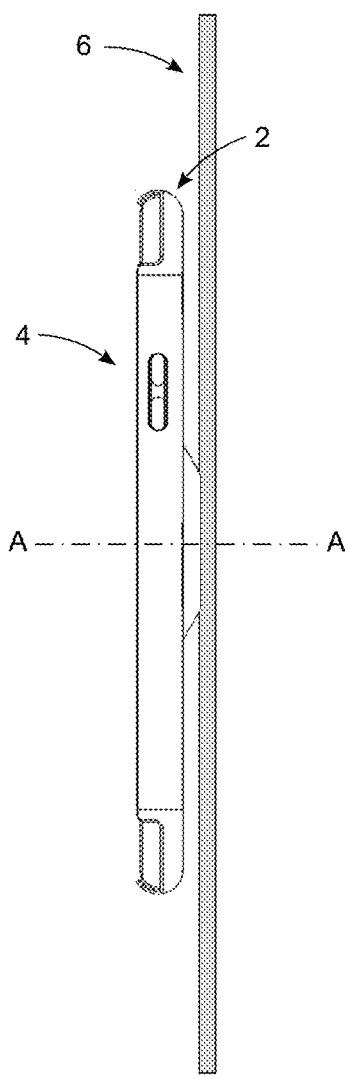

FIG. 5A
FIG. 6A
FIG. 7A
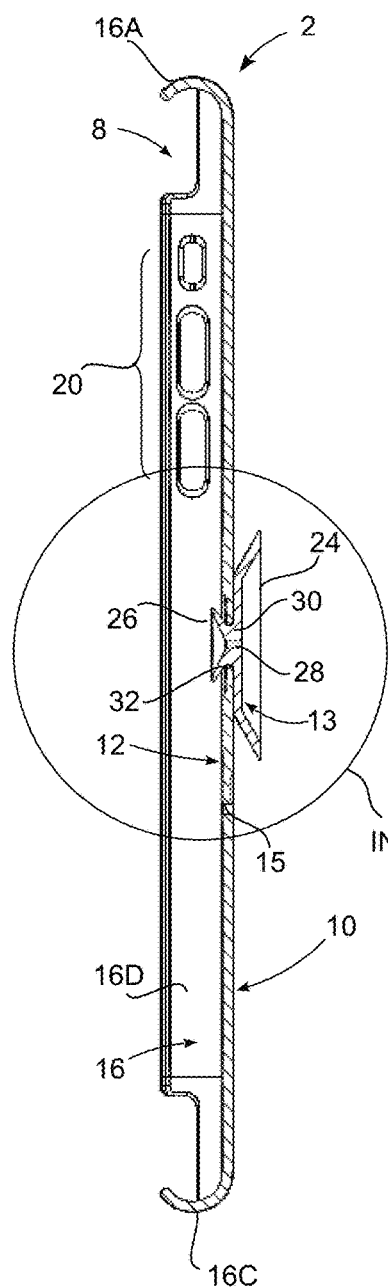
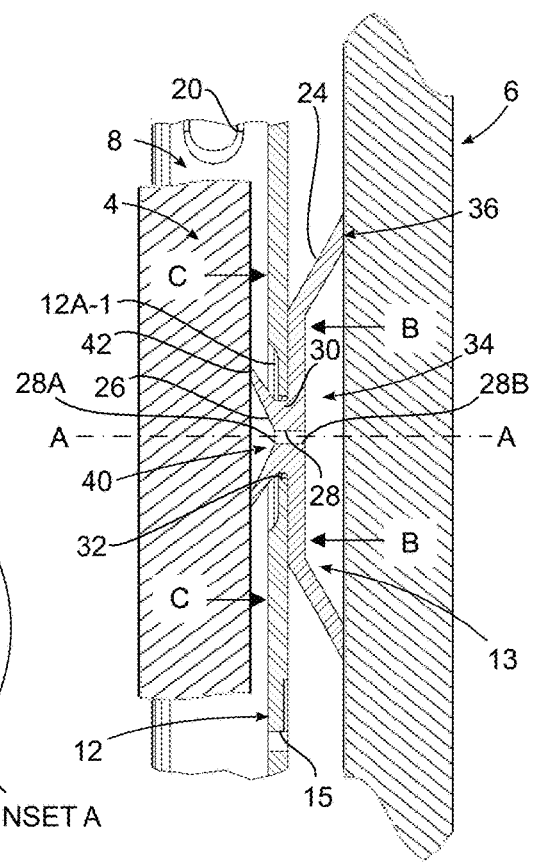
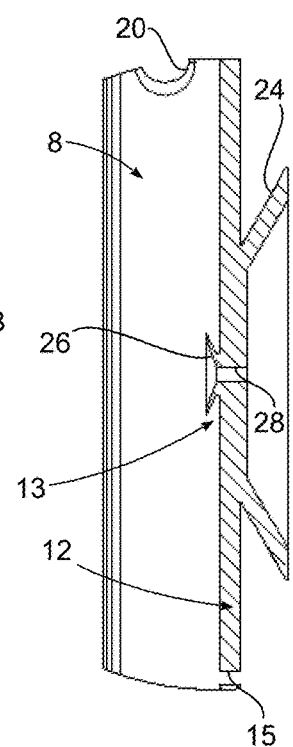

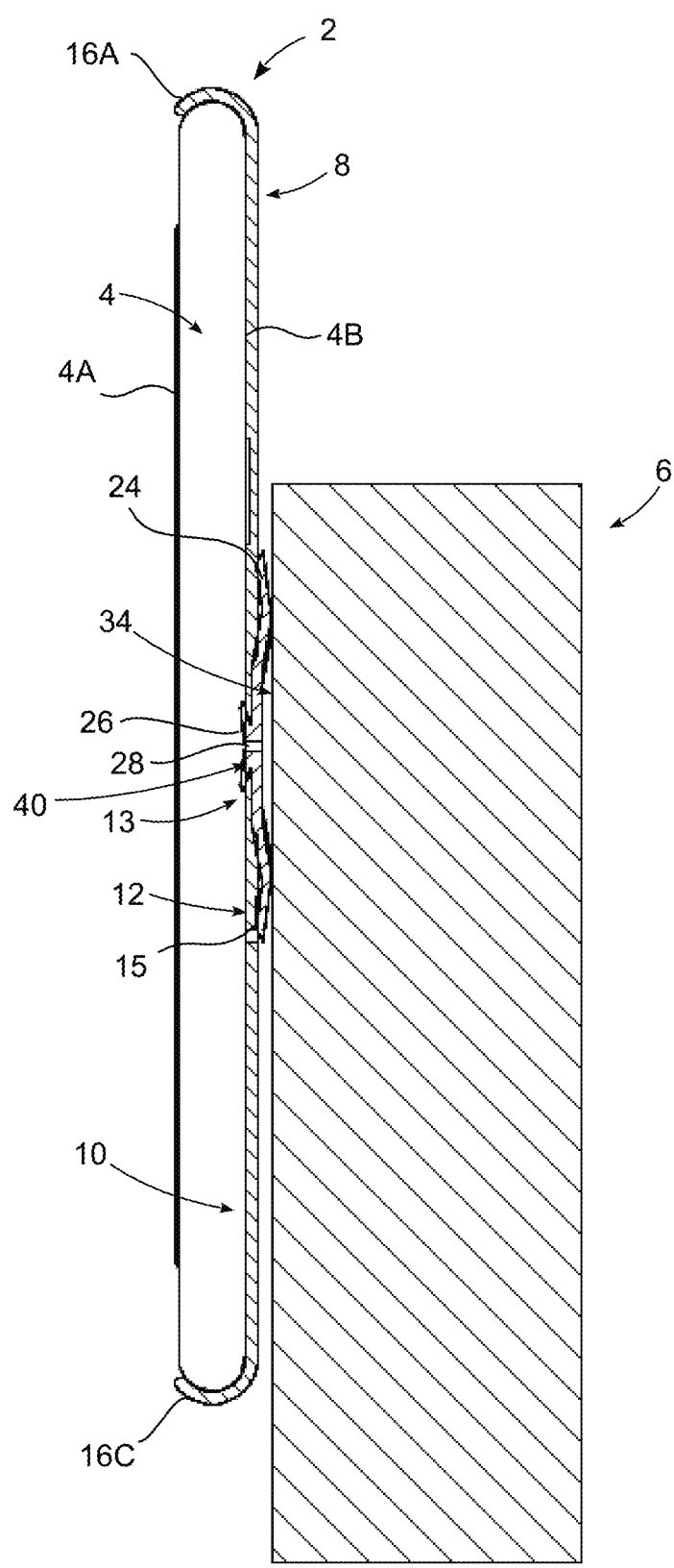

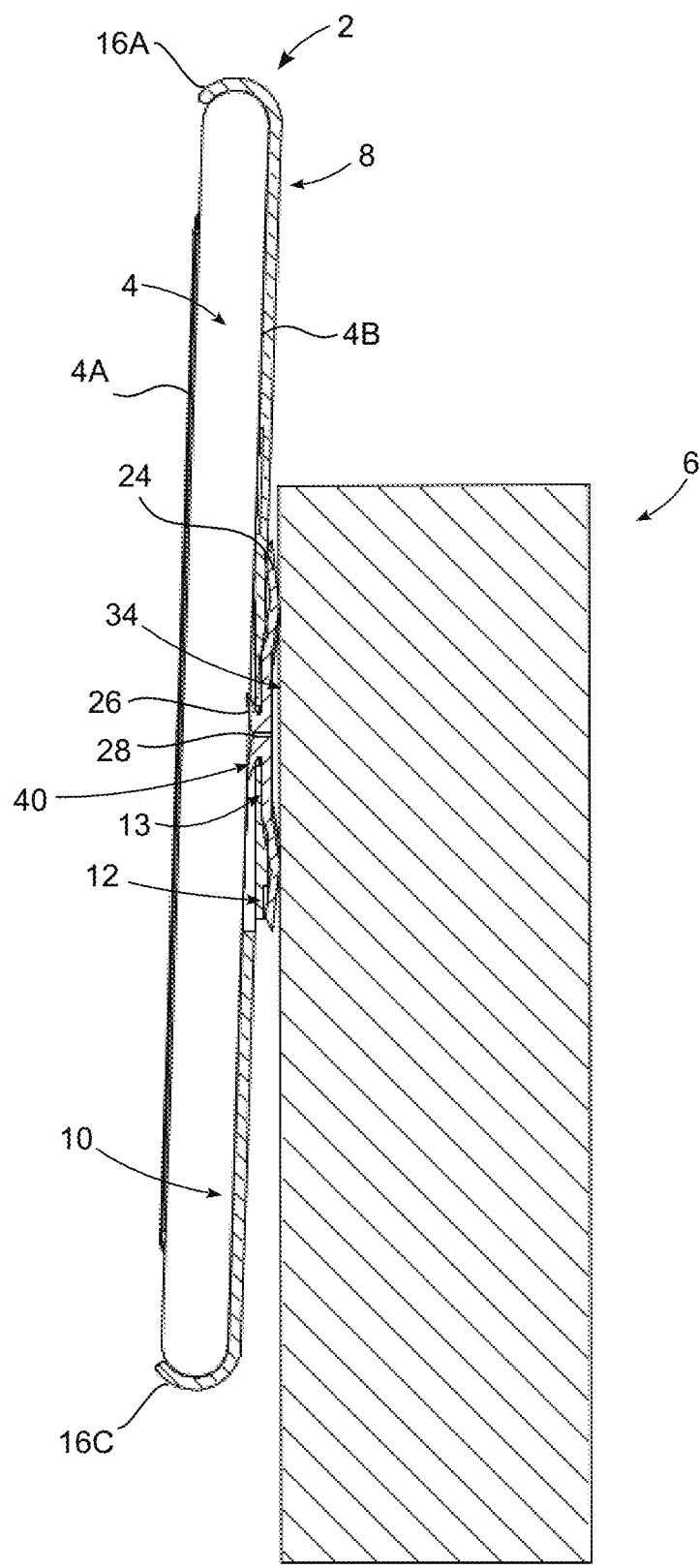

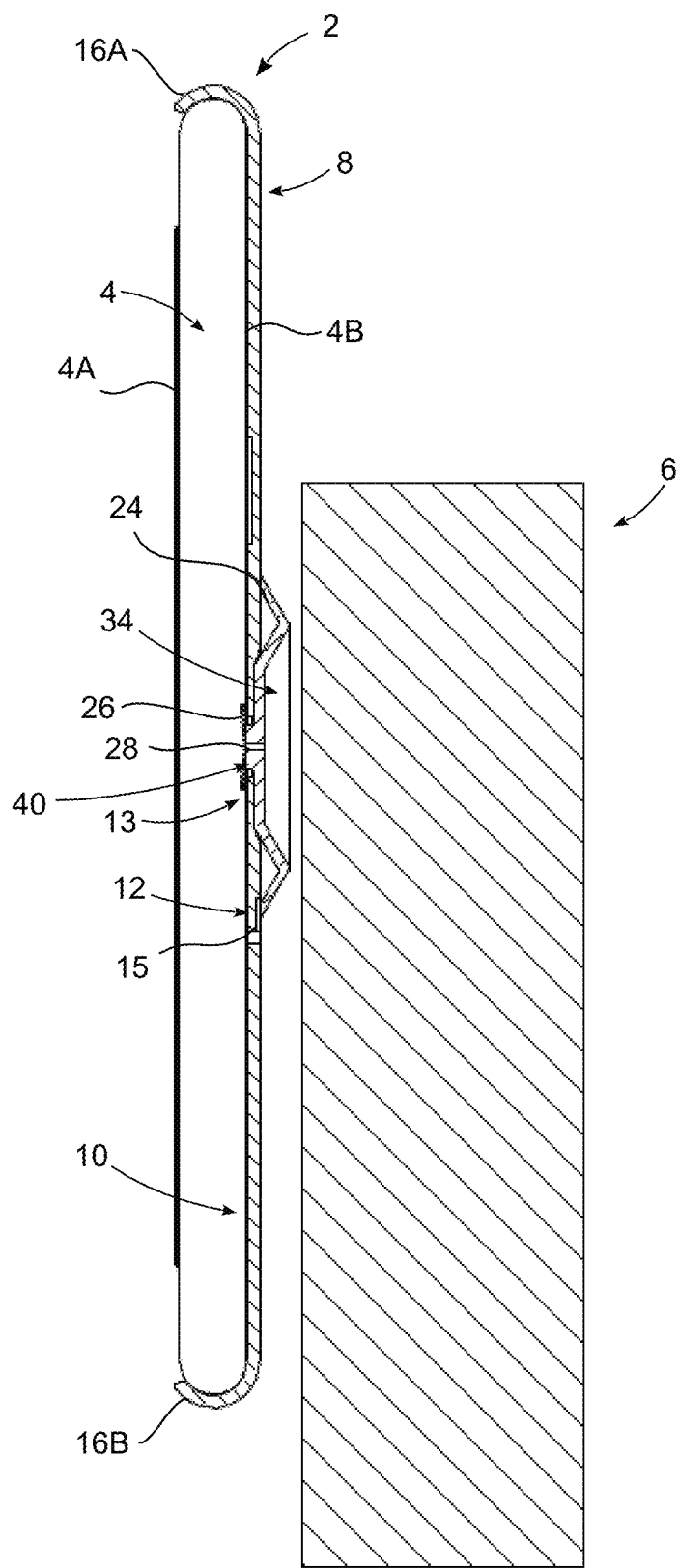

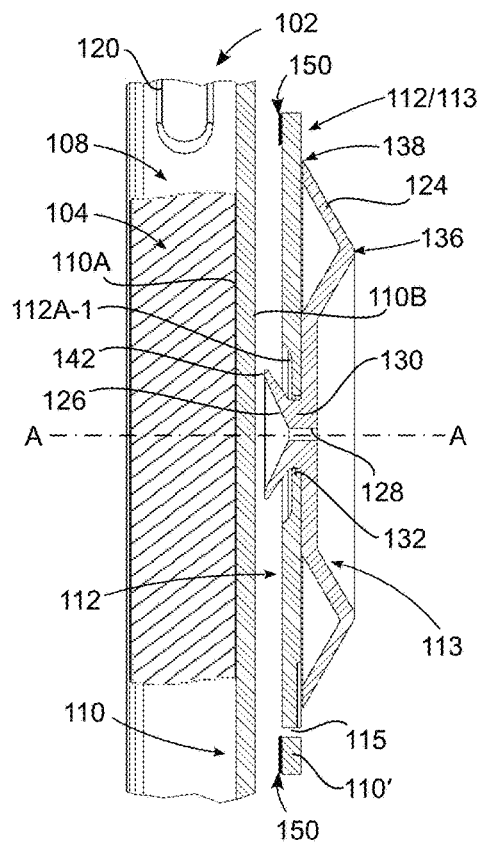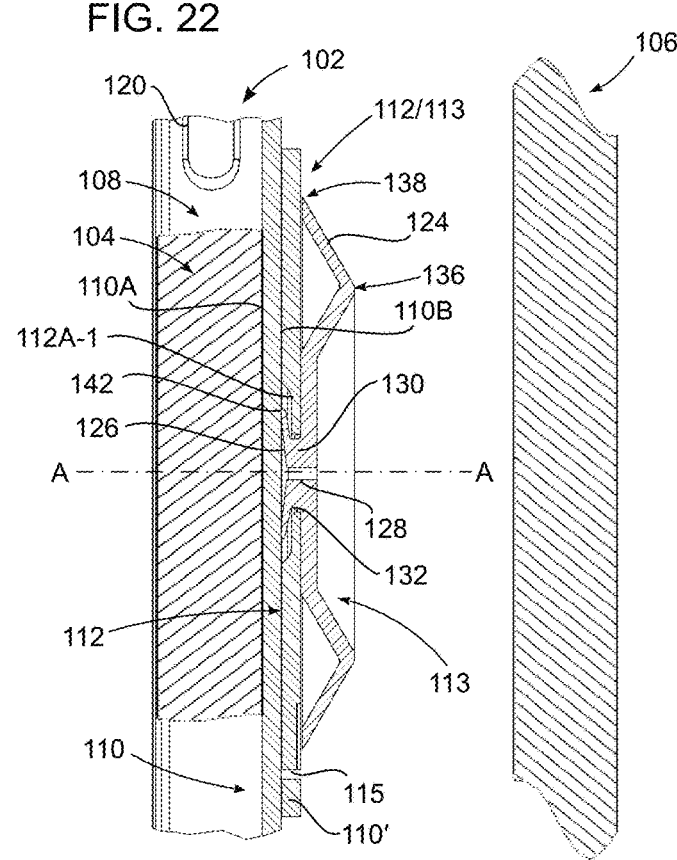

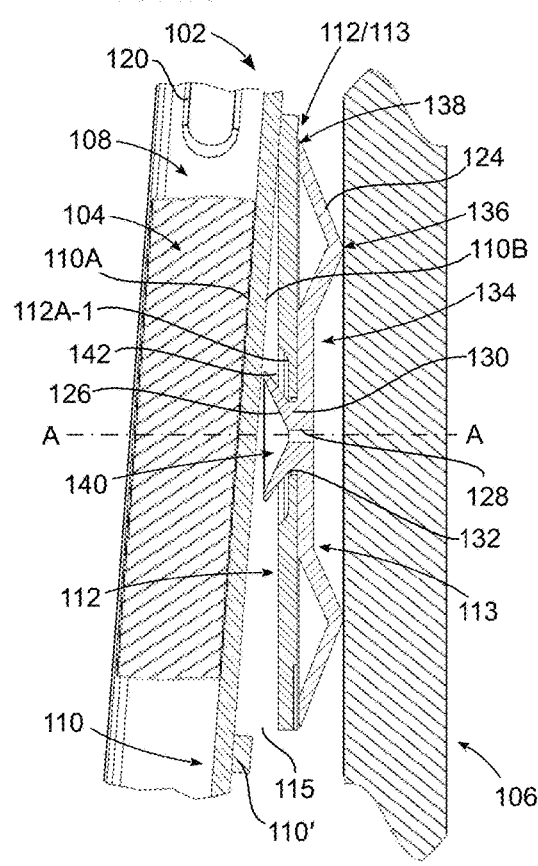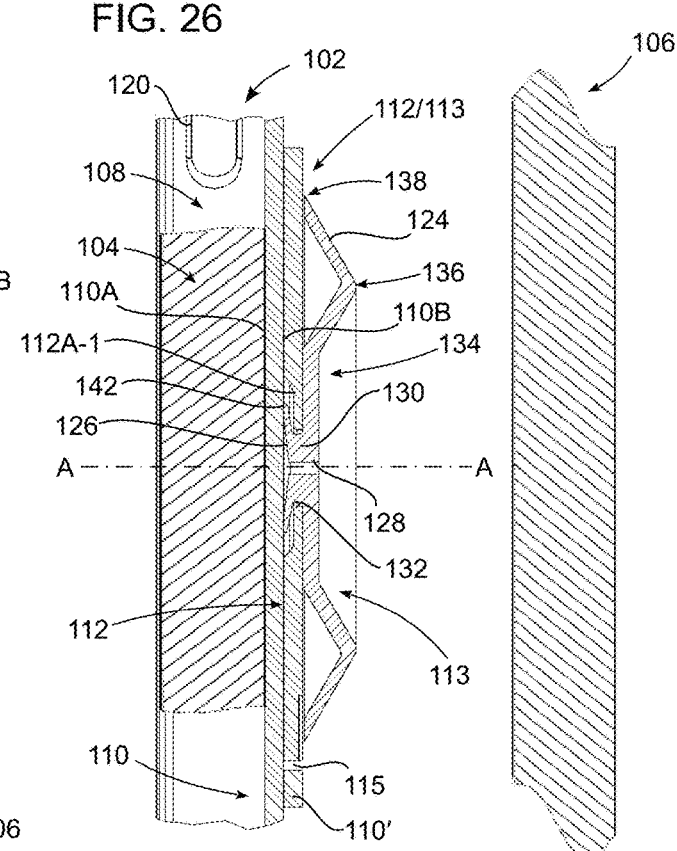

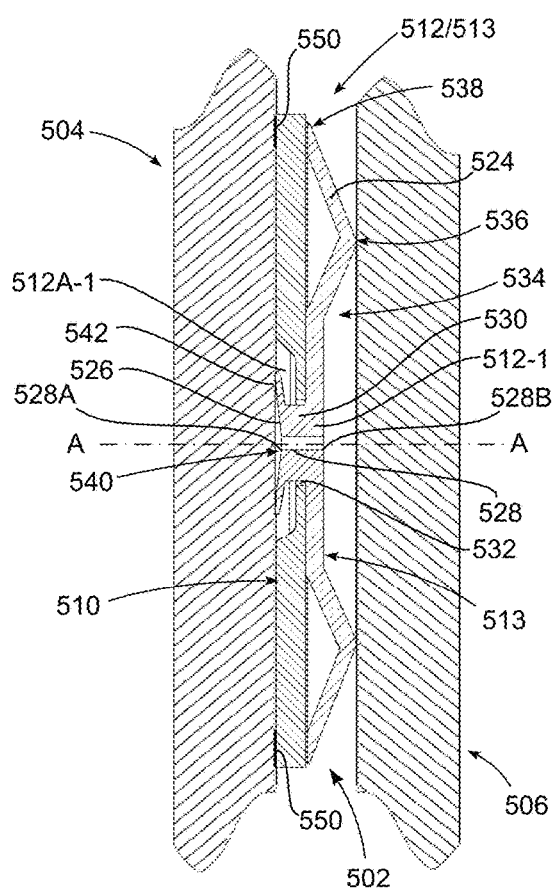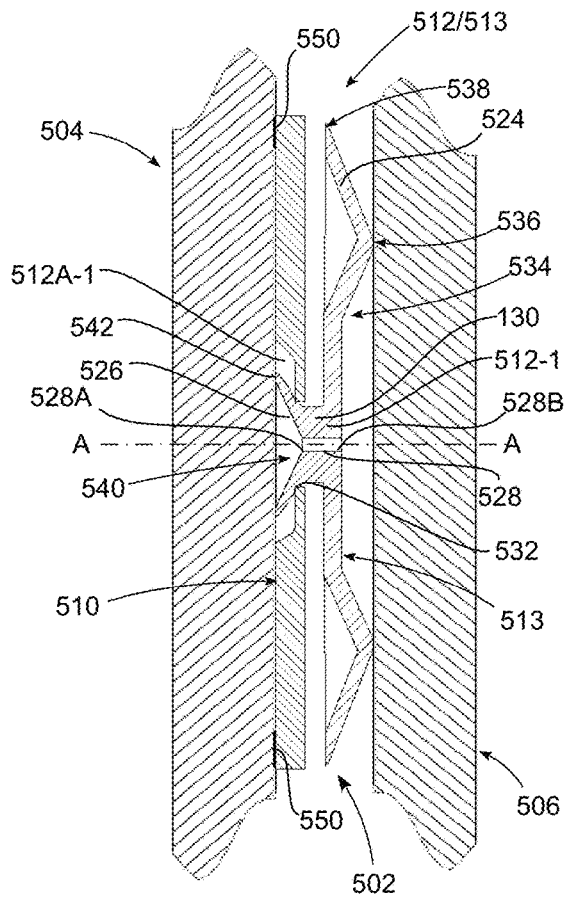

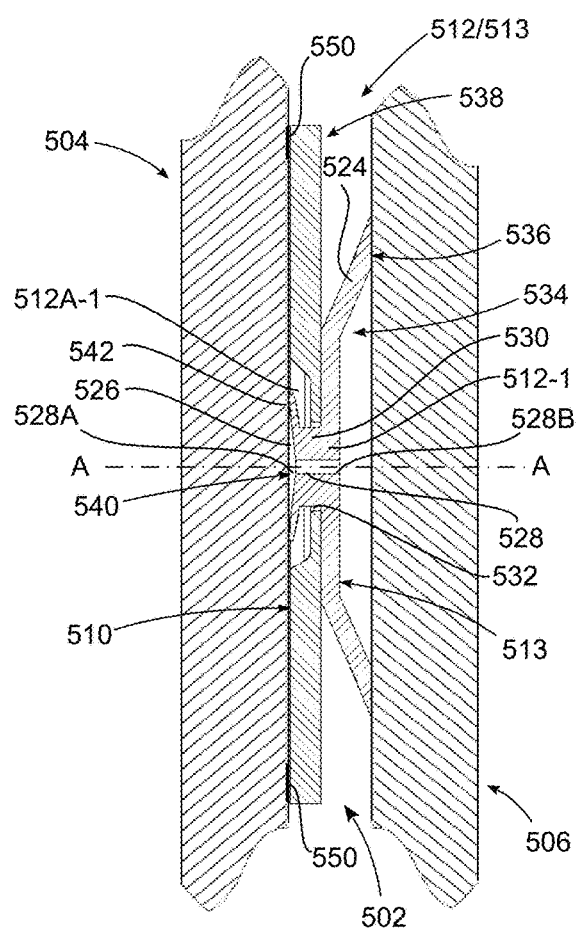 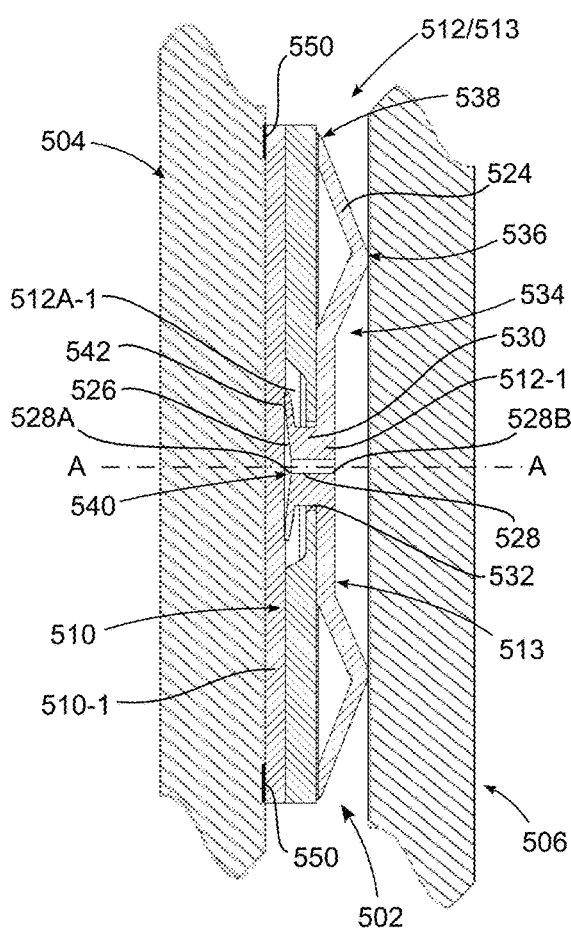

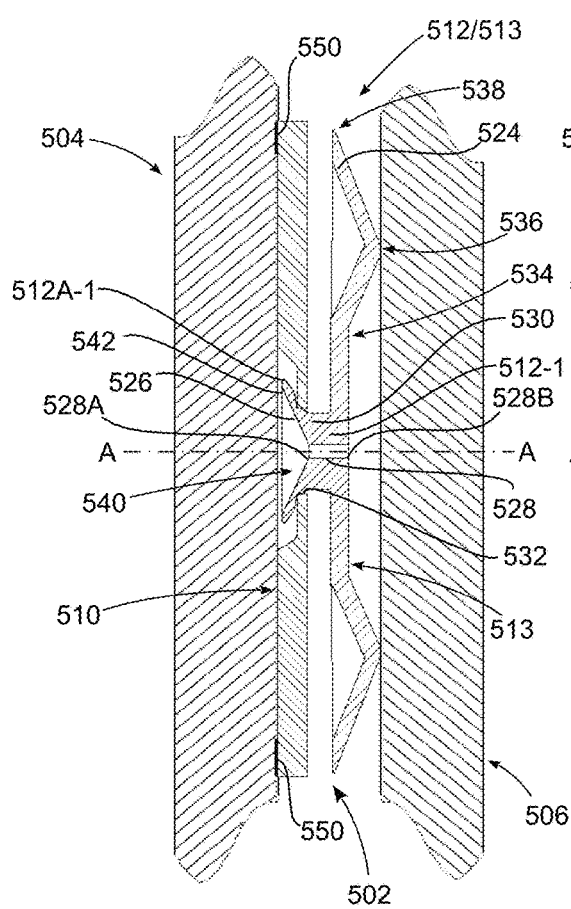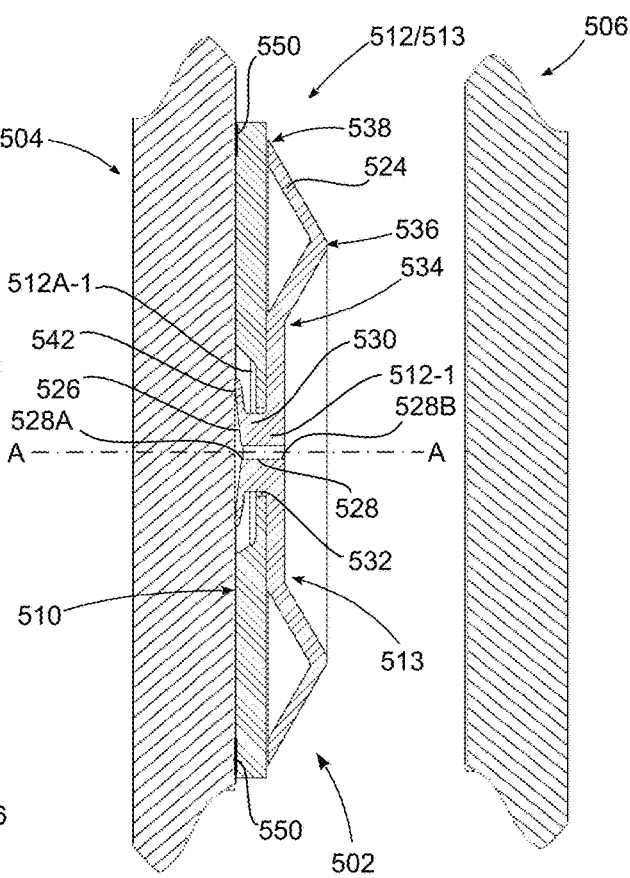

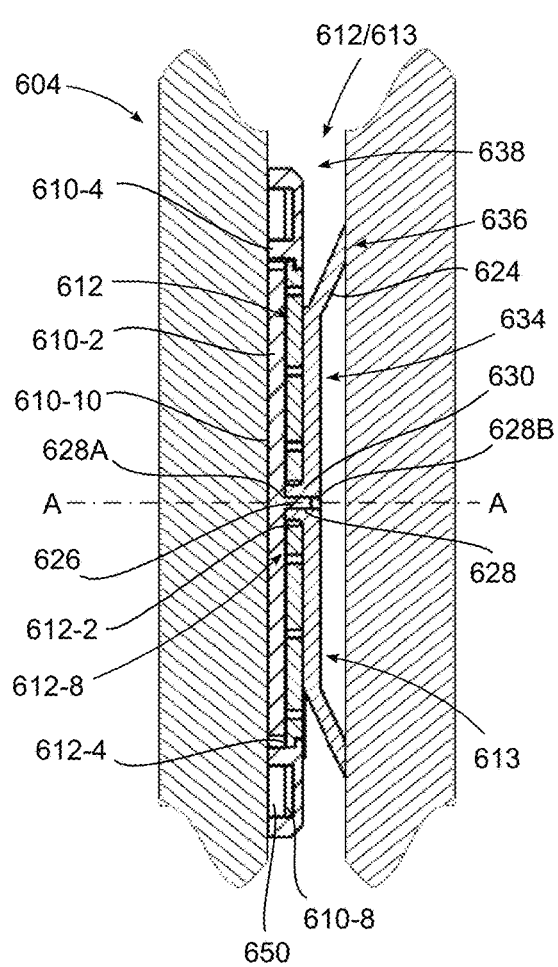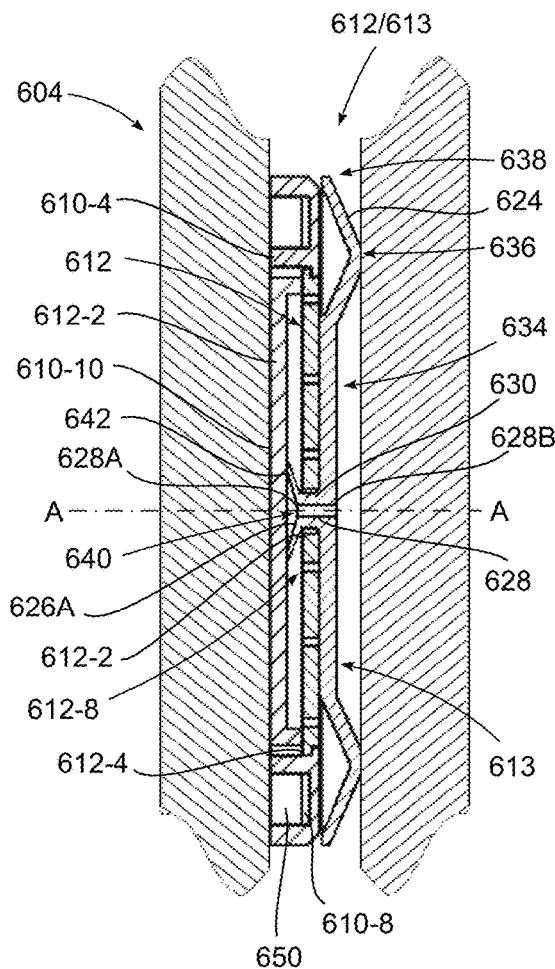

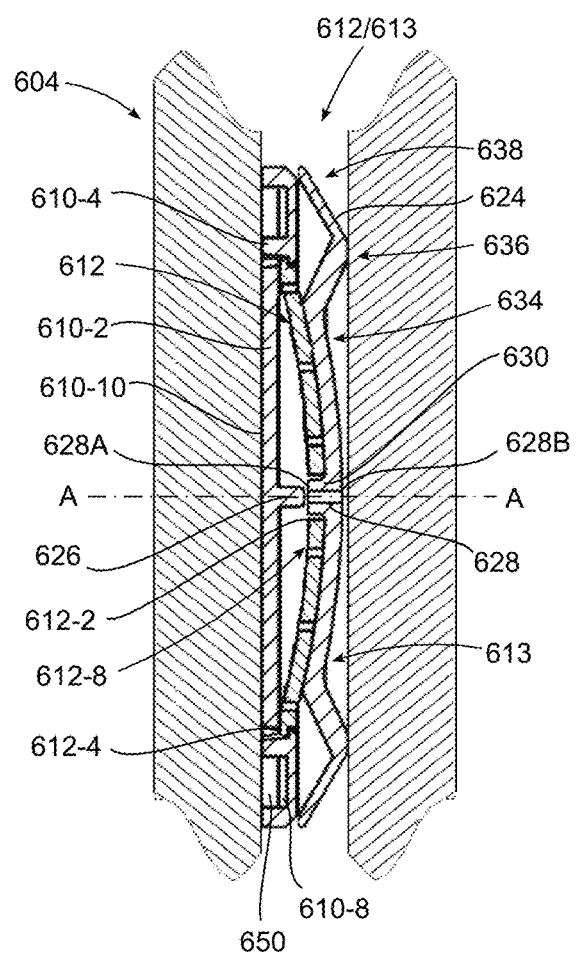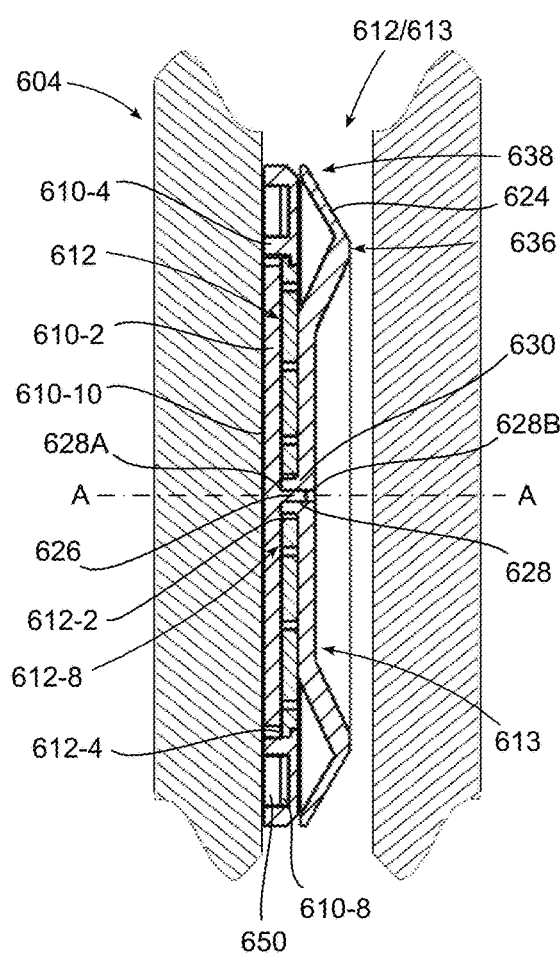

UNIVERSAL QUICK-RELEASE VACUUM CONNECTOR

BACKGROUND

1. Field

The present disclosure relates to anchoring apparatus for releasably securing objects to surfaces. More particularly, the disclosure concerns anchoring apparatus with anchor members that adhere to surfaces by way of differential pressure when flexed. Still more particularly, the disclosure pertains to a universal connector with quick-release differential pressure anchoring capability.

2. Description of the Prior Art

By way of background, anchoring apparatus that operate by way of differential pressure are known. Such apparatus often utilize anchor members such as suction cups and suction seal stabilizers. A suction cup typically includes a flexible seal member configured as an elastomeric cup-shaped structure having a concave side and a relatively soft peripheral rim. In order to adhere the suction cup to a reference surface, the seal member must be affirmatively flexed by pressing it against the reference surface with enough force to temporarily flatten the concave lower side so that air is expelled outside the peripheral rim. When the pressing force is released, the seal member has a natural tendency to return to its initial configuration. As this rebounding occurs, the volumetric cavity that lies inside the peripheral rim between the seal member's lower side and the reference surface begins to enlarge. This in turn causes the air pressure in the volumetric cavity to proportionately decrease in accordance with Boyle's Law. A negative pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the seal member to its initial configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the seal member's peripheral rim and the reference surface.

Some suction cups are designed so that they can only be removed from the reference surface by applying sufficient brute force to break the seal formed by the seal member's peripheral rim, or by peeling up the rim to create a small opening that vents the volumetric cavity. Other suction cups are designed with a vent port and are used with a mechanical stopper made of rigid (or semi-rigid) material. The stopper is manually actuated into engagement with the vent port when it is desired to maintain suction, and is manually actuated out of engagement with the vent port when it is desired to break the suction. The stopper is typically hand-operable and cannot be actuated except by way of a specific movement pattern that involves the stopper being moved a noticeable distance.

A suction seal stabilizer includes a seal member that operates somewhat similarly to a suction cup's seal member, but is typically less concave, or even flat, and usually made from a softer more resilient material. Alternatively, the seal member of a suction seal stabilizer may be constructed of the same material as a suction cup seal member, but is thinner and more flexible than its suction cup counterpart. When a properly designed suction seal stabilizer is placed on a reference surface, little or no pushing force needs to be applied to flatten the seal member. Such devices are thus generally self-sealing (self-anchoring). Because the seal member is usually highly flexible and may have little or no concavity, its elastic rebound forces may be relatively weak. If the seal member remains substantially flat against the reference surface with little or no rebound occurring, the suction forces will be negligible or non-existent until the anchoring apparatus is acted upon by a load. If the reference surface is substantially horizontal, the load that generates suction forces may be a lifting or tilting load applied to the anchoring apparatus or an item being carried thereby.

In a typical suction seal stabilizer, a vent port is provided for releasing the stabilizer from the reference surface. In such designs, an anchoring apparatus that incorporates the suction seal stabilizer may include a movable component that acts as a mechanical stopper to open and close the vent port. The movable component may be configured to carry an item or material that is to be anchored by the anchoring apparatus. Displacing the component away from the vent port causes the vent port to open, allowing the anchoring apparatus to be moved away from the reference surface without appreciable resistance. This provides a form of stealth mode operation in which the user is not aware of the action of the suction seal stabilizer. When the anchoring apparatus is placed back onto the reference surface, the movable auxiliary component will reengage the vent port, thereby "arming" the suction seal stabilizer into a stabilizing mode.

It is to improvements in the design of anchoring apparatus having anchor members embodied as suction cups or suction seal stabilizers that the present disclosure is directed. More particularly, the present disclosure provides an anchoring apparatus embodied as a universal quick-release vacuum connector for quick-release vacuum mounting of an object to a reference surface.

SUMMARY

A universal quick-release vacuum connector includes a base removably attachable to an object that is to be vacuum-mounted to a reference surface. A vacuum formation-and-release actuator is operable to establish a releasable vacuum connection between the object and the reference surface. The vacuum formation-and-release actuator includes an anchor member arranged for movement relative to the base. The base includes an attachment system operable to removably attach the universal vacuum connector to the object, the attachment system being selected from the group consisting of (1) adhesives, (2) magnets or magnetically attractive materials, (3) hook-and-loop system components, (4) mechanical fasteners, and (5) elements of a protective case for the object that engage plural independent side edges of the object such that the protective case engages at least one major face of the object. The anchor member includes a flexible outer seal member, a central hub integrally formed with the flexible outer seal member, and a vent port extending through the central hub from inner end to an outer end thereof. A vent port closure member is arranged to close or assist in closing the vent port inner end depending on the position of the anchor member relative to the base. The releasable vacuum connection is provided by a controlled pressure zone formed by a combination that includes the vent port closure member, the vent port, the outer seal member, and the reference surface. The controlled pressure zone maintains a negative pressure differential relative to an external ambient pressure when the vent port inner end is closed. The releasable vacuum connection is releasable by virtue of the anchor member and the base being movable relative to each other in a manner that vents the controlled pressure zone while the base remains attached to the object.

In another aspect, a combination of a universal quick-release vacuum connector and an object to be vacuum mounted to a reference surface is provided. The combination includes an object attached to a universal quick-release vacuum connector as summarized above.

In a further aspect, a method for vacuum-mounting an object to a reference surface is provided. The method includes attaching an object to a universal quick-release vacuum connector as summarized above, and using the quick-release vacuum connector to vacuum-mount the handheld device to the reference surface.

BRIEF DESCRIPTION OF THE DRAWINGS

The foregoing and other features and advantages will be apparent from the following more particular description of example embodiments, as illustrated in the accompanying Drawings.

FIG. 1 is a front perspective view showing an assembly formed by an example embodiment of an object holder with quick-release anchoring capability that carries an object and vacuum-mounts it a reference surface.

FIG. 2 is a side view of the assembly of FIG. 1.

FIG. 5A is a vertical cross-sectional centerline view of a modified version of the object holder of FIG. 1.

FIG. 6A is an enlarged vertical cross-sectional centerline view depicting the structure shown in Inset A of FIG. 5A.

FIG. 7A is an enlarged vertical cross-sectional centerline view depicting an alternative embodiment of the structure shown in Inset A of FIG. 5A.

FIG. 8A is a cross-sectional view taken along line 8-8 in FIG. 1, showing the object holder and the object held thereby being vacuum-mounted to the reference surface.

FIG. 8B is a cross-sectional view corresponding to FIG. 8A, showing a first stage of object holder detachment in which the object holder and the object held thereby have undergone initial movement away from the reference surface.

FIG. 8D is a cross-sectional view corresponding to FIG. 8A, showing a third stage of object holder detachment in which the object holder and the object held thereby have been completely detached from the reference surface.

FIG. 21 is an enlarged vertical cross-sectional centerline view depicting the structure shown in Inset A of FIG. 18, showing the object holder of FIG. 15 detached from a detachably mountable vacuum formation-and-release actuator.

FIG. 22 is an enlarged vertical cross-sectional centerline view depicting the structure shown in Inset B of FIG. 19, showing the object holder of FIG. 15 attached to a detachably mountable vacuum formation-and-release actuator and ready to be vacuum-mounted to a reference surface.

FIG. 25 is an enlarged vertical cross-sectional centerline view depicting the structure shown in Inset B of FIG. 19, showing the object holder of FIG. 15 attached to a detachably mountable vacuum formation-and-release actuator, with object holder being in a final state of unmounting from the reference surface.

FIG. 26 is an enlarged vertical cross-sectional centerline view depicting the structure shown in Inset B of FIG. 19, showing the object holder of FIG. 15 attached to a detachably mountable vacuum formation-and-release actuator and unmounted from a reference surface after having been vacuum-mounted thereon.

FIG. 41 is an enlarged vertical cross-sectional centerline view depicting the universal vacuum connector of FIG. 37 detachably mounted to an object and vacuum-mounted to a reference surface.

FIG. 41A is an enlarged vertical cross-sectional centerline view depicting a modified version of the universal vacuum connector of FIG. 37 detachably mounted to an object and vacuum-mounted to a reference surface.

FIG. 41B is an enlarged vertical cross-sectional centerline view depicting another modified version of the universal vacuum connector of FIG. 37 detachably mounted to an object and vacuum-mounted to a reference surface.

FIG. 42 is an enlarged vertical cross-sectional centerline view depicting the universal vacuum connector of FIG. 37 detachably mounted to an object and vacuum-mounted to a reference surface, and with universal vacuum connector being in an initial state of unmounting from the reference surface.

FIG. 43 is an enlarged vertical cross-sectional centerline view depicting a modified version of the universal vacuum connector of FIG. 37 detachably mounted to an object and in an initial state of unmounting from a reference surface after having been vacuum-mounted thereon.

FIG. 44 is an enlarged vertical cross-sectional centerline view depicting a modified version of the universal vacuum connector of FIG. 37 and completely unmounted from a reference surface after having been vacuum-mounted thereon.

Figure 45:
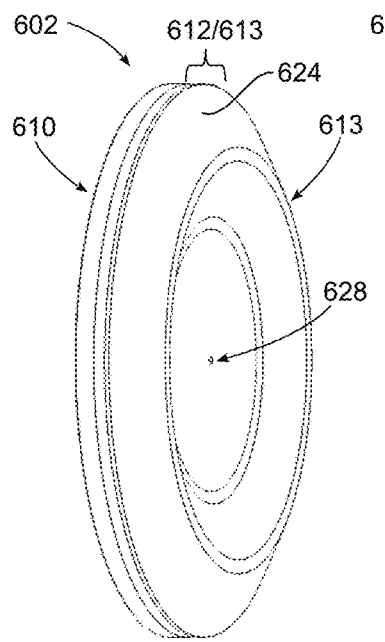
FIG. 45 is a front perspective view showing an example embodiment of a universal quick-release vacuum connector.
Figure 59:
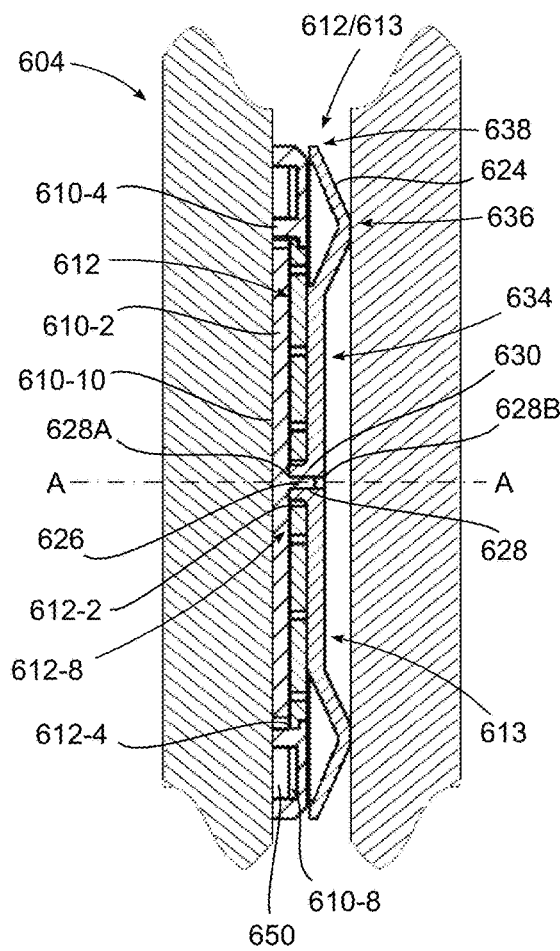

FIG. 59 is an enlarged vertical cross-sectional centerline view depicting the universal vacuum connector of FIG. 45 detachably mounted to an object and vacuum-mounted to a reference surface.

FIG. 59A is an enlarged vertical cross-sectional centerline view depicting a modified version of the universal vacuum connector of FIG. 45 detachably mounted to an object and vacuum-mounted to a reference surface.

FIG. 59B is an enlarged vertical cross-sectional centerline view depicting another modified version of the universal vacuum connector of FIG. 45 detachably mounted to an object and vacuum-mounted to a reference surface.

FIG. 60 is an enlarged vertical cross-sectional centerline view depicting a modified version of the universal vacuum connector of FIG. 45 detachably mounted to an object and in an initial state of unmounting from a reference surface after having been vacuum-mounted thereon.

FIG. 61 is an enlarged vertical cross-sectional centerline view depicting a modified version of the universal vacuum connector of FIG. 45 and completely unmounted from a reference surface after having been vacuum-mounted thereon.

DETAILED DESCRIPTION OF EXAMPLE EMBODIMENTS

Turning now to the drawing figures, in which like reference numbers illustrate like structure in all of the several views, FIGS. 1-2 illustrate one possible embodiment of an object holder 2 having quick-release anchoring capability that may be constructed in accordance with the present disclosure. The object holder 2 is designed to hold an object 4 for detachable mounting to an external reference surface 6. In the illustrated embodiment, the object 4 is depicted as a smartphone or other handheld electronic device, and the object holder 2 is a handheld electronic device case for the handheld device (e.g., a smartphone case). However, alternate embodiments of the object holder 2 may be constructed in accordance with the principles of the present disclosure for holding and detachably mounting many other kinds of objects.

In the illustrated embodiment, the reference surface 6 is shown as being vertical. However, the object holder 2 could just as easily be used to mount the object 4 to horizontal reference surfaces or to inclined reference surfaces oriented at any arbitrary angle lying between vertical and horizontal.

It will be appreciated that the types of reference surfaces on which the object 4 may be mounted using the object holder 2 are virtually unlimited. As described in more detail below, the only requirement for a suitable reference surface is that it be capable of forming a suction seal with the object holder 2. Without limitation, examples of possible reference surfaces include walls, doors, windows, appliances, cabinetry, desks, tables, shelves, counters, surfaces located on or within transportation equipment, such as landcraft, aircraft or watercraft, and many others.

Figure 3:
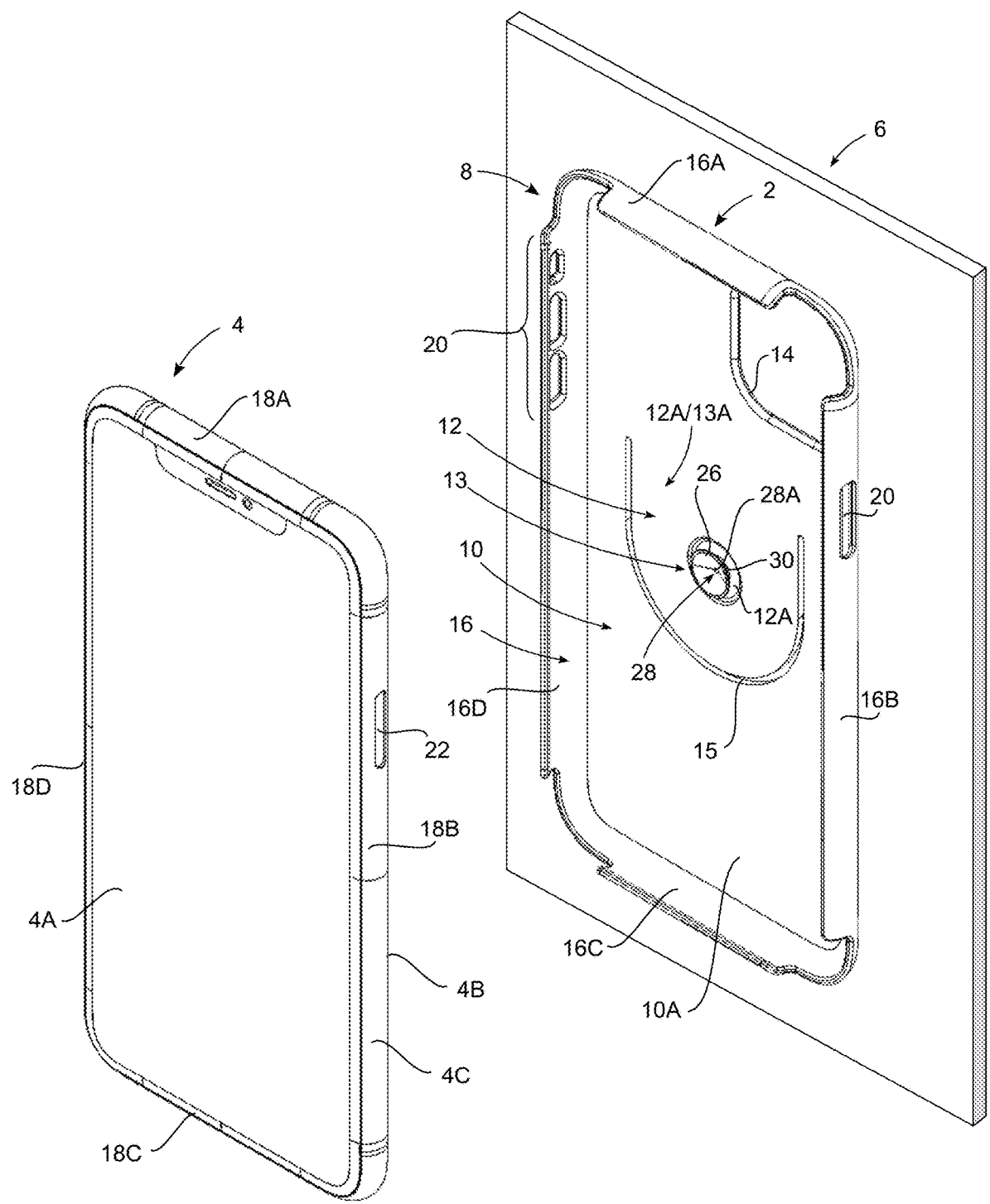
FIG. 3 is an exploded front perspective view showing the object, object holder and reference surface of FIG. 1.
Figure 4:
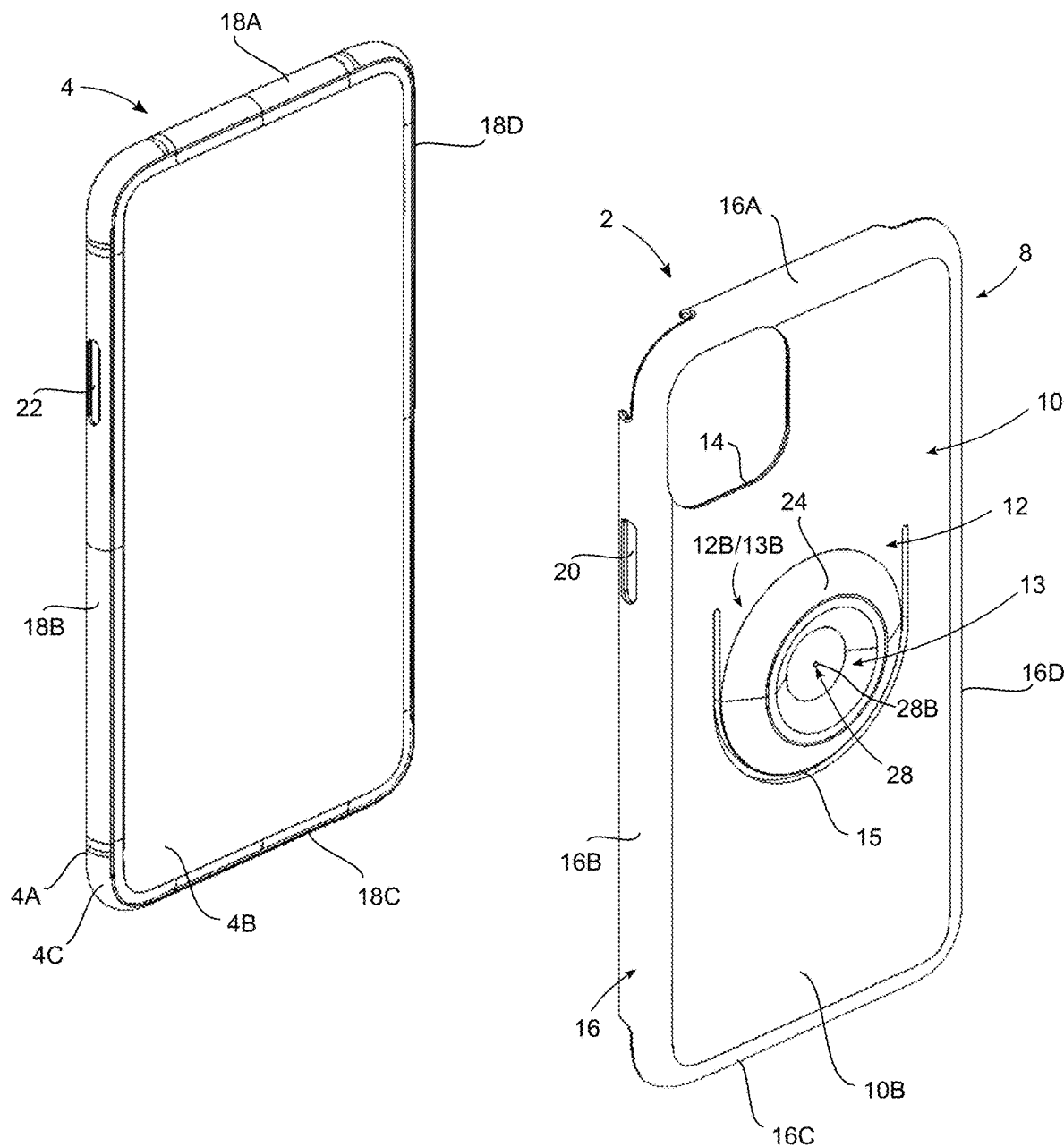
FIG. 4 is an exploded rear perspective view showing the object and object holder of FIG. 1.

With additional reference now to FIGS. 3 and 4, the object holder 2 includes an object carrier 8 that may be constructed from any material having desired rigidity (e.g., rigid, semi-rigid, non-rigid), including but not limited to a plastic such as polypropylene or polyurethane, a composite material such as carbon fiber, a metal such as titanium or aluminum, an elastomeric material such as silicone rubber, leather or synthetic leather, and even wood or wood laminate.

The object carrier 8 is configured to hold the object 4 while maintaining a fixed positional relationship therewith. In other words, the object carrier 8 as a whole does not move relative to the object 4 while the latter is being held by object holder 2. The object 4 and the object carrier 8 move in unison with each other. When one moves, the other moves, and visa versa.

The object carrier 8 includes an object carrier base 10 arranged for interposition between the object 4 and the reference surface 6 when the object is mounted to the reference surface using the object holder 2. A vacuum release actuator 12 is disposed on the object carrier base 10, and carries a double-seal flexible anchor member 13 that provides vacuum (suction) mounting capability. In combination, the vacuum release actuator 12 and the anchor member 13 provide a vacuum formation-and-release actuator 12/13.

Due to the construction of the vacuum release actuator 12, the vacuum formation-and-release actuator 12/13 is displaceable relative to the object carrier base in order to separate therefrom, and from the object 4 itself, along an axis A-A (see FIG. 2) that extends normal to the reference surface 6. As described in more detail below, the vacuum formation-and-release actuator 12/13 is operable to establish a releasable vacuum connection directly between the object 4 and the reference surface 6 in order to detachably mount the object to the reference surface.

In the illustrated embodiment wherein the object 4 is a smartphone or other handheld electronic device, the object will be seen as having a substantially flat low-profile configuration that includes substantially rectangular front and rear major surfaces 4A and 4B defining length and width dimensions of the device, and a continuous peripheral edge 4C that separates the front and rear major surfaces and defines a thickness dimension of the device. As is typical of most handheld electronic devices, the thickness dimension is substantially smaller (e.g., by at least 50% or more) than the length and width dimensions.

In the illustrated embodiment wherein the object holder 2 is a handheld electronic device case (e.g., smartphone case) and the object 4 is a handheld electronic device (e.g., smartphone), the object carrier 8 may be formed as a unitary device case main body that is operable to engage the handheld device and provide a protective cover therefor. The device case main body (object carrier 8) may be constructed from semi-rigid plastic or the like whose outside surfaces are covered by a thin layer of soft rubber material (e.g., silicone rubber). As can be seen in FIGS. 3 and 4, the device case main body (object carrier 8) has an open tray configuration that includes the object carrier base 10 being substantially rectangular in shape in order to serve as a device case main body base that is arranged to cover a substantial portion of the rear major surface 4B of the handheld device (object 4). More particularly, the device case main body base (object carrier base 10) may be configured as a plate or other substantially planar structure having an inner side 10A (FIG. 3) arranged to face the handheld device (object 4) and an outer side 10B (FIG. 4) arranged to face the reference surface 6. In this configuration, the device case main body base (object carrier base 10) is substantially completely interposed between the handheld device (object 4) and the reference surface 6. With the exception of one or more optional openings or other discontinuities in the device case main body base (object carrier base 10), the device case main body base may be formed as a solid unbroken sheet of material whose inner side 10A may extend across substantially an entire rear side 4A of the handheld device (object 4) that faces the reference surface 6.

One example of an optional opening or discontinuity that may be provided in the device case main body base (object carrier base 10) is an opening 14 that provides access to a functional component of the handheld device (object 4), in this case an array of one or more smartphone rear cameras and a cellphone light. Another example of an optional opening or discontinuity that may be provided in the device case main body base (object carrier base 10) is a U-shaped discontinuity 15 that may be formed as a slot (or slit) to define the vacuum release actuator 12. This construction is described in more detail below.

In the illustrated embodiment wherein the object holder 2 is a handheld electronic device case (e.g., smartphone case) and the object 4 is a handheld electronic device (e.g., smartphone), the device case main body (object carrier 8) may further include a peripheral rim 16 disposed on a periphery of the device case main body base (object carrier base 10). The peripheral rim 16 is arranged to wrap around and cover a substantial portion of the peripheral edge 4C of the handheld device (object 4) while leaving the front major surface of the device uncovered. The peripheral rim 16 of the device case main body (object carrier 8) may be provided by individual object holding elements 16A, 16B, 16C and 16D arranged around the periphery of the device case main body base (object carrier base 10).

In the illustrated embodiment, the object holding elements 16A-D are flexible structures that may be integrally formed with the device case main body base (object carrier base 10). The object holding elements 16A-D are angled out-of-plane relative to a major surface portion of the device case main body base (object carrier base 10), namely the major surface defined by the inner side 10A that faces the rear major surface 4B of the handheld device (object 4) and the outer side 10B that faces the reference surface 6. This allows the object holding elements 16A-D to engage, grip and hold the peripheral edge 4C of the handheld device (object 4), which is shown as having individual side edges 18A, 18B, 18C and 18D that are generally orthogonal to (and do not face) the reference surface 6. In this way, the device case main body (object carrier 8) may be firmly secured to the handheld device (object 4) so that the object holder 2 functions as a handheld device case.

A smartphone's side edges typically have a curved profile. Thus, in the illustrated embodiment, the interior surfaces of the object holding elements 16A-D may likewise have a curved profile that matches the smartphone's edge profile. Like the device case main body base (object carrier base 10), some or all of the object holding elements 16A-D may be formed with one or more openings or other discontinuities that provide access to corresponding portions of the handheld device (object 4). For example, the illustrated embodiment depicts optional openings 20 in two of the object holding elements 16B and 16D. These optional openings 20 provide access to various smartphone function control buttons located on side edges 18B and 18D, such as the power button 22 shown on side edge 18B.

It should be understood that the above-described configuration of the object carrier 8, e.g, as a device case main body that includes a device main body base (object carrier base 10) and a main body peripheral rim 16 (object holding elements 16A-D), represents only one possible embodiment of the disclosed subject matter. In alternate embodiments, the object carrier 8 could have various other configurations. These other configurations may depend in whole or in part on the configuration of the object 4 being carried. For example, although the object carrier base 10 is substantially planar in the illustrated embodiment (due to the object 4 being a smartphone and the object holder 2 being a smartphone case), non-planar (e.g., curved) configurations are also envisioned. Similarly, although the object carrier base 10 is shown as being relatively thin between its inner side 10A and its outer side 10B (as compared to its length and width dimensions), this is not a requirement.

The object carrier base 10 also need not be substantially solid (i.e., with only minor openings or discontinuities). In alternate embodiments, the object carrier base 10 could be a substantially discontinuous structure. One example of a discontinuous object carrier base construction would be a honeycomb web or other mesh-like or screen-like structure that includes a pattern of perforations. Another example of a discontinuous object carrier base construction would be a truss structure formed by any number of small beam-like or girder-like elements suitably arranged to support the object 4. Possible truss configurations a two-element X-shaped structure, a three-element Y-shaped structure, a three-element H-shaped structure, etc.

In still further alternate embodiments, the object carrier 8 could be formed with an object carrier base 10 but no peripheral rim 16 (object holding elements 16A-D) for gripping and holding the object 4. In that case, the object carrier base 10 could be removably (or permanently) mounted to the object 4 using fasteners, adhesive bonding, magnetic attraction, or other techniques.

As previously noted, the vacuum release actuator 12, and the anchor member 13 mounted thereon (i.e., the vacuum formation-and-release actuator 12/13), are disposed on the object carrier base 10, which in the illustrated embodiment provides the base of the device case main body (object carrier 8). As shown in FIGS. 3-4, the vacuum formation-and-release actuator 12/13 may be disposed proximate to a central interior portion of the device case main body base (object carrier base 10). Alternatively, the vacuum formation-and-release actuator 12/13 may be formed at an off-center interior location on the device case main body base (object carrier base 10). In the illustrated embodiment, the vacuum release actuator 12 (and by extension the vacuum formation-and-release actuator 12/13) is integrally formed on the device case main body base (object carrier base 10) as a flexible generally U-shaped flap (with other flap configurations also being possible). The flap is created by the previously-mentioned U-shaped discontinuity 15 that may be formed as a slot (or slit) in the object carrier base 10. By virtue of its flexible flap construction, the vacuum release actuator 12 (and by extension the vacuum formation-and-release actuator 12/13) may be thought of as being formed by a flexible portion the device case main body base (object carrier base 10), the remainder of which may be comparatively non-flexible. More specifically, the vacuum release actuator 12 (and by extension the vacuum formation-and-release actuator 12/13) may be thought of as representing a pivotable or bendable portion of the device case main body base (object carrier base 10).

Figure 29:
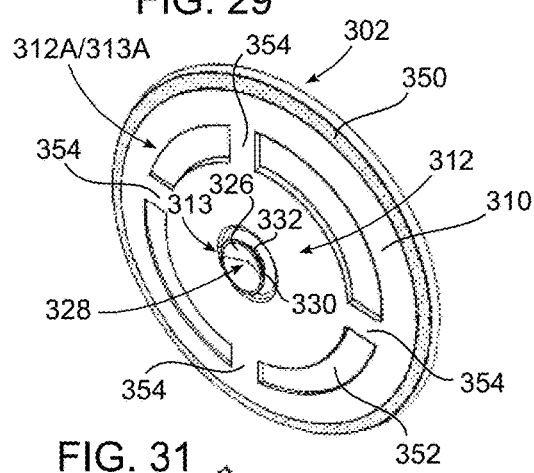
FIG. 29 is a front perspective view showing another example embodiment of a universal quick-release vacuum connector.
Figure 30:
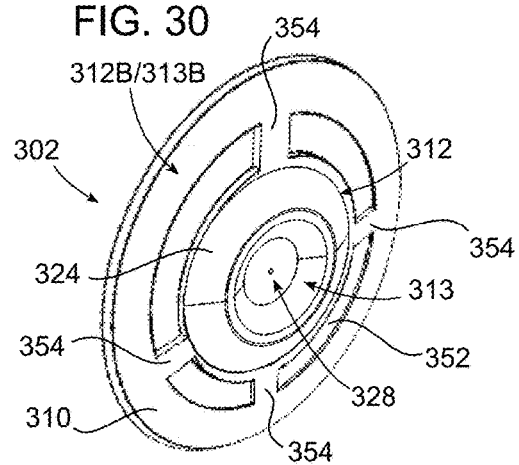
FIG. 30 is a rear perspective view of the universal vacuum connector of FIG. 29.

Although not shown, alternate embodiments could utilize other constructions to implement the vacuum release actuator 12. Thus, the vacuum release actuator 12 need not be integrally formed on the device case (object holder 4), but could be removably mounted thereto. Such an embodiment is described in more detail below in connection with FIGS. 15-26. The vacuum release actuator 12 need not be formed as a flap or other pivotable or bendable structure. It could, for example, be formed as a linearly movable member, such as a disk. Such a linearly movable member could reside in an opening formed in the device case main body base (object carrier base 10) and be movably attached thereto using a suitable flexible connector configuration. For example, flexible connectors formed by integral living hinges could be used. An embodiment that uses such as living hinge construction, albeit in the context of a removable vacuum formation-and-release assembly, is shown in FIGS. 29-30. The same living hinge connector construction could be used when the vacuum release actuator is integrated with the handheld device case (object holder 2).

Figure 31:
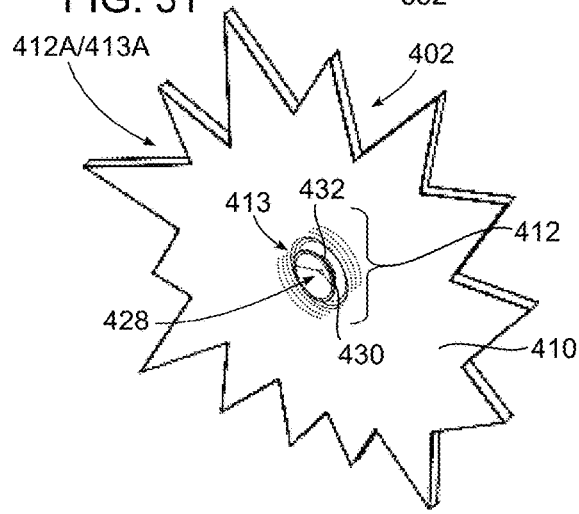
FIG. 31 is a front perspective view showing another example embodiment of a universal quick-release vacuum connector.
Figure 32:
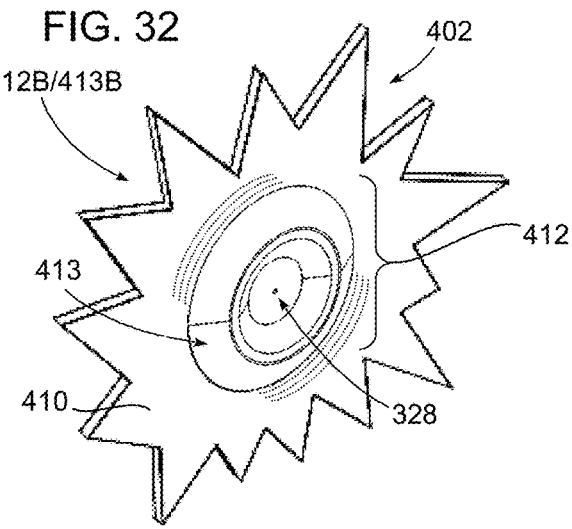
FIG. 32 is a rear perspective view of the universal vacuum connector of FIG. 31.

In still other alternate embodiments, the vacuum release actuator 12 might not be a definitively-formed element at all. For example, if the device case main body base (object carrier base 10) is formed from a sufficiently flexible sheet material, and if it is thin enough so that a central portion thereof can flex and displace out-of-plane relative to an edge portion thereof (i.e., along axis A-A of FIG. 1), the flexing and displaceable central portion could serve as the vacuum release actuator 12 (and by extension the vacuum formation-and-release actuator 12/13). An embodiment that uses such as flexible sheet construction, albeit in the context of a removable vacuum release actuator assembly, is shown in FIGS. 31-32. The same flexible sheet construction could be used when the vacuum formation-and-release assembly is integrated with the handheld device case (object holder 2).

As can be seen from FIG. 3, the vacuum formation-and-release actuator 12/13 has an inner side 12A/13A arranged to oppose the rear major surface 4B of the handheld device (object 4) when the device is engaged by the device case main body (object carrier 8). As can be seen from FIG. 4, the vacuum formation-and-release actuator 12/13 has an outer side 12B/13B arranged to oppose the reference surface 6 when the handheld device (object 4) is mounted thereto using the handheld device case (object holder 2).

Figure 5:
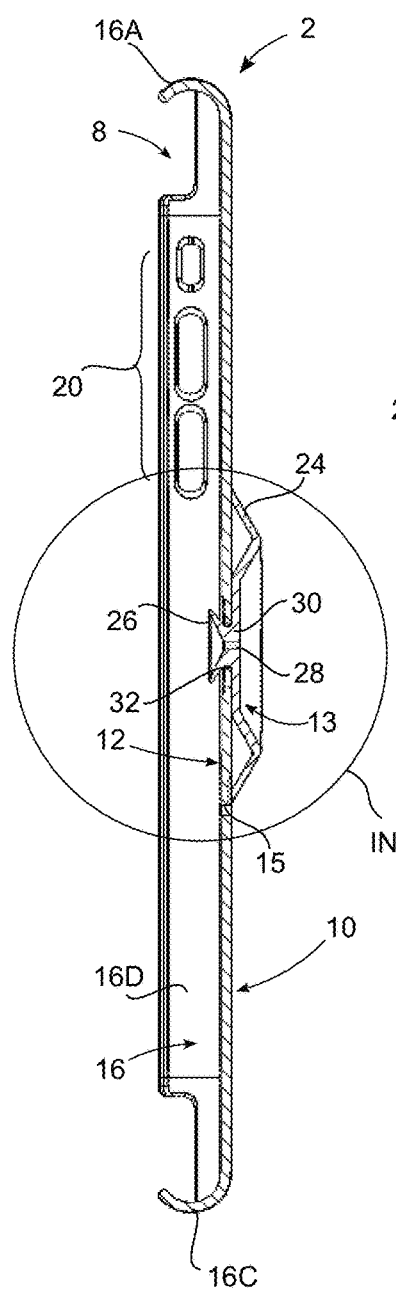
FIG. 5 is a vertical cross-sectional centerline view of the object holder of FIG. 1.
Figure 6:
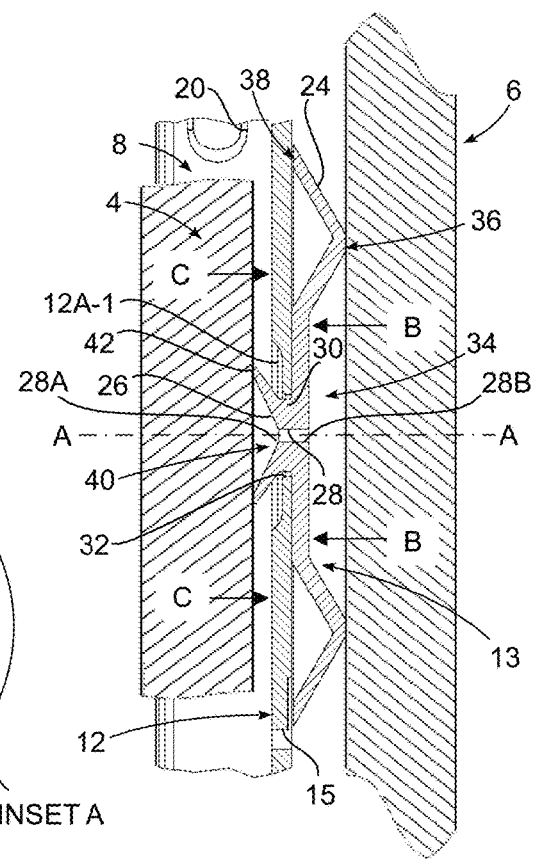
FIG. 6 is an enlarged vertical cross-sectional centerline view depicting the structure shown in Inset A of FIG. 5.

With continuing reference to FIGS. 3-4, and with additional reference also to FIGS. 5-6, the anchor member 13 of the vacuum formation-and-release actuator 12/13 includes a flexible outer seal member 24, a flexible inner seal member 26, and an interconnecting vent port 28. In the illustrated embodiment, the anchor member 13 further includes a central hub 30 disposed between the outer seal member 24 and the inner seal member 26. The central hub 30 may be used to mount the anchor member 13 to the vacuum release actuator 12. In particular, as best shown in FIGS. 3 and 6, the central hub 30 of the anchor member 13 may be seated in a through-bore 32 formed in the vacuum release actuator 12. The through-bore 32 provides an actuator opening in the vacuum release actuator 12 that extends axially therethrough. In the illustrated embodiment, the anchor member 13, including the outer seal member 24, the inner seal member 26, and the central hub 30, may be formed of a flexible resilient material having an appropriate hardness and density. Silicone rubber represents one such material. Other resilient materials may also be used.

Figure 7:
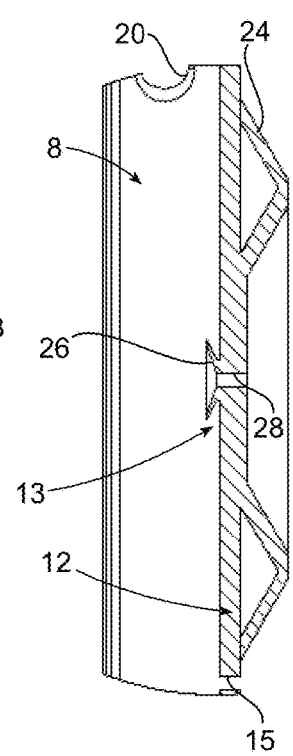
FIG. 7 is an enlarged vertical cross-sectional centerline view depicting a modified version of the structure shown in Inset A of FIG. 5.

In an alternate embodiment, instead of forming the anchor member 13 as a discrete component that is mounted to the vacuum release actuator 12, the anchor member could be integrally formed therewith to provide a unitary vacuum formation-and-release actuator 12/13. This is shown in FIG. 7. In that case, the central hub 30 of the anchor member 13 may be integrated with the structure that forms the vacuum release actuator 12. This means that the vacuum release actuator 12 and the anchor member 13 will be formed from the same material. In the event that the vacuum release actuator 12 is integrally formed as part of the device case main body base (object carrier base 10), the device case main body (object carrier 8), or even the entire handheld device case (object holder 2) itself may likewise be formed of the same material as both the vacuum release actuator 12 and the anchor member 13. For example, silicone rubber of suitable hardness and density may be used to form a unitary injection-molded structure that provides the anchor member 13, the vacuum release actuator 12, and the object carrier base 10, or the entire object carrier 8.

As best shown in FIG. 6, the outer seal member 24 of the anchor member 13 is arranged to engage the reference surface 6 and form a substantially airtight seal therewith that defines an outer controlled pressure zone 34. For ease of illustration, FIG. 6 depicts the outer seal member 24 in its initial undeformed state at a point where the handheld device case (object holder 2) makes initial contact with the reference surface 6 during mounting. As shown by the arrows labeled "B," the final mounted position of the handheld device case (object holder 2) may place the reference surface 6 closer to the hub 30 of the anchor member 13. The outer controlled pressure zone 34 represents the enclosed airspace region located between the outer seal member 24 and the reference surface 6.

In the illustrated embodiment the outer seal member 24 is shown as being cup-shaped, which allows the outer seal member to function as suction cup or a suction seal stabilizer, depending on the stiffness of the material and the axial force required to adhere it to the reference surface 6. In alternate embodiments, the outer seal member 26 might not be cup-shaped, and could be substantially flat, even when the handheld device case (object holder 2) is in an unmounted state. In the illustrated embodiment, the periphery of the outer controlled pressure zone 34 is defined by a circular ring of contact where an axially protruding medial rim 36 of the outer seal member 24 makes suction contact with the reference surface 6. For aesthetic reasons, the medial rim 36 may be situated radially inboard from a circumferential outer edge 38 of the outer seal member 24. The outer edge 38 is axially offset from medial rim 36 so as to form an axially inverted radial outer cup configured so that the outer edge lies against, or in close proximity to, the outer surface of the vacuum release actuator 12.

One practical advantage of forming the outer seal member 24 in this manner is to facilitate insertion of the handheld device case (object holder 2) into the pocket of a user. If the outer seal member 24 stopped at the medial rim 36, which is axially spaced from the outer surface of the vacuum release actuator 12, the rim could catch on the user's clothing. Notwithstanding this advantage, the outer seal member 24 may be formed without the outer radial section that extends from the medial rim 36 to the outer edge 38, such that the medial rim becomes the outer edge. This alternative construction is shown in FIGS. 5A, 6A and 7A.

The inner seal member 26 of the anchor member 13 is arranged to engage the handheld device (object 4) and form a substantially airtight seal therewith that defines an inner controlled pressure zone 40. For ease of illustration, FIG. 6 depicts the inner seal member 26 in its initial undeformed state at a point where the handheld device (object 4) makes initial contact with the inner seal member during installation of the device in the device case main body (object carrier 8). As shown by the arrows labeled "C," the final installed position of the handheld device (object 4) may place the device closer to the hub 30 of the anchor member 13. The inner controlled pressure zone 40 represents the enclosed air-space region located between the inner seal member 26 and the handheld device (object 4). In the illustrated embodiment, the inner seal member 26 is shown as being cup-shaped, which allows the inner seal member to function as suction cup or a suction seal stabilizer, depending on the stiffness of the material and the axial force required to adhere it to the rear major surface 4B of the handheld device (object 4). In alternate embodiments, the inner seal member 26 might not be cup-shaped, and could be substantially flat, even when the handheld device (object 4) is not installed in the device case main body (object carrier 8). In the illustrated embodiment, the periphery of the inner controlled pressure zone 40 is defined by a circular ring of contact where an axially protruding outer rim 42 of the inner seal member 26 makes suction contact with the rear major surface 4B of the handheld device (object 4).

As shown in FIG. 6, and as also depicted in FIG. 3, a shallow circular pocket 12A-1 may be formed in the inner side 12A of the vacuum release actuator 12. The pocket 12A-1 is centered about the axial through-bore 32 formed in the vacuum release actuator 12 that seats the anchor member hub 30. The depth of the pocket 12A is selected so as to accommodate the inner seal member 26 as it becomes flattened by the handheld device (object 4) when it is installed in the object holder 2.

As can be seen in FIGS. 3 and 4, the vent port 28 has an inner end 28A (FIG. 3) and an outer end 28B (FIG. 4). As can be seen in FIG. 6, the outer end 28B is in fluid communication with the outer controlled pressure zone 34 and an inner end 28A in fluid communication with the inner controlled pressure zone 40. When the outer seal member 24 is in suction contact with the reference surface 6, and the inner seal member 26 is in suction contact with the handheld device (object 4), the interconnecting vent port 28 provides an air pathway between the outer controlled pressure zone 34 and the inner controlled pressure zone 40, and thereby facilitates fluid communication between the inner and outer controlled pressure zones. The vent port 28 equalizes the air pressure in the two controlled pressure zones 34/40 and establishes a single composite controlled pressure zone formed by a combination of the vacuum formation-and-release actuator (including the outer seal member 24, the inner seal member 26 and the vent port 28 thereof), the reference surface 6, and the rear major surface 4B of the handheld device (object 4). This composite controlled pressure zone establishes a releasable vacuum connection directly between the handheld device (object 4) and the reference surface 6 in order to detachably mount the device to the reference surface. The composite controlled pressure zone maintains a negative pressure differential relative to an external ambient pressure.

As described in more detail below, the releasable vacuum connection is releasable by virtue of the vacuum formation-and-release actuator 12/13 being movable relative to the rear major surface 4B of the handheld device (object 4) in a manner that vents the composite controlled pressure zone. During such venting, the device case main body base (object carrier base 10) and the peripheral rim 16 (object holding elements 16A-D) of the case main body (object carrier 8) remain immovably engaged with the handheld device (object 4). In particular, the composite controlled pressure zone can be vented by manipulating the device case main body (object carrier 8) away from the reference surface 6 to separate the handheld device (object 4) from the vacuum formation-and-release actuator 12/13 until the inner seal member 26 breaks its substantially airtight seal with the rear major surface 4B of the device.

Notwithstanding the equalization of air pressure provided by the vent port 28 between the outer controlled pressure zone 34 and the inner controlled pressure zone 40, the suction force generated by the outer seal member 24 against the reference surface 6 will be significantly larger than the suction force generated by the inner seal member 26 against the rear major surface 4B of the handheld device (object 4). This is because the area of the outer seal member 24 that lies within its medial rim 36 is substantially larger than the area of the inner seal member 26 that lies within its outer rim 42. For example, if the diameter of the inner seal member's rim 42 is 1 cm and the diameter of the outer seal member's rim 36 is 5 cm, the outer seal member's rim diameter will be five times larger than the inner seal member's rim diameter. However, the surface area, and hence the suction force, is based on the square of the relative diameters. As such, in the example given, the suction force generated by the outer seal member 24 will be twenty-five times larger than the suction force generated by the inner seal member 26. As will described below, this suction force differential dictates the operational characteristics of the handheld device case (object holder 2).

Figure 8C:
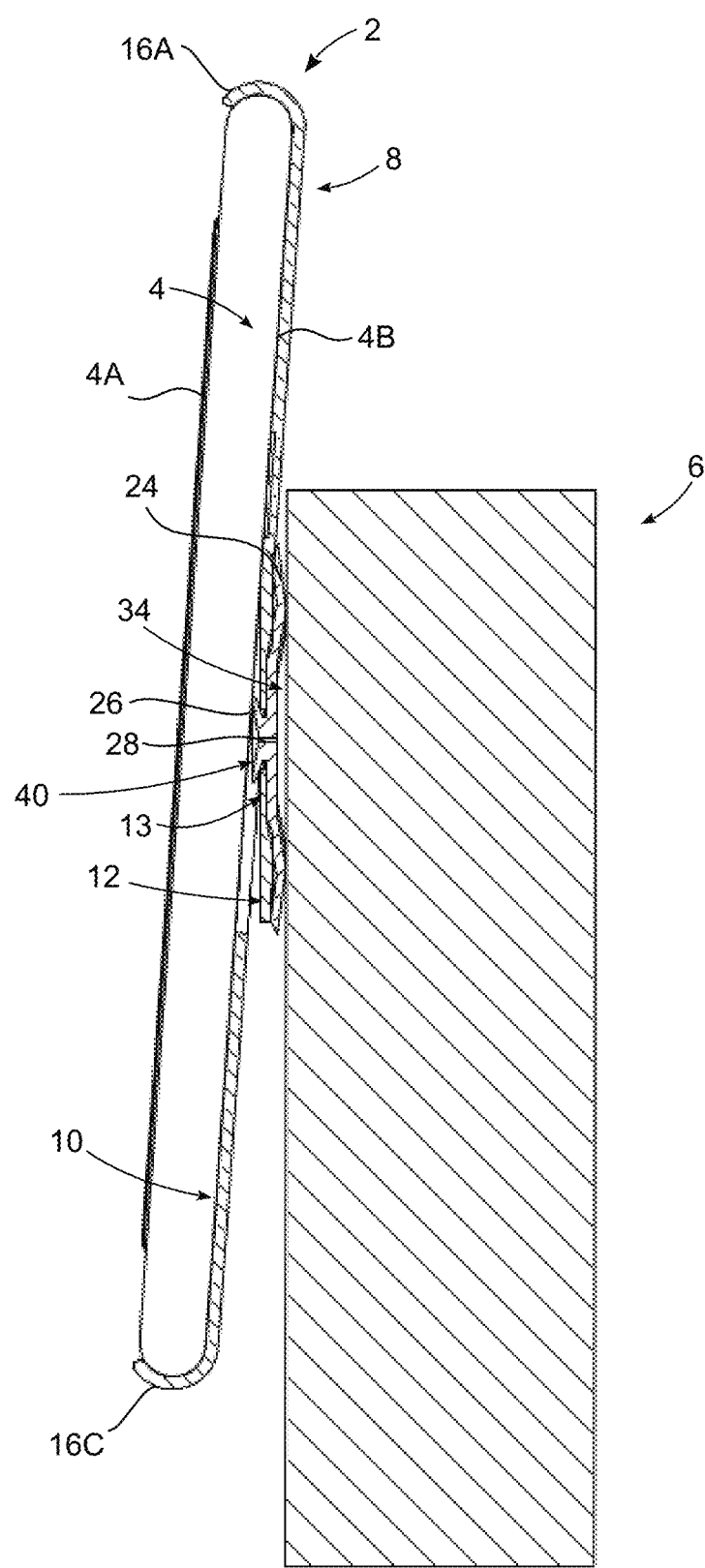
FIG. 8C is a cross-sectional view corresponding to FIG. 8A, showing a second stage of object holder detachment in which of the object holder and the object held thereby have undergone further movement away from the reference surface.
Figure 9:
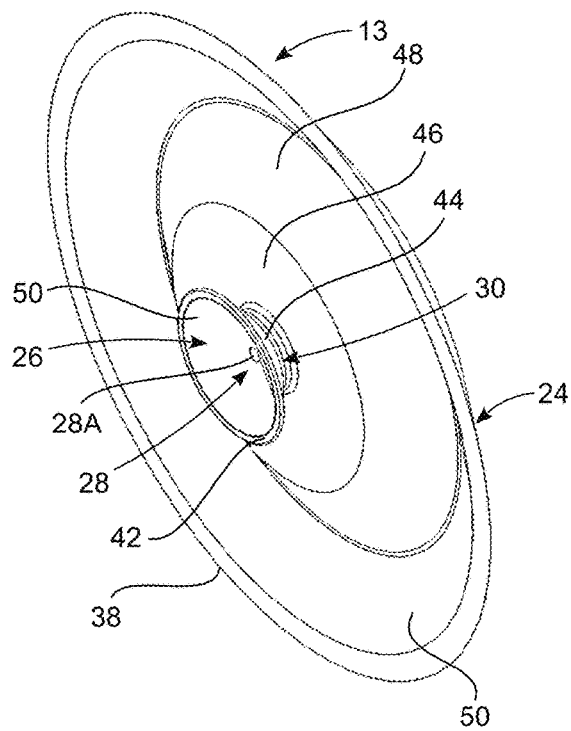
FIG. 9 is a front perspective view of an anchor member of the object holder of FIG. 1.
Figure 10:
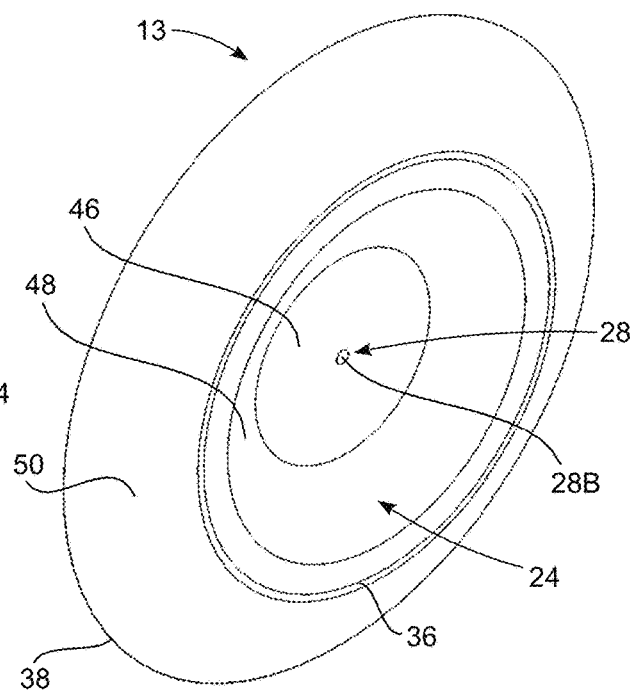
FIG. 10 is a rear perspective view of the anchor member of FIG. 9.
Figure 11:
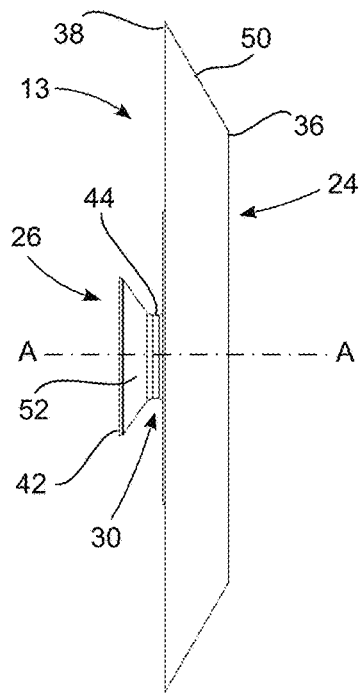
FIG. 11 is a side elevation view of the anchor member of FIG. 9.

With reference now to FIGS. 8A-8D, the object holder 2 (embodied as a handheld electronic device case) is shown in FIG. 8A as being in a mounted state wherein it holds the object 4 (embodied as a handheld electronic device) and mounts it to the reference surface 6. The mounted state of FIG. 8A may be effected by initially installing the handheld device (object 4) into the device case main body (object carrier 8) so that the handheld device case (object holder 2) provides a protective cover therefor. This installation will place the rear major surface 4B of the handheld device (object 4) in sealing engagement with the inner seal member 26. If the inner seal member 26 is cup-shaped, as in the illustrated embodiment, the process of installing the handheld device (object 4) in the device case main body (object carrier 8) may tend to deform the inner seal member as a result of pressing the rear major surface 4B of the device against it. In that case, the inner seal member 26 may become partially or wholly axially compressed (i.e., flattened). This flattening is illustrated in FIG. 8A.

Once the handheld device (object 4) is installed in the device case main body (object carrier 8), the device may be vacuum-mounted to the reference surface 6 by maneuvering the handheld device case (object holder 2) in a manner that pushes the outer seal member 24 of the vacuum formation-and-release actuator 12/13 into sealing engagement with the reference surface. If the outer seal member 24 is cup-shaped, as in the illustrated embodiment, the pushing force applied to the handheld device case (object holder 2) to maneuver the outer seal member into sealing engagement with the reference surface 6 may tend to deform the outer seal member. In that case, the outer seal member 24 may become partially or wholly axially compressed (i.e., flattened). This flattening is illustrated in FIG. 8A.

Once the handheld device case (object holder 2) carrying the handheld device (object 4) is mounted to the reference surface 6 in the manner described above, a suction force will have been established as a releasable vacuum connection in the composite controlled pressure zone that holds the device case in position. The outer controlled pressure zone 34 will become sealed by virtue of the sealing engagement between the outer seal member 24 and the reference surface 6. The inner controlled pressure zone 40 will become sealed by virtue of the sealing engagement between the inner seal member 26 and the rear major surface 4B of the handheld device (object 4).

Releasing the handheld device case (object holder 2) following mounting will result in a restorative spring-back force developing in the outer seal member 24 to the extent that it was compressibly deformed during the mounting process. This restorative spring-back force will tend to increase the volume of the outer controlled pressure zone 34. In addition, the weight of the handheld device case (object holder 2) and the handheld device (object 4) carried thereby will likewise deform the outer seal member 24 in a manner that tends to increase the volume of the outer controlled pressure zone 34. Because the outer controlled pressure zone 34 is in fluid communication with the inner controlled pressure zone 40 by virtue of the interconnecting vent port 28, a negative pressure differential will collectively develop in both controlled pressure zones with respect to the external ambient air pressure outside the controlled pressure zones. This negative pressure differential will provide a suction force between the outer seal member 24 and the reference surface 6, and between the inner seal member 26 and the rear major surface 4B of the handheld device (object 4). The handheld device case (object holder 2) carrying the handheld device (object 4) may thereby remain affixed to the reference surface 6 for an indefinite period of time.

When it is desired to detach the handheld device case (object holder 2) from the reference surface 6, the device case main body (object carrier 8) can be grasped and maneuvered away from the reference surface. Doing so will displace the vacuum release actuator 12 relative to the device case main body base (object carrier base 10) while the latter remains immovably engaged with the handheld device (object 4), as shown in FIG. 8B. The displacement of the vacuum release actuator 12 relative to the device case main body base (object carrier base 10) results from the strong suction force between the outer seal member 24 and the reference surface 6. This suction force acts on the anchor member 13, and therefore also acts on the vacuum release actuator 12 to which the anchor member is mounted. Because the vacuum release actuator 12 is displaceable relative to the device case main body base (object carrier base 10), the device case main body base can move away from the reference surface while the vacuum release actuator 12 and the anchor member 13 do not. As this occurs, the vacuum release actuator 12 does not move appreciably away from the reference surface 6 due to the outer seal member 24 of the anchor member 13 remaining adhered thereto. The outer seal member 24 may deform slightly, but will nonetheless tend to remain attached to the reference surface 6. In the illustrated embodiment wherein the vacuum release actuator 12 is formed as a flap, the resultant displacement of the vacuum release actuator relative to the device case main body base (object carrier base 10) is depicted in FIG. 8B as a slight out-of-plane bending or pivoting of the vacuum release actuator. Notwithstanding such displacement, the inner seal member 26 will tend to remain attached to the rear major surface 4B of the handheld device (object 4) so long as the suction force between the inner seal member and the rear major surface of the object is not exceeded.

FIG. 8C depicts a further point in the detachment process in which the device case main body (object carrier 8) has been maneuvered further away from the reference surface 6. In particular, the device case main body (object carrier 8) has been displaced to the point where the suction force between the inner seal member 26 and the handheld device (object 4) is exceeded. When this occurs, the inner seal member 26 breaks its substantially airtight seal with the rear major surface 4B of the handheld device (object 4). This vents the inner controlled pressure zone 40, which in turn vents the outer controlled pressure zone 34 through the interconnecting vent port 28. As a result, the negative differential pressure previously established in the outer controlled pressure zone 34 is lost, and the suction force between the outer seal member 24 and the reference surface 6 is released. As shown in FIG. 8D, the handheld device case (object holder 2) will now easily separate from the reference surface 6 without discernible resistance. At the same time, the vacuum release actuator 12 will return to its default position wherein it is coplanar with the device case main body base (object carrier base 10). This will result in the inner seal member 26 of the anchor member 13 re-engaging with the rear major surface 4B of the handheld device (object 4).

Turning now to FIGS. 9-12, certain features of the anchor member 13 that affect operation of the handheld device case (object holder 2) will be described in more detail. In particular, it will be seen clearly that the outer seal member 24 and the inner seal member 26 of the anchor member 13 are configured as simple suction cup (or suction seal) members whose walls extend continuously radially outwardly, and never radially inwardly, when moving from their respective points of attachment to the anchor member hub 30 to their respective peripheral edges and rims.

Although not shown, alternative embodiments of the anchor member 13 could incorporate seal members having one or more wall sections that converge radially inwardly as they emanate from the hub 30. However, seal members configured in such a manner are not used in the illustrated embodiment because they tend to produce in an "accordion" configuration that can promote excessive axial elongation/ contraction capability. This accordion effect is facilitated by the ability of the radially-inwardly converging seal member wall section(s) to fold radially inwardly and then subsequently unfold. If the vent port 28 is large enough, a radially inwardly-converging wall section could even fold into the vent port, thereby reversing that wall section's axial orientation. See, e.g., the patents of Lan (U.S. Pat. No. 4,756,497 and CN1079886A).

Excessive axial elongation of a seal member, and particularly an inner seal member, could result in an object holder that feels noticeably stretchable when an attempt is made to remove it from a reference surface. Such stretchability may be acceptable, or even desirable, for a holding vessel that contains a spillable liquid. If such a holding vessel is mounted on a horizontal reference surface, the increased stretchiness provided by a folding seal member may allow the vessel to rock back and forth without detaching from the reference surface, thereby resisting tipping. See, e.g., Lan (U.S. Pat. No. 4,756,497) and Lan (CN1079886A).

However, for the handheld device case (object holder 2), which is designed to hold a solid object, namely, a smartphone or other handheld electronic device, it is preferable that minimal movement and effort be required to detach the handheld device case from both the handheld device (object 4) and the reference surface 6. This can be achieved by controlling the axial elongation capability of at least the inner seal member 26 to ensure that it can quickly separate from the rear major surface 4B of the handheld device (object 4). Optionally, the axial elongation capability of the outer seal member 24 may also be restricted. For the handheld device case (object holder 2), as constructed in accordance with the illustrated embodiment, a slight outward pull away from the reference surface 6 (e.g., 1 cm or less) is all that is required to detach the handheld device case therefrom.

The hub 30 of the anchor member 13 is formed as a short and stubby tubular member that is comparatively axially incompressible and non-elongatable as compared to the outer seal member 24 and the inner seal member 26. This is particularly true for the relatively axially-deformable peripheral portions of the outer seal member 24 (i.e., the medial rim 36 and the outer edge 38) and the peripheral portion of the inner seal member 26 (i.e., the outer rim 42).

Figure 12:
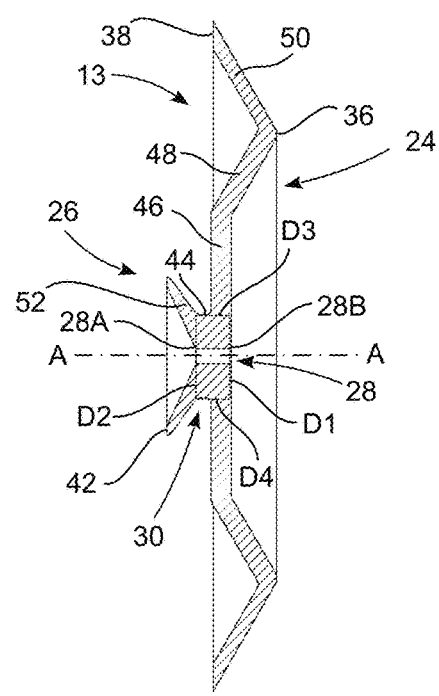
FIG. 12 is a vertical cross-sectional centerline view of the anchor member of FIG. 9.

The central through-bore of the tubular hub 30 is formed by the vent port 28. In FIG. 12, the boundaries of the hub 30 are indicated by the dashed reference lines "D1," "D2," "D3" and "D4." Reference line D1 represents the outer axial end of the hub 30. This outer end D1 is axially co-located with the outer end 28B of the vent port 28. Reference line D2 represents the axial inner end of the hub 30. This inner end D1 is axially co-located with the inner end 28B of the vent port 28. The axial length of the hub 30 is thus defined by the length of the vent port 28. The radial width of the hub 30 is indicated by the reference lines D3 and D4, which are aligned with an exposed outer cylindrical wall 44 of the hub that extends between the outer seal member 24 and the inner seal member 26 in the illustrated embodiment. The outer cylindrical wall 44 is the portion of the hub 30 that inserts through the axial through-bore 32 formed in the vacuum release actuator 12. As can be seen in FIG. 12, the hub 30 is considered to be short and stubby due to its axial length being not more than 50% of its radial width in the illustrated embodiment. Other length-to-width ratios may also be used.

With continuing reference to FIG. 12, outer end D1 of the hub 30 carries the outer seal member 24, and functions as a central stem thereof that is axially-immobilized with respect to the vacuum release actuator 12 when the anchor member 13 is mounted thereto. Extending radially outwardly from the hub 30 is an inboard section 46 of the outer seal member 24 that is disk-shaped in the illustrated embodiment (with other shapes also being possible). The inboard section 46 of the outer seal member 24 is integrally formed on the hub 30 at the hub's outer end D1. Extending both radially outwardly and axially rearwardly from the inboard section 46 is a medial section 48 of the outer seal member 24 that has a frustoconical wall configuration in the illustrated embodiment, with the large end of the frustum facing axially away from the hub 30. The medial section 48 extends to the medial rim 36 of the outer seal member 24 that engages the reference surface 6. The medial section 48 is angled with respect to the inboard section 46 so as to define the rear-facing cup shape of the outer seal member 24 that opens away from the vacuum release actuator 12 and toward the reference surface 6. Extending both radially outwardly and axially forwardly from the medial section 48 is an outboard section 50 of the outer seal member 24 that has a frusto-conical wall configuration in the illustrated embodiment, with the large end of the frustum facing axially toward the hub 30. The outboard section 50 extends to the outer edge 38 of the outer seal member 24. The outboard section 50 is angled with respect to the medial section 48 so as to define a front-facing cup that opens away from the reference surface 6 and toward the vacuum release actuator 12. As previously discussed, this provides aesthetic and functional advantages relative to the appearance and use of the handheld device case (object holder 2). As also previously mentioned, the outboard section 50 of the outer seal member 24 may be dispensed with if so desired.

Figure 13A:
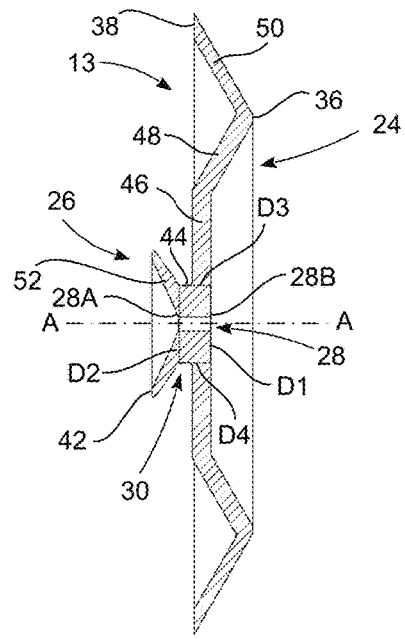
FIG. 13A is a vertical cross-sectional centerline view of the anchor member of FIG. 9 in a nominal non-deformed configuration.
Figure 13B:
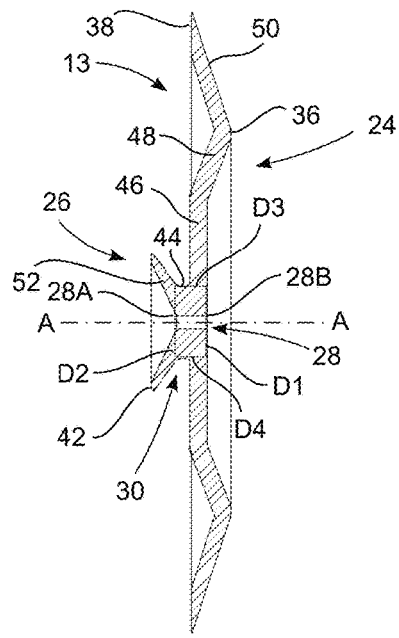
FIG. 13B is a vertical cross-sectional centerline view of the anchor member of FIG. 9 showing the anchor member's outer seal member in an axially compressed configuration.
Figure 13C:
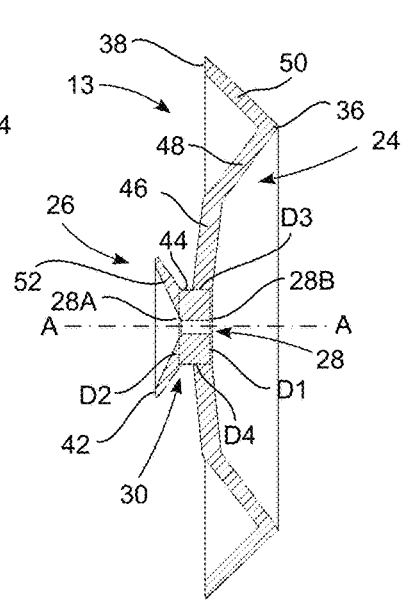
FIG. 13C is a vertical cross-sectional centerline view of the anchor member of FIG. 9 showing the anchor member's outer seal member in an axially elongated configuration.

FIGS. 13A, 13B and 13C illustrate example deformations of the outer seal member 24 that may be experienced during operation of the handheld device case (object holder 2). FIG. 13A depicts the nominal configuration of the outer seal member 24 without deformation. FIG. 13B depicts an axially compressed (flattened) configuration of the outer seal member 24 such as might be experienced when the handheld device case (object holder 2) is pressed against the reference surface 6. FIG. 13C depicts an axially elongated (tented) configuration of the outer seal member 24 such as might be experienced when the handheld device case (object holder 2) is pulled away from the reference surface 6 while the anchor member 13 remains adhered thereto. In both FIGS. 13B and 13C, it will be seen that the central stem of the outer seal member 24 remains axially stable as a result of the hub 30 maintaining its initial configuration. Only the peripheral portion of the outer seal member 24 that defines its cup configuration will deform, either flattening in FIG. 13B or elongating in FIG. 13C. In the axially compressed configuration of FIG. 13B, the medial section 48 and the outboard section 50 of the outer seal member 24 become less conical, and thus flatter. The inboard section 46 retains its initial disk-shaped configuration. In the axially elongated configuration of FIG. 13C, the inboard section 46 of the outer seal member 24 flexes out of plane, becoming somewhat conical so as to resemble a beveled washer. The medial section 48 of the outer seal member 24 becomes more conical in FIG. 13C, while the outboard section 50 tends to maintain its initial configuration.

Returning now to FIG. 12, inner end D2 of the hub 30 carries the outer seal member 24 and functions as a central stem thereof that is axially-immobilized with respect to the vacuum release actuator 12 when the anchor member 13 is mounted thereto. Extending both radially outwardly and axially frontwardly from the hub 30 is a main section 52 of the inner seal member 26 that has a frustoconical wall configuration in the illustrated embodiment, with the large end of the frustum facing axially away from the hub 30. The main section 52 of the inner seal member 26 is integrally formed on the hub 30 at the hub's inner end D2. The main section 52 extends linearly to the outer rim 42 that contacts the rear major surface 4A of the handheld device (object 4) during use of the handheld device case (object holder 2). It is angled with respect to the hub 30 so as to define the front-facing cup shape of the inner seal member 26 that opens away from the vacuum release actuator 12 and toward the handheld device (object 4). It will be seen in FIG. 12 that the thickness of the inner seal member's main section 52 may decrease toward the outer rim 42, such that the main section has a tapered conical wall. This tapering makes the outer rim 42 of the inner seal member 26 more pliable, and thus better able to form an airtight seal against the rear major surface 4B of the handheld device (object 4).

Figure 14A:
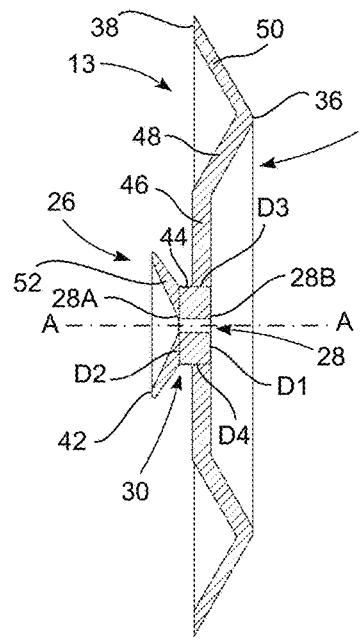
FIG. 14A is a vertical cross-sectional centerline view of the anchor member of FIG. 9 in a nominal non-deformed configuration.
Figure 14B:
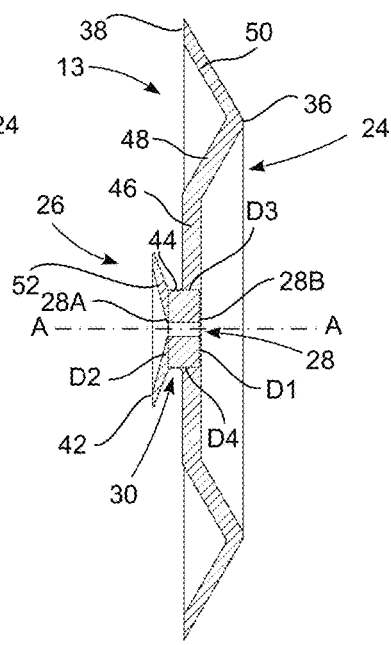
FIG. 14B is a vertical cross-sectional centerline view of the anchor member of FIG. 9 showing the anchor member's inner seal member in an axially compressed configuration.
Figure 14C:
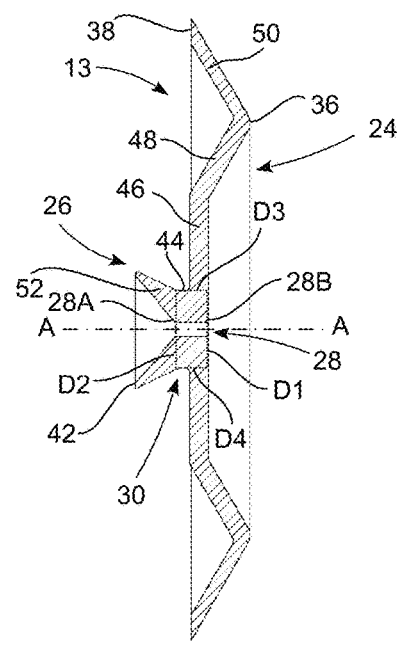
FIG. 14C is a vertical cross-sectional centerline view of the anchor member of FIG. 9 showing the anchor member's inner seal member in an axially elongated configuration.

FIGS. 14A, 14B and 14C illustrate example deformations of the inner seal member 26 that may be experienced during operation of the handheld device case (object holder 2). FIG. 14A depicts the nominal configuration of the inner seal member 26 without deformation. FIG. 14B depicts an axially compressed (flattened) configuration of the inner seal member 26 such as might be experienced when the object 4 is installed in the handheld device case (object holder 2). FIG. 14C depicts an axially elongated (tented) configuration of the outer seal member 24 such as might be experienced when the handheld device (object 4) is installed in the handheld device case (object holder 2), the device case is adhered to the reference surface 6, and the device case is then pulled away from the reference surface while the anchor member 13 remains adhered thereto. In both FIGS. 14B and 14C, it will be seen that the central stem of the inner seal member 26 remains axially stable as a result of the hub 30 maintaining its initial configuration. Only the peripheral portion of the inner seal member 26 that defines its cup configuration will deform, either flattening in FIG. 14B or elongating in FIG. 14C. In the axially compressed configuration of FIG. 14B, the main section 52 becomes less conical, and thus flatter. In the axially elongated configuration of FIG. 14C, the main section 52 of the inner seal member 26 flexes, becoming more conical.

As a result of the above-described construction of the anchor member 13, the outer seal member 24 and the inner seal member 26 each have an axially stable stem provided by the hub 30. The outer seal member 24 and the inner seal member 26 further include flexible cup-shaped peripheral portions that are anchored at the hub and extend continuously radially outwardly to circular sealing surfaces that are configured to form airtight seals (i.e, the medial rim 36 of the outer seal member and the outer rim 42 of the inner seal member). The cup-shaped peripheral portion of each seal member 24 and 26 can axially extend and compress. This occurs primarily as a result of the sections that constitute each seal member's peripheral portion becoming more or less conical. Again, these are the inboard section 46 and the medial section 48 of the outer seal member 24 that extend from the hub 30 to the medial rim 36, and the main section 52 of the inner seal member 26 that extends from the hub 30 to the outer rim 42.

Although alternate embodiments may differ, there are no seal member sections in the illustrated embodiment of the handheld device case (object holder 2) that converge radially inwardly when moving away from their respective points of attachment to the anchor member hub 30 to their respective peripheral edges and rims. As previously noted, this would provide an accordion configuration that could result in excessive seal member elongation/contraction capability due the ability of the radially-inwardly converging seal member wall section(s) to fold radially inwardly and then subsequently unfold, with each folding and unfolding cycle possibly reversing the axial direction of the wall section if there is sufficient clearance to do so. In the illustrated embodiment of the object holder 2 as a handheld device case, the anchor member 13 does not utilize walls that are radially inwardly-converging (or otherwise foldable).

Because the inner seal member 26 is designed to separate from the rear major surface 4B of the handheld device (object 4) before outer seal member 24 separates from the reference surface 6, limiting axial elongation may be more important for the inner seal member than the outer seal member. Limiting axial elongation may in fact be optional as to the outer seal member 24 for some applications of the handheld device case (object holder 2). Therefore, as a general design guideline, it is considered that at least the inner seal member 26, and optionally the outer seal member 24, may have a substantially non-folding configuration that prevents axial elongation that would otherwise occur as result of seal member unfolding during operation of the object holder. More particularly, at least the inner seal member 26, and optionally the outer seal member 24, may have a substantially non-folding configuration in which no portion of the seal member folds radially inwardly upon itself during operation of the handheld device case (object holder 2). Still more particularly, at least the inner seal member 26, and optionally the outer seal member 24, may be substantially free of radially inwardly-extending sections when moving from the hub 30 to the sealing surface that forms the substantially airtight seal associated with that seal member. Still more particularly, at least the inner seal member 26, and optionally the outer seal member 24, may be implemented as a non-foldable seal member whose peripheral portions extend substantially continuously radially outwardly from the hub 30 to the sealing surface that forms the substantially airtight seal associated with that seal member.

Figure 15:
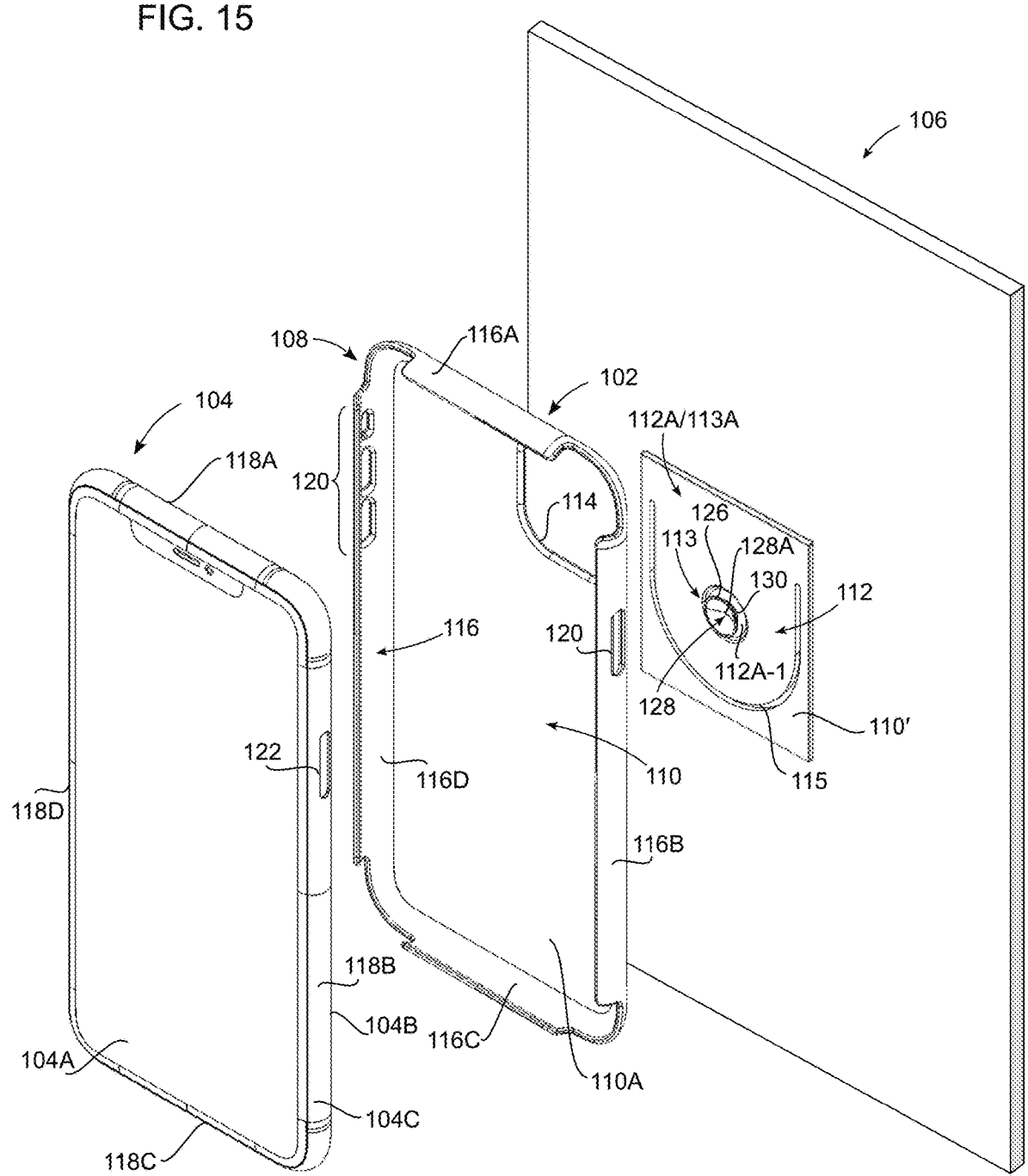
FIG. 15 is an exploded front perspective view showing another example embodiment of an object holder with quick-release anchoring capability, together with an object to be carried thereby and a reference surface to which the object is to be vacuum-mounted.
Figure 16:
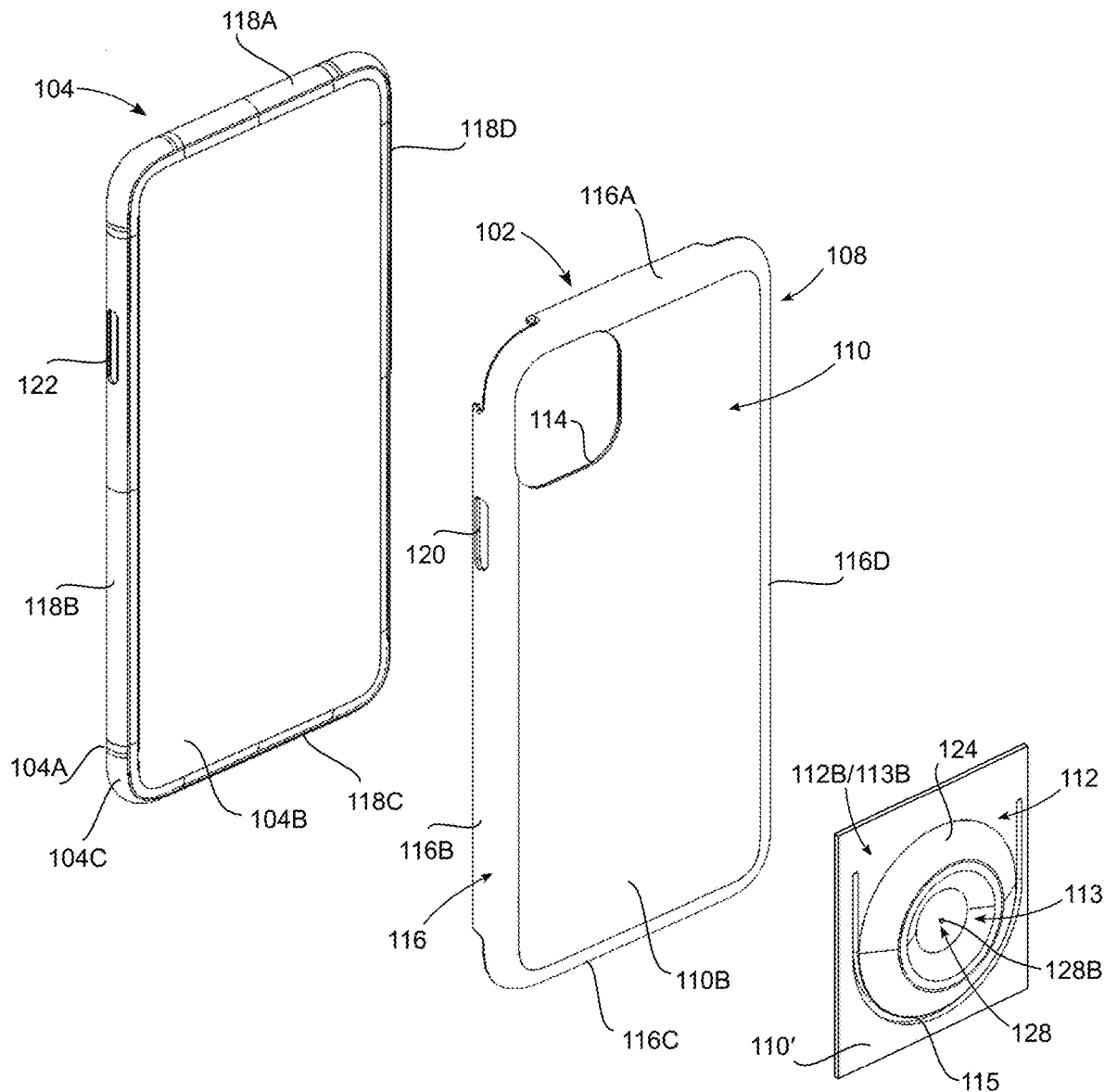
FIG. 16 is an exploded rear perspective view showing the object and object holder of FIG. 15, with the object holder being detached from a detachably mountable vacuum formation-and-release actuator.
Figure 17:
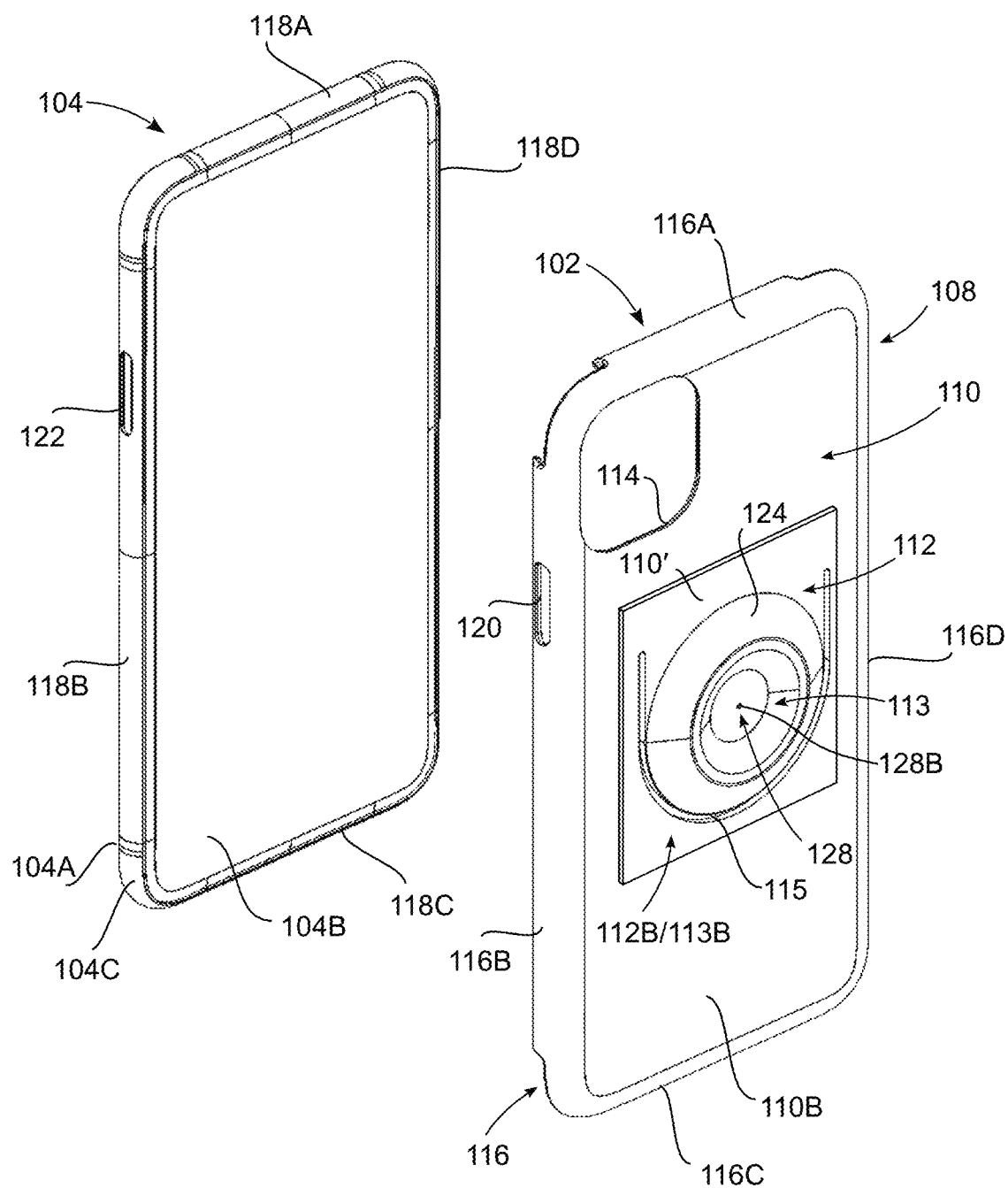
FIG. 17 is an exploded rear perspective view showing the object and object holder of FIG. 15, with object holder being attached to a detachably mountable vacuum formation-and-release actuator.

Turning now to FIGS. 15-17, an alternative object holder 102 is shown for holding an object 104 for detachable mounting to an external reference surface 106. Like the previously-described object holder 2, the object holder 102 may be implemented as a handheld electronic device case (e.g., smartphone case) for holding an object 104 that is embodied as a smartphone or other handheld electronic device. Alternatively, other embodiments of the object holder 102 may be constructed in accordance with the principles of the present disclosure for holding and detachably mounting many other kinds of objects.

The object holder 102 is similar in most respects to the object holder 2, previously described. As such, corresponding structures are identified by corresponding reference numbers incremented by 100. Where the object holder 102 differs from the object holder is in the design of the vacuum release actuator 112 (and by extension the vacuum formation-and-release actuator 112/113). Specifically, the vacuum release actuator 112 (and by extension the vacuum formation-and-release actuator 112/113) is detachably mounted to object carrier 108, and in particular, to the outer side 110B of the object carrier base 110.

In the illustrated embodiment wherein the object holder 102 is a handheld electronic device case (e.g., smartphone case) and the object 104 is a handheld electronic device (e.g., smartphone), the object carrier 108 may be formed as a unitary device case main body that is operable to engage the device and provide a protective cover therefor. The object carrier base 110 may be formed as a main body base of the device case main body (object carrier 108) whose inner side 110A faces the handheld device (object 104) and whose outer side 110B faces the reference surface 106.

To facilitate its detachable mounting functionality, the vacuum release actuator 112 may be formed with the same flexible (e.g., flap-like) structure of the previously-described vacuum release actuator 12. However, instead of the vacuum release actuator 212 being integrally formed with the device case main body base (object carrier base 110), the vacuum release actuator is integrally formed with a discrete base 110' that is independent of the device case main body base (object carrier base 110) but is attachable thereto in opposing interfacial engagement therewith. Insofar as the device case main body base (object carrier base 110) is substantially planar, the base 110' may likewise be substantially planar. Alternatively, if the device case main body base (object carrier base 110) was non-planar, the base 110' could also be non-planar in order to maintain conformity with the shape of the device case main body base.

The base 110' is the portion of the universal vacuum connector 102 that detachably mounts to the outer side 110B of the device case main body base (object carrier base) 110. Such detachable mounting may be provided in any suitable manner, such as by way of adhesive bonding, magnetic attraction, hook-and-loop arrangements, mechanical fastening, or other techniques. For example, modern smartphones may include one or more built-in magnets or magnetically-attractive (e.g. ferromagnetic) elements for maintaining the device in positional registration with an inductive charger. In that case, the base 110' could include one or more magnetically-attractive (e.g., ferromagnetic) materials, or alternatively one or more magnetized (permanently or non-permanently) materials.

The vacuum release actuator 112 is defined by a discontinuity 115 in the base 110' that may be formed as a U-shaped slot (or slit). The discontinuity 115 is analogous to the discontinuity 15 in the previously-described object holder 2, except that instead of the vacuum release actuator 112 displacing relative to the handheld device (object 104), it displaces relative to both the base 110' and the outer side 110B of the object carrier base 110. This displacement and separation of the vacuum release actuator 112, which is in a direction that is normal to both the device case main body base (object carrier base 110) and the reference surface 106, is described in more detail below in connection with FIGS. 22-24.

By virtue of its flexible flap construction, the vacuum release actuator 112 may be thought of as being formed by a flexible portion the base 110', whereas the remainder of the base may be comparatively non-flexible. More specifically, the vacuum release actuator 112 may be thought of as representing a pivotable or bendable interior portion of the base 110' that pivots or bends relative to a periphery of the base 110'.

Although not shown in FIGS. 15-17, alternate embodiments could utilize other constructions to implement the vacuum release actuator 112. For example, the vacuum release actuator 112 need not be formed as a flap or other pivotable or bendable structure. It could, for example, be formed a linearly movable member, such as a disk. Such a linearly movable member could reside in an opening formed in the base 110', and could be movably attached thereto using a suitable flexible connector configuration. If such a vacuum release actuator 112 is integrally formed with the base 110', flexible connectors could be provided as living hinges. One such configuration is shown in FIGS. 29-30 (described in more detail below). If the vacuum release actuator 112 is not integrally formed with the base 110', other flexible mounting arrangements could be used.

In still other alternate embodiments, the vacuum release actuator 112 might not be a definitively-formed element at all. For example, if the base 110' is formed from a sufficiently flexible material, and if it is thin enough so that a central portion thereof can flex and displace out-of-plane relative to a peripheral edge portion thereof (i.e., normal to both the device case main body base (object carrier base 110) and the reference surface 106), the flexible and displaceable central portion could serve as the vacuum release actuator 112. One such configuration is shown in FIGS. 31-32 (described in more detail below).

Given the various ways that the vacuum-release-actuator 112 may be constructed with a base 110' and the vacuum release actuator 112 that can move either by way of flexing or without flexing, the term "movable" in this context will be understood to encompass both movement by flexing and movement without flexing.

FIGS. 15 and 16 depict the base 110', the vacuum release actuator 112 and the anchor member 113 detached from the device case main body base (object carrier base 110). FIG. 17 depicts the base 110', the vacuum release actuator 112 and the anchor member 113 attached to the device case main body base (object carrier base 110). Although the base 110', the vacuum release actuator 112 and the anchor member 113 are shown to be attached to a central interior location on the device case main body (object carrier base 110), other mounting locations could also be used.

As can be seen from FIG. 15, the vacuum formation-and-release actuator 112/113 has an inner side 112A/113A arranged to oppose the outer side 110B of the device case main body base (object carrier base 110) when the handheld device (object 4) is engaged by the device case main body (object carrier 108). As described in more detail below, this leads to the formation of an inner controlled pressure zone during use of the handheld device case (object holder 102). As can be seen from FIGS. 16 and 17, the vacuum forma-tion-and-release actuator 112/113 has an outer side 112B/113B arranged to oppose the reference surface 106 when the handheld device (object 104) is mounted thereto using the handheld device case (object holder 102). As described in more detail below, this leads to the formation of an outer controlled pressure zone during use of the handheld device case (object holder 102).

Figure 18:
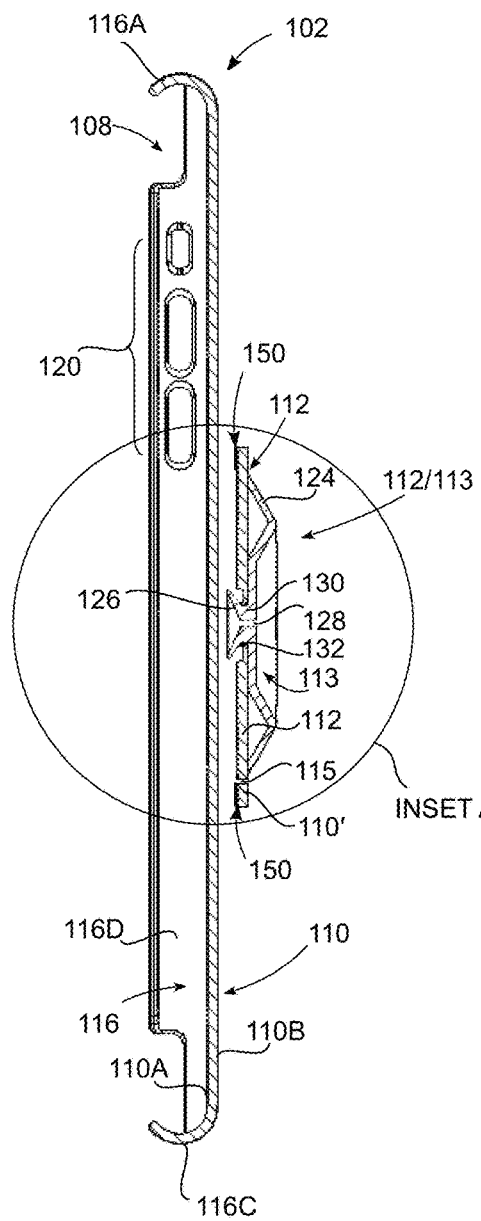
FIG. 18 is a vertical cross-sectional centerline view of the object holder of FIG. 15, with the object holder being detached from a detachably mountable vacuum formation-and-release actuator.
Figure 19:
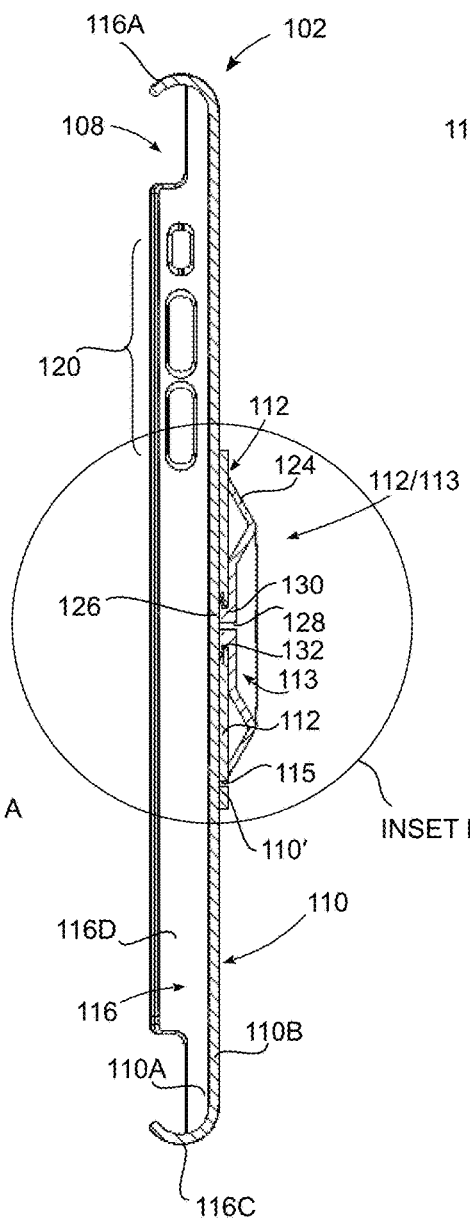
FIG. 19 is a vertical cross-sectional centerline view of the object holder of FIG. 15, with the object holder being attached to a detachably mountable vacuum formation-and-release actuator.

With additional reference now to FIGS. 18-19, FIG. 18 depicts the vacuum formation-and-release actuator 112/113 prior to being mounted to the device case main body base (object carrier base 110). FIG. 19 depicts the vacuum formation-and-release actuator 112/113 after being mounted to the device case main body base (object carrier base 110). As can be seen in both figures, the anchor member 113 of the vacuum formation-and-release actuator 112/113 may have the same configuration as the anchor member 13 of the previously-described vacuum formation-and-release actuator 12/13. The anchor member 113 thus may include a flexible outer seal member 124, a flexible inner seal member 126, an interconnecting vent port 128, and a central hub 130 disposed between the inner and outer seal members. The central hub 130 may be used to mount the anchor member 113 to the vacuum release actuator 112 of the vacuum release actuator 112. In particular, the central hub 130 of the anchor member 113 may be seated in a through-bore 132 formed in the vacuum release actuator 112. The through-bore 132 provides an actuator opening in the vacuum release actuator 112 that extends axially therethrough. In the illustrated embodiment, the anchor member 113, including the outer seal member 124, the inner seal member 126, and the central hub 130, may be formed of a flexible resilient material having an appropriate hardness and density. Silicone rubber represents one such material. Other resilient materials may also be used.

Figure 20:
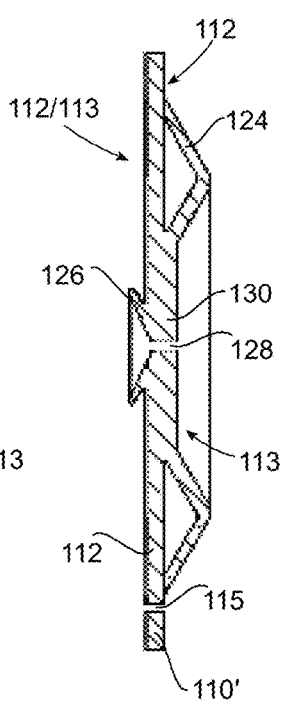
FIG. 20 is a vertical cross-sectional centerline view showing an alternative embodiment of a detachably mountable vacuum formation-and-release actuator.

In an alternate embodiment, instead of forming the anchor member 113 as a discrete component that is mounted to the vacuum release actuator 112, the anchor member could be integrally formed therewith to provide a unitary vacuum formation-and-release actuator 112/113. This is shown in FIG. 20. In that case, the central hub 130 of the anchor member 113 may be integrated with the structure that forms the vacuum release actuator 112. This means that the vacuum release actuator 112 and the anchor member 113 will be formed from the same material.

The vacuum formation-and-release actuator 112/113 is operable to establish a releasable vacuum connection directly between the outer side 110B of the device case main body base (object carrier base 110) and the reference surface 106. Because the device case main body base (object carrier base 110) is part of the device case main body (object carrier 108) that holds the handheld device (object 104), the device can be thereby detachably mounted to the reference surface 106.

The inner seal member 126 of the anchor member 113 is arranged to engage the outer side 110B of the device case main body base (object carrier base 110) and form a substantially airtight seal therewith. FIG. 18 depicts the inner seal member 26 in an initial undeformed state prior to the vacuum formation-and-release actuator 112/113 being attached to the device case main body base (object carrier base 110). As previously described, one of the ways that the vacuum formation-and-release actuator 112/113 can be attached to the device case main body base (object carrier base 110) is by adhering the base 110' that carries the vacuum release actuator 112 to the outer side 110B of the device case main body base (object carrier base 110) using a suitable attachment system 150, such as by way of fasteners (including hook and loop), adhesive bonding, magnetic attraction, or other techniques. An example attachment system 150 (which may be provided by an adhesive strip or magnetic elements) is shown in FIG. 18. FIG. 19 depicts depicts an example configuration of the inner seal member 126 after the vacuum formation-and-release actuator 112/113 is attached to the device case main body base (object carrier base 110). In this position, the inner seal member 126 is in a deformed somewhat flattened state.

Figure 23A:
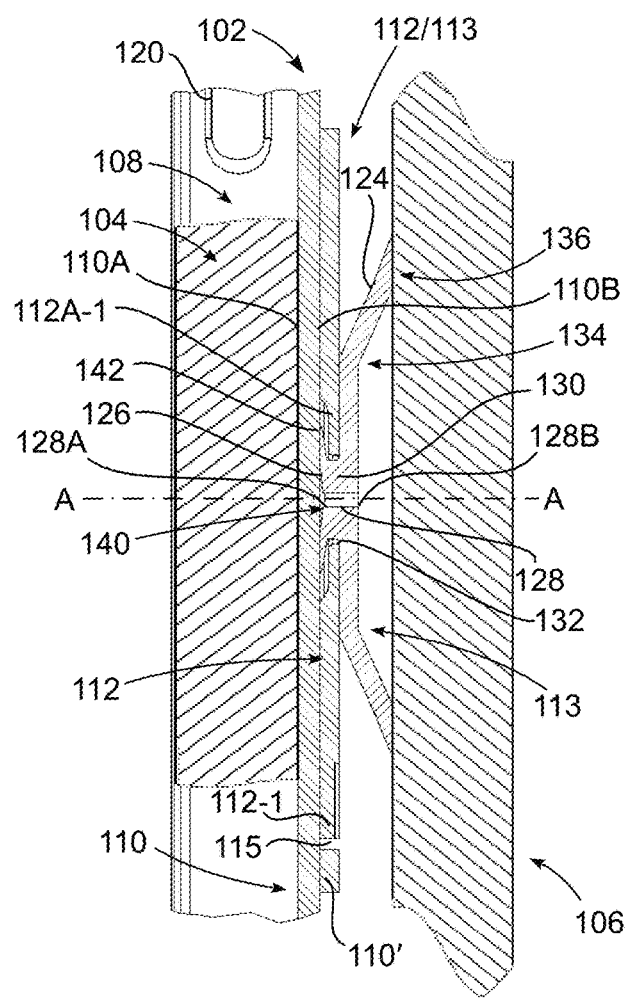
FIG. 23A is an enlarged vertical cross-sectional centerline view depicting the structure shown in Inset B of FIG. 19, showing a modified version of the object holder of FIG. 15 attached to a detachably mountable vacuum formation-and-release actuator and vacuum-mounted to a reference surface.
Figure 23:
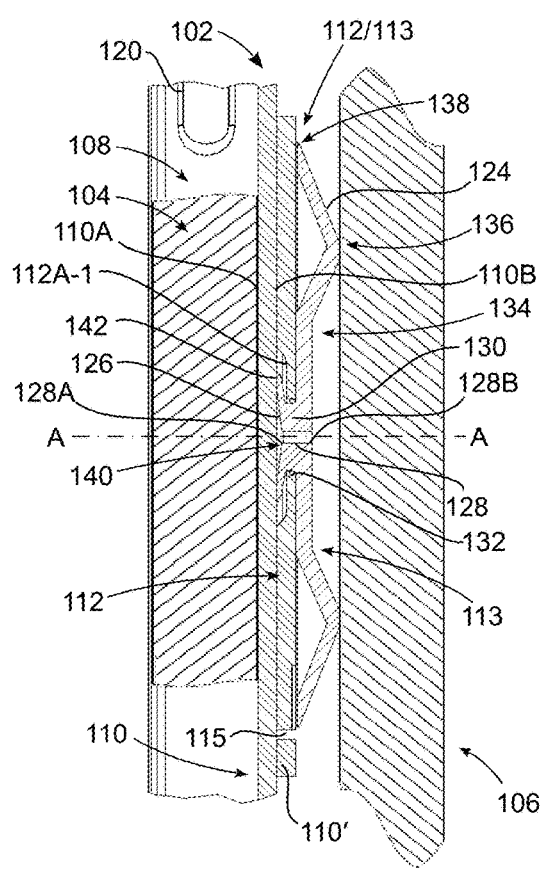
FIG. 23 is an enlarged vertical cross-sectional centerline view depicting the structure shown in Inset B of FIG. 19, showing the object holder of FIG. 15 attached to a detachably mountable vacuum formation-and-release actuator and vacuum-mounted to a reference surface.

FIGS. 21 and 22 provide enlarged views of the foregoing attachment arrangement, with FIG. 21 depicting the structure shown in Inset A of FIG. 18, and FIG. 22 depicting the structure shown in Inset B of FIG. 19. FIG. 23 depicts the handheld device case (object holder 102) during use thereof to mount the handheld device (object 104) to the reference surface 106. As shown therein, the inner seal member 126 of the anchor member 113 is configured to establish an inner controlled pressure zone 140 that represents the enclosed air-space region located between the inner seal member and the outer side 110B of the device case main body base (object carrier base 110). In the illustrated embodiment, the inner seal member 126 is shown as being cup-shaped, which allows the inner seal member to function as suction cup or a suction seal stabilizer, depending on the stiffness of the material and the axial force required to adhere it to the device case main body base (object carrier base 110). In alternate embodiments, the inner seal member 126 might not be cup-shaped, and could be substantially flat, even when the vacuum formation-and-release actuator 112/113 is not installed on the device case main body (object carrier 108). In the illustrated embodiment, the periphery of the inner controlled pressure zone 140 is defined by a circular ring of contact where an axially protruding outer rim 142 of the inner seal member 126 makes suction contact with the device case main body base (object carrier base 110).

If desired, a shallow circular pocket 112A-1 may be formed in the inner side 112A of the vacuum release actuator 112. The pocket 112A-1 is centered about the axial through-bore 132 formed in the vacuum release actuator 112 that seats the anchor member hub 130. The depth of the pocket 112A is selected so as to accommodate the inner seal member 126 as it becomes flattened by the device case main body base (object carrier base 110).

As shown in FIG. 22, and with additional reference to FIG. 23, the outer seal member 124 of the anchor member 113 is arranged to engage the reference surface 106 and form a substantially airtight seal therewith that defines an outer controlled pressure zone. The outer controlled pressure zone is shown in by reference number 134 in FIG. 23. FIG. 22 depicts the outer seal member 124 in an initial undeformed state prior to the handheld device case (object holder 102) being attached to the reference surface 106. FIG. 23 depicts an example configuration of the outer seal member 124 after the handheld device case (object holder 102) is mounted to the reference surface 106. In this position, the outer seal member 124 is in a deformed somewhat flattened state. The final mounted position of the handheld device case (object holder 102) may thus place the reference surface 106 closer to the hub 130 of the anchor member 113.

The outer controlled pressure zone 134 represents the enclosed air-space region located between the outer seal member 124 and the reference surface 106. In the illustrated embodiment the outer seal member 124 is shown as being cup-shaped, which allows the outer seal member to function as suction cup or a suction seal stabilizer, depending on the stiffness of the material and the axial force required to adhere it to the reference surface 106. In alternate embodiments, the outer seal member 126 might not be cup-shaped, and could be substantially flat, even when the handheld device case (object holder 102) is in an unmounted state.

As can be seen in FIG. 23, the periphery of the outer controlled pressure zone 134 may be defined by a circular ring of contact where an axially protruding medial rim 136 of the outer seal member 124 makes suction contact with the reference surface 106. As in the case of the previously-described anchor member 13, the medial rim 136 may be situated radially inboard from a circumferential outer edge 138 of the outer seal member 124. The outer edge 138 is axially offset from medial rim 136 so as to form an axially inverted radial outer cup configured so that the outer edge lies against, or in close proximity to, the outer surface of the vacuum release actuator 112.

Figure 20A:
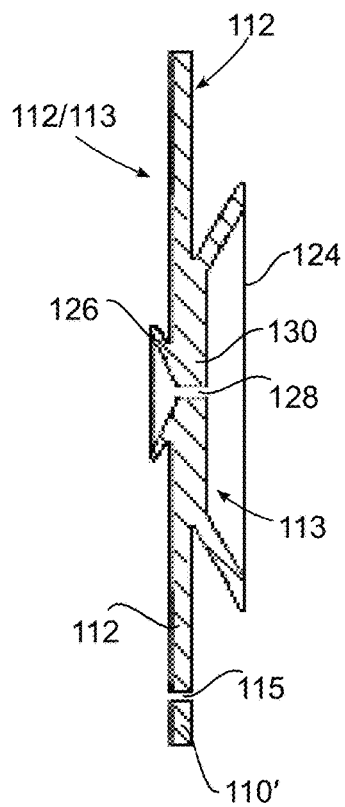
FIG. 20A is a vertical cross-sectional centerline view showing a modified version of the alternative detachably mountable vacuum formation-and-release actuator of FIG. 20.

Again, one practical advantage of forming the outer seal member 124 in this manner is to facilitate insertion of the handheld device case (object holder 2) into the pocket of a user. If the outer seal member 124 stopped at the medial rim 136, which is axially spaced from the outer surface of the vacuum release actuator 112, the rim could catch on the user's clothing. Notwithstanding this advantage, the outer seal member 124 may be formed without the outer radial section that extends from the medial rim 136 to the outer edge 138, such that the medial rim becomes the outer edge. This alternative construction is shown in FIG. 23A. A similar modification of the unitary vacuum formation-and-release actuator 112/113 of FIG. 20 is shown in FIG. 20A.

As can be seen in FIGS. 15 and 16, the vent port 128 of the anchor member 113 has an inner end 128A (FIG. 15) and an outer end 128B (FIG. 16). As can be seen in FIG. 23, the outer end 128B is in fluid communication with the outer controlled pressure zone 134 and the inner end 128A is in fluid communication with the inner controlled pressure zone 140. When the outer seal member 124 is in suction contact with the reference surface 106, and the inner seal member 126 is in suction contact with the device case main body base (object carrier base 110), the interconnecting vent port 128 provides an air pathway between the outer controlled pressure zone 134 and the inner controlled pressure zone 140, and thereby facilitates fluid communication between the inner and outer controlled pressure zones. The vent port 128 equalizes the air pressure in the two controlled pressure zones 134/140 and establishes a single composite controlled pressure zone formed by a combination of the vacuum formation-and-release actuator (including the outer seal member 124, the inner seal member 126 and the vent port 128 thereof), the reference surface 106, and the outer side 110B of the device case main body base (object carrier base 110). This composite controlled pressure zone establishes a releasable vacuum connection directly between the device case main body base (object carrier base 110) and the reference surface 106 in order to detachably mount the handheld device (object 104) to the reference surface. The composite controlled pressure zone maintains a negative pressure differential relative to an external ambient pressure.

The releasable vacuum connection is releasable by virtue of the vacuum formation-and-release actuator 112/113 being movable relative to the outer side 110B of the device case main body base (object carrier base 110) in a manner that vents the composite controlled pressure zone. During such venting, the device case main body base and the peripheral rim 116 (object holding elements 116A-D) of the case main body (object carrier 108) remain immovably engaged with the handheld device (object 104). In particular, the composite controlled pressure zone can be vented by manipulating the device case main body (object carrier 108) away from the reference surface 106 to separate the outer side 110B of the device case main body base (object carrier base 110) from the vacuum formation-and-release actuator 112/13 until the inner seal member 126 breaks its substantially airtight seal with the device case main body base.

Notwithstanding the equalization of air pressure provided by the vent port 128 between the outer controlled pressure zone 134 and the inner controlled pressure zone 140, the suction force generated by the outer seal member 124 against the reference surface 106 will be significantly larger than the suction force generated by the inner seal member 126 against the outer side 110B of the device case main body base (object carrier base 110). As in the case of the previously-described anchor member 13, this is because the area of the outer seal member 124 that lies within its medial rim 136 is substantially larger than the area of the inner seal member 126 that lies within its outer rim 142. As will now be described in connection with FIGS. 24-26, this suction force differential dictates the operational characteristics of the handheld device case (object holder 2).

Figure 24:
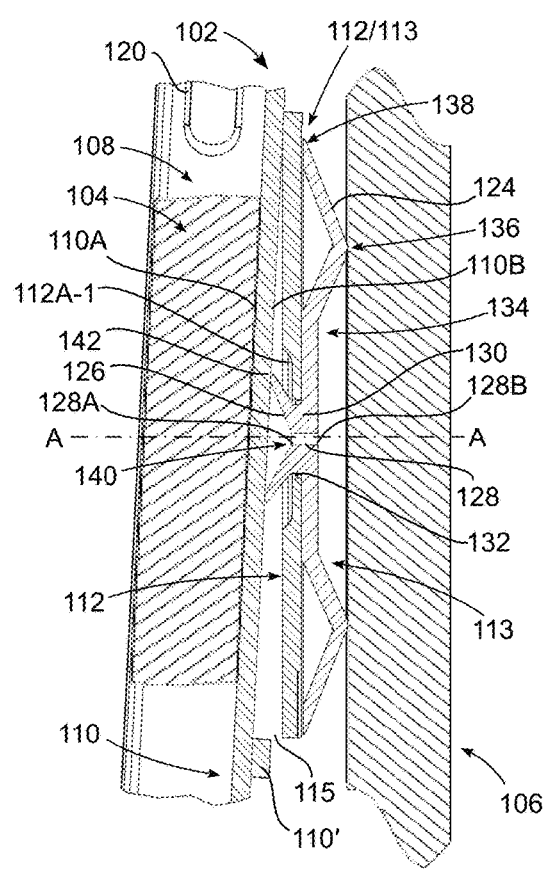
FIG. 24 is an enlarged vertical cross-sectional centerline view depicting the structure shown in Inset B of FIG. 19, showing the object holder of FIG. 15 attached to a detachably mountable vacuum formation-and-release actuator and vacuum-mounted to a reference surface, and with object holder being in an initial state of unmounting from the reference surface.

When it is desired to detach the handheld device case (object holder 102) from the reference surface 106, the device case main body (object carrier 108) can be grasped and maneuvered away from the reference surface. Doing so will displace the vacuum release actuator 112 relative to the base 110' while the latter structure remains immovably engaged with the device case main body base (object carrier base 110). The displacement of the vacuum release actuator 112 results from the strong suction force between the outer seal member 124 and the reference surface 106. This suction force acts on the anchor member 113, and therefore also acts on the vacuum release actuator 112 to which the anchor member is mounted. Because the vacuum release actuator 112 is displaceable relative to the actuator's base 110', and therefore with respect to the device case main body base (object carrier base 110), the device case main body base can move away from the reference surface 106. As this occurs, the vacuum release actuator 112 does not move appreciably away from the reference surface 106 due to the outer seal member 124 of the anchor member 113 remaining adhered thereto. The outer seal member 124 may deform slightly, but will nonetheless tend to remain attached to the reference surface 106. In the illustrated embodiment wherein the vacuum release actuator 112 is formed as a flexible flap, the resultant displacement of the vacuum release actuator relative to the base 110' and the device case main body base (object carrier base 110) is depicted in FIG. 24 as a slight out-of-plane bending or pivoting of the vacuum release actuator. Notwithstanding such displacement, the inner seal member 126 will deform but nonetheless tend to remain attached to the outer side 110B of the device case main body base (object carrier base 110), so long as the suction force between the inner seal member and the device case main body base is not exceeded.

FIG. 25 depicts a further point in the detachment process in which the device case main body (object carrier 108) has been maneuvered further away from the reference surface 106. In particular, the device case main body (object carrier 108) has been displaced to the point where the suction force between the inner seal member 126 and the device case main body base (object carrier base 110) is exceeded. When this occurs, the inner seal member 126 breaks its substantially airtight seal with the outer side 110B of the device case main body base (object carrier base 110). This vents the inner controlled pressure zone 140, which in turn vents the outer controlled pressure zone 134 through the interconnecting vent port 128. As a result, the negative differential pressure previously established in the outer controlled pressure zone 134 is lost, and the suction force between the outer seal member 124 and the reference surface 106 is released. As shown in FIG. 26, the handheld device case (object holder 102) will now easily separate from the reference surface 106 without discernible resistance. At the same time, the vacuum release actuator 112 will return to its default position wherein it is coplanar with the base 110'. This will result in the inner seal member 126 of the anchor member 113 re-engaging with the outer side 110B of the device case main body base (object carrier base 110).

The handheld device case (object 102) may be remounted to the reference surface 106 at any time thereafter, or may be mounted to any other reference surface to which it is desired to mount the handheld device (object 104).

Figure 27:
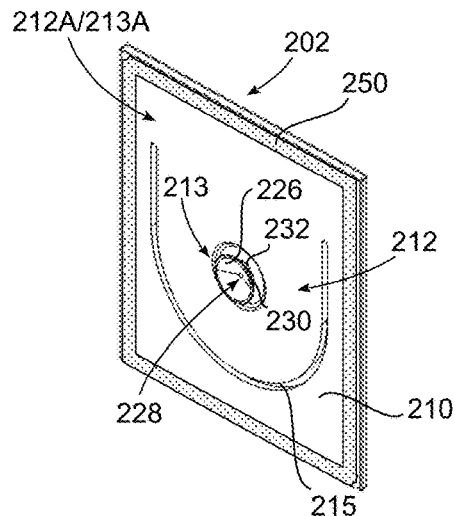
FIG. 27 is a front perspective view showing an example embodiment of a universal quick-release vacuum connector.
Figure 28:
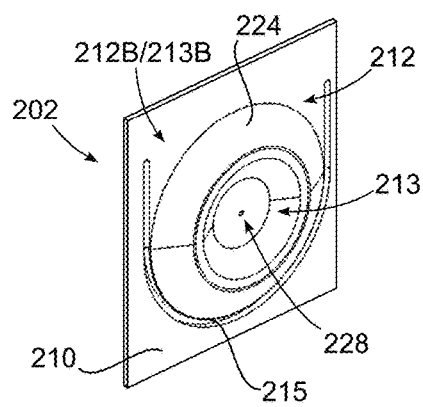
FIG. 28 is a rear perspective view of the universal vacuum connector of FIG. 27.

Alternatively, in a further embodiment, the vacuum formation-and-release actuator 112/113 (together with the base 110') may be detached from the device case main body base (object carrier base 110) and used as a universal quick-release vacuum connector for vacuum-mounting any object that a user wishes to attach to a reference surface. FIGS. 27-28 are illustrative. In this embodiment, the universal quick-release vacuum connector is identified by reference number 202. The universal vacuum connector 202 consists primarily of a substantially planar (or non-planar) base 210 and a vacuum formation-and-release actuator 212/213 that may be constructed in the same manner as the previously-described vacuum formation-and-release actuator 112/113. Alternatively, as described in more detail below in connection with embodiments shown in FIGS. 29-30 and 31-32, universal vacuum connectors having other configurations may also be constructed. Indeed, the previously-described object carriers 2 and 102, each with a respective base 10/110 carrying respective vacuum formation-and-release actuators 12/13 and 112/113, may themselves be considered as universal vacuum connectors for vacuum mounting objects (such as handheld electronic devices) to reference surfaces.

Figure 33:
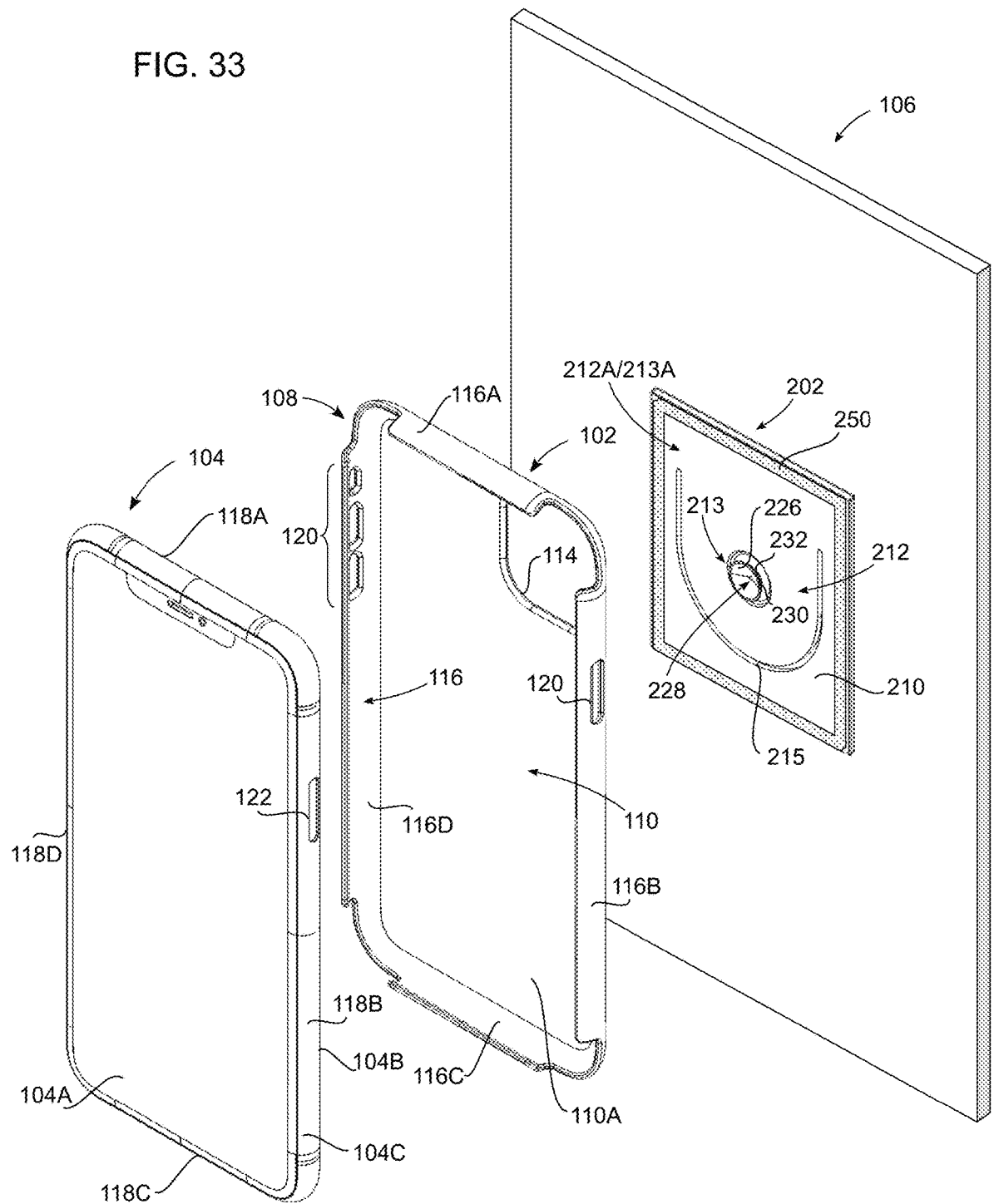
FIG. 33 is an exploded front perspective view an example embodiment of the universal vacuum connector of FIG. 27 arranged for detachable mounting to an object in order to vacuum mount the object to a reference surface.
Figure 34:
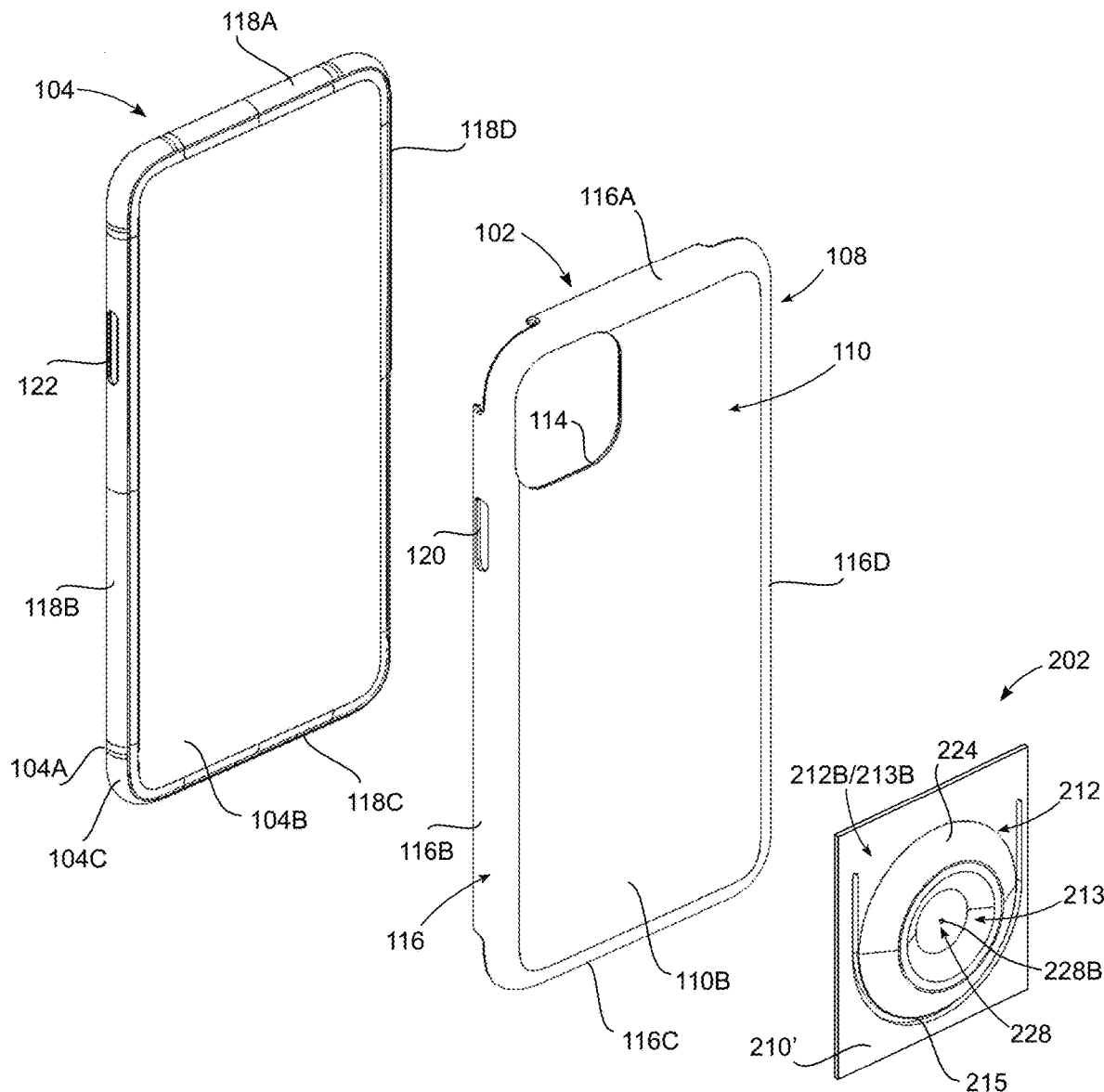
FIG. 34 is an exploded rear perspective view showing the universal vacuum connector of FIG. 27 arranged for detachable mounting to an object.
Figure 35:
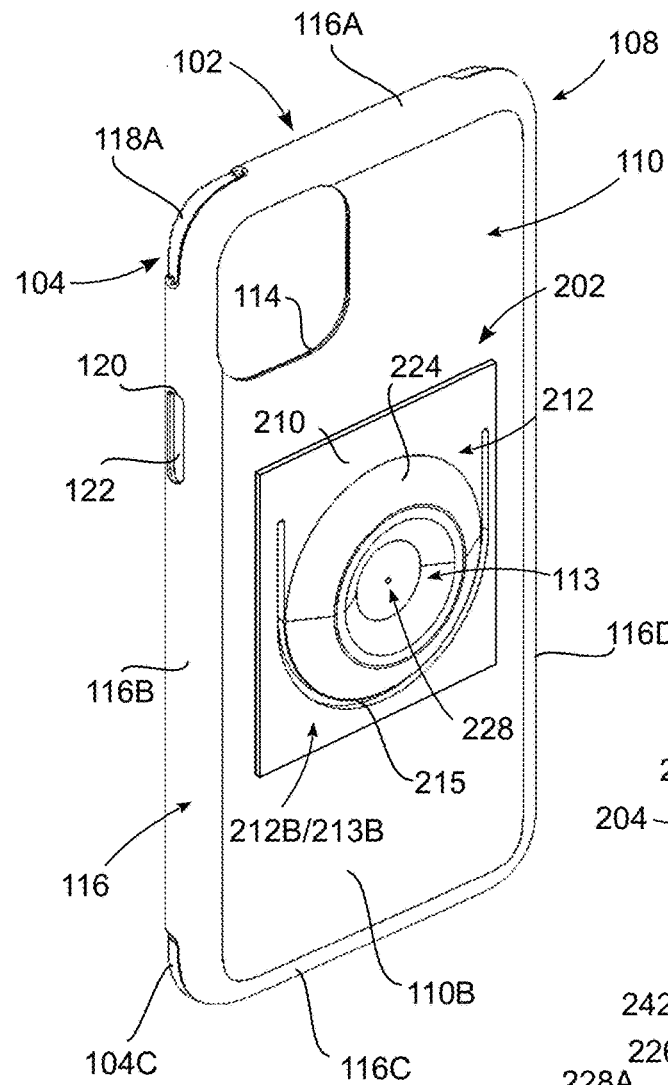
FIG. 35 is a rear perspective view showing the universal vacuum connector of FIG. 27 detachably mounted to an object.

As noted, the universal vacuum connector 202 of FIGS. 27-28 primarily comprises a base 210 and a vacuum formation-and-release actuator 212/213. The base 210 corresponds to the previously-described base 110' of FIGS. 15-17, and may likewise be equated with the previously-described object carrier base 10 of FIGS. 1-4. The vacuum formation-and-release actuator 212/213 may be constructed in the same manner as the previously-described vacuum formation-and-release actuators 12/13 of FIGS. 1-4 and 112/113 of FIGS. 15-17. These construction similarities are indicated by the use of corresponding reference numbers (incremented to lie within the 200-300 numeric range) to represent like structural elements. Thus, the vacuum formation-and-release actuator 212/213 includes a vacuum release actuator 212 and an anchor member 213, and is configured with an inner side 212A/213A and an outer side 212B/213B. As shown in FIGS. 33-35, the base 210 is attachable to the previously-described handheld device case (object holder 102) (or to the handheld device (object 104) itself, or any other object) in order to vacuum mount the handheld device case (or the handheld device or other object), to the reference surface 106. The vacuum release actuator 212 is movable relative to the base 210.

As shown in FIGS. 27 and 33, an attachment system 250 may be provided on the base 210. As one example of an attachment system 250, a quantity of adhesive may be provided on the base 210 by affixing thereto one or more adhesive strips or the like. The adhesive may be placed entirely (or partially) around a peripheral region of the base 210. If the adhesive is provided by way of adhesive strips, a peelable backing (not shown) may be used to protect the adhesive prior to attachment of the base 210 to the handheld device case (object holder 102) (or to the handheld device (object 204) or any other object). By incorporating the attachment system 250 as part of the base 210 (e.g., as affixed adhesive elements or materials), the universal vacuum connector 202 will be self-attachable to any object without the need for separately-provided mounting materials, components or devices. It will be appreciated that alternative self-attachment materials or devices may be used to provide the attachment system 250 on the base 210, such as by affixing to the base magnets or magnetically-attractive materials, hook-and-loop system components, traditional mechanical fasteners made from metal or plastic, such as screws, bolts, rivets and other rigid connectors, etc.

The vacuum release actuator 212 is defined by a discontinuity 215 in the base 210 that may be formed as a U-shaped slot (or slit). The discontinuity 215 is analogous to the discontinuities 15 and 115 in the previously-described object holders 2 and 102. By virtue of its flexible flap construction, the vacuum release actuator 212 may be thought of as being formed by a flexible portion the base 210, whereas the remainder of the base may be comparatively non-flexible. More specifically, the vacuum release actuator 112 may be thought of as representing a pivotable or bendable interior portion of the base 110 that pivots or bends relative to a peripheral portion of the base.

FIGS. 29-30 illustrate an alternate universal vacuum connector 302 that utilizes a different construction to implement the connector's vacuum release actuator 312. In this embodiment, the vacuum release actuator 312 is not be formed as a flap or other pivotable or bendable structure. Instead, the vacuum release actuator 312 is formed as a linearly displaceable member, namely a circular disk. The linearly displaceable vacuum release actuator 312 resides in an opening 352 formed in a substantially planar (or non-planar) base 310 of the universal vacuum connector 302, and is movably attached thereto using a flexible connector configuration that includes several flexible connectors 354. In the illustrated embodiment, the vacuum release actuator 312 is integrally formed with the base 310 and the flexible connectors 354 are formed as living hinges. In an alternate embodiment (not shown), the vacuum release actuator 312 might not be integrally formed with the base 310, and could instead be formed as a discrete component. In that case, other mounting arrangements could be used, such as discrete connectors that operate analogously to the integral connectors 354.

A further feature of the universal connector 302 of FIGS. 29-30 is that the shape of the base 310 is round instead of rectangular. Other shapes could also be used. It will be further seen that the universal vacuum connector 302 includes an attachment system 350 that may be provided as an adhesive material (or other self-attachment materials or devices) on the inner side of the base 310. The universal vacuum connector 302 may thus be mounted to an object (such as the handheld device case (object 104 of FIGS. 33-35) (or any other object) in the same manner as the universal vacuum connector 202 described above.

FIGS. 31-32 illustrate another alternate universal vacuum connector 402 that utilizes a different construction to implement the connector's vacuum release actuator 412. In this embodiment, the base 410, which may be substantially planar (or non-planar) is only partially shown to illustrate an interior region thereof surrounds the vacuum release actuator 412. Although not shown, it will be understood that the base 410 may have any desired configuration in the non-visible region thereof that extends beyond the interior region shown in FIGS. 31-32, including but not limited to as a case or holder for the handheld device (object 104) shown in FIGS. 33-35 (or any other object). The vacuum release actuator 412 is itself embodied as a non-definitive element. Rather, the base 410 is formed from a flexible material, and is thin enough so that an interior portion thereof can flex and displace out-of-plane relative to a peripheral portion thereof. This flexible and displaceable interior portion of the base 410 serves as the vacuum release actuator 412 of the universal vacuum connector 402.

Returning now to FIGS. 27-28, the anchor member 213 of the universal vacuum connector 202 includes a flexible outer seal member 224, a flexible inner seal member 226, and an interconnecting vent port 228 extending through a central hub 230 disposed between the inner and outer seal members. As in the case of previous embodiments, the central hub 230 may be used to mount the anchor member 213 to the vacuum release actuator 212 of the universal vacuum connector 202. In particular, the central hub 230 of the anchor member 213 may be seated in a through-bore 232 formed in the vacuum release actuator 212. The through-bore 232 provides an actuator opening in the vacuum release actuator 212 that extends axially therethrough. The outer seal member 224 surrounds the vent port 228 on the outer side 212B of the vacuum release actuator 212. The inner seal member 226 surrounds the vent port 228 on the inner side 212A of the vacuum release actuator 212. The anchor member 113, including the outer seal member 224, the inner seal member 226, and the central hub 230, may be formed of a flexible resilient material having an appropriate hardness and density. Silicone rubber represents one such material. Other resilient materials may also be used.

As in the case of previous embodiments, the flexible outer seal member 224 and the flexible inner seal member 226 may be at least partially frustoconical in shape (e.g., cup-shaped). As additionally shown in FIG. 36, the outer seal member 224 may include an inner frustoconical portion that opens radially and axially away from the central hub 230 to a medial rim 236, and an outer frustoconical section that extends from the medial rim 236 to a peripheral rim 238, opening radially away from the hub and axially toward the hub. The peripheral rim 238 may be disposed in contact with, or in close proximity to, the base 210. In alternate embodiments, one or both of the outer seal member 224 and the inner seal member 226 might not be cup-shaped, and could be substantially flat, even when the universal vacuum connector 202 is not installed on the object 104 or mounted to the reference surface 106.

The universal vacuum connectors 302 and 402 respectively shown in FIGS. 29-30 and 31-32 may utilize anchor members 313 and 413 of corresponding construction and materials. The anchor member 313 of FIGS. 29-30 may thus include a flexible outer seal member 324, a flexible inner seal member 326, and an interconnecting vent port 328 extending through a central hub 330 disposed between the inner and outer seal members that seats in a through-bore 332 formed in the vacuum release actuator 312. Likewise, the anchor member 413 of FIGS. 31-32 may include a flexible outer seal member 424, a flexible inner seal member 426, and an interconnecting vent port 428 extending through a central hub 430 disposed between the inner and outer seal members that seats in a through-bore 432 formed in the vacuum release actuator 412.

Although not shown, each of the anchor members 213, 313 and 413 could be integrally formed with its respective vacuum release actuator 212, 312 and 412 to provide a unitary vacuum formation-and-release actuator 212/213, 312/313 and 412/413, respectively. An example of such an integrated construction is shown in FIG. 20, previously discussed. In that case, the central hubs 230, 330 and 430 of the anchor members 213, 313 and 413 may be respectively integrated with the structures that form the vacuum release actuator 212, 312 and 412 of the universal vacuum connectors 202, 302 and 402. This means that the vacuum release actuators 212, 312 and 412, and the anchor members 213, 313 and 413 will be respectively formed from the same material.

Returning now to the universal vacuum connector 202 of FIGS. 27-28, and with additional reference to FIGS. 33-35, all that is required in order to render the handheld device (object 104) vacuum-mountable is to removably attach the base 210 of the universal vacuum connector to a suitable surface of the handheld device case (object holder 102) (e.g., a surface that is smooth and flat, such as the outer side 110B of the device case main body base (object carrier base 110). Alternatively, if the handheld device (object 104) is used without the handheld device case (object holder 102), the base 210 of the universal vacuum connector 202 could be directly mounted to a suitable surface of the device (e.g., a surface that is smooth and flat, such as the rear major surface 104B of the device. In either case, the handheld device (object 104) is then ready to vacuum-mount to the reference surface 106 by pressing the outer seal member 224 of the anchor member 213 against the reference surface, deforming the outer seal member to a flattened condition if it is cup shaped, then releasing the object.

Figure 36:
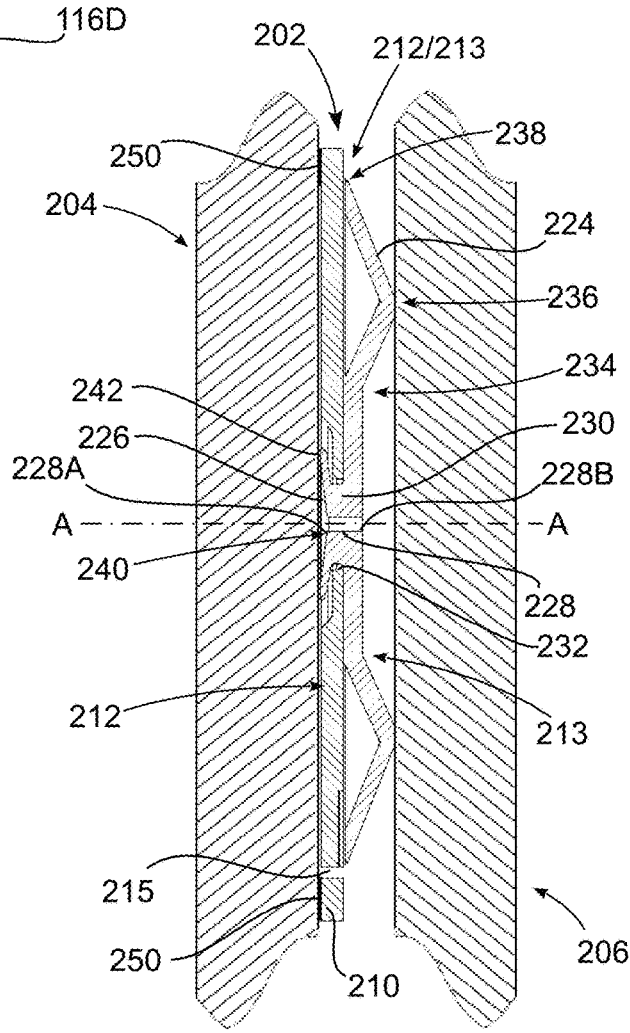
FIG. 36 is an enlarged vertical cross-sectional centerline view depicting the universal vacuum connector of FIG. 27 detachably mounted to an object and vacuum-mounting the object to a reference surface.

FIG. 36 depicts the universal vacuum connector 202 mounting an object 204 to a reference surface 206. The object 204 is shown generically to indicate that it could represent the handheld device case (object holder 102), the handheld electronic device (object 104), or any other object. The reference surface 206 could represent any type of surface to which the object 204 is to be mounted. The universal vacuum connector 202 establishes a sealed composite controlled pressure zone formed by a combination if the vacuum formation-and-release actuator 212/213, the object 204, and the reference surface 206. This composite controlled pressure zone establishes a releasable vacuum connection directly between the object 204 and the reference surface 206 in order to detachably mount the object to the reference surface. The composite controlled pressure zone maintains a negative pressure differential relative to an external ambient pressure.

The composite controlled pressure zone consists of (1) an outer controlled pressure zone 234, (2) an inner controlled pressure zone 240, and (3) the vent port 228. As in the case of previous embodiments, the outer controlled pressure zone 234 is established by a substantially airtight seal formed between the outer seal member 224 and the reference surface 206, and represents the region located between the outer seal member and the reference surface. The periphery of the outer controlled pressure zone 234 is defined by a circular ring of contact where the medial rim 236 of the outer seal member 224 makes suction contact with the reference surface 206.

The inner controlled pressure zone 240 is established by a substantially airtight seal formed between the inner seal member 226 and the object 206, and represents the region located between the inner seal member and the object. The periphery of the inner controlled pressure zone 240 is defined by a circular ring of contact where an axially protruding outer rim 242 of the inner seal member 226 makes suction contact with the object 204. The vent port 228 extends between the inner and outer seal members within the central hub 228 disposed in the actuator opening 232, so as to facilitate fluid communication between the outer controlled pressure zone and the inner controlled pressure zone. The vent port includes an inner end 238A in fluid communication with the inner controlled pressure zone 240, and an outer end 238B in fluid communication with the outer controlled pressure zone 234.

As in the case of previous embodiments, the releasable vacuum connection provided by the composite controlled pressure zone is releasable by virtue of the vacuum release actuator 212 being movable relative to the object 204 in a manner that vents the composite controlled pressure zone. In particular, the composite controlled pressure zone can be vented by manipulating the object 204 away from the reference surface 206 to separate the object from the vacuum release actuator 212 until the inner seal member 226 breaks its substantially airtight seal with the object. During such venting, the base 210 remains immovably engaged with the object 204.

Advantageously, the object 204 will remain vacuum-mounted to the reference surface 206 until the composite controlled pressure zone is vented by pulling the object away from the reference surface in the manner describe above. The object 204 may thereafter be remounted to the reference surface 206 at any time thereafter, or may be mounted to any other reference surface to which it is desired to mount the object. Alternatively, the universal vacuum connector 202 may be detached from the object 204 and used for vacuum-mounting any object that a user wishes to attach to a reference surface.

Figure 37:
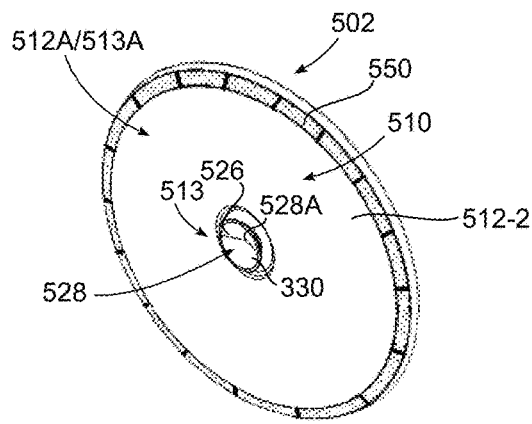
FIG. 37 is a front perspective view showing an example embodiment of a universal quick-release vacuum connector.
Figure 38:
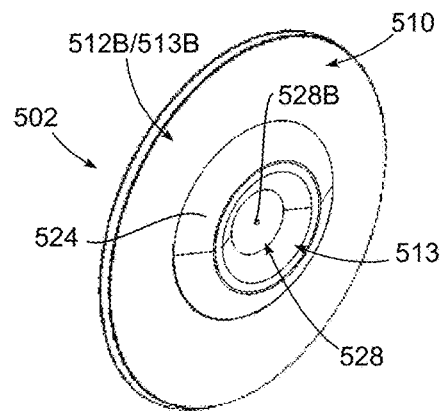
FIG. 38 is a rear perspective view of the universal vacuum connector of FIG. 37.

Turning now to FIGS. 37-38, another universal quick-release vacuum connector 502 is shown for vacuum mounting any object that a user wishes to attach to a reference surface. The universal vacuum connector 502 is constructed somewhat differently than the previously-described vacuum formation-and-release actuators 212/213 of FIGS. 27-28, 312/313 of FIGS. 29-30, and 412/413 of FIGS. 31-32. In particular, as will be described in more detail below, the universal vacuum connector 502 includes a substantially planar (or non-planar) base 510 and an anchor member 513, but no vacuum release actuator that is distinct from the anchor member itself. Instead, the anchor member 513 is directly connected to the base 510 in a slidable manner so that these components are axially movable relative to each other. The anchor member 513 thus functions as both an anchor member and a vacuum release actuator, such that it may be referred as not only an anchor member, but as a vacuum formation-and-release actuator 512/513.

The vacuum-formation-and-release actuator 512/513 is configured with an inner side 512A/513A and an outer side 512B/513B. The base 510 is attachable to an object in order to mount the universal vacuum connector 502 to the object. An attachment system 550 may be provided on the base 510 by affixing an attachment device or material on the inner side of the base. In FIG. 37, the attachment system 550 may be provided by a set of one or more magnets or magnetically-attractive materials placed entirely (or partially) around a peripheral region of the base 510. By incorporating the attachment system 550 as an integral part of the base 510 (e.g., as pre-affixed magnets or magnetically-attractive materials), the universal vacuum connector 502 will be self-attachable to any object without the need for separately-provided mounting materials, components or devices. It will be appreciated that alternative self-attachment materials or devices may also provided on base 510, including but not limited to affixing thereto adhesive materials, hook-and-loop system components, traditional mechanical fasteners made from metal or plastic, such as screws, bolts, rivets and other rigid connectors, etc.

It should be further understood that the illustrated embodiment could be modified so that the base 510 is formed as an integral portion of a handheld device case, such as the device case 102 described above in connection with FIGS. 15-17. In such an embodiment, the base 510 would form part of the device case main body base (object carrier base 110), and the anchor member 513 would move axially relative to the device case. The attachment system 550 of the universal vacuum connector 502 could be provided by the attachment elements of the device case 102 that engage the handheld electronic device 104. As shown in FIGS. 15-17, for the device case 102, such elements would include the object-holding elements 116A-D on the device case's peripheral rim 116 that respectively engage the side edges 118A-D of the handheld electronic device 104 while the inner side 110A of the object carrier base 110 faces (and engages) the handheld device, namely, the outer side 110B thereof that faces the reference surface 106.

Figure 39:
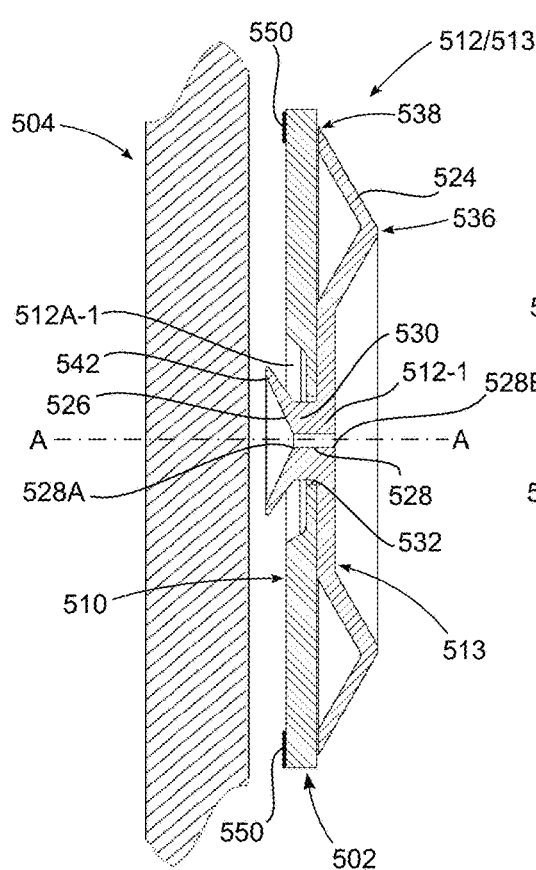
FIG. 39 is an enlarged vertical cross-sectional centerline view depicting the universal vacuum connector of FIG. 37 detachably mounted to an object.

As noted above, the anchor member 513 is mounted to the base 510 so that these components are linearly movable relative to each other in the axial direction (i.e., along the axis A-A shown in FIG. 39). In particular, the central hub 530 of the anchor member 513 may be seated in a through-bore 532 (see FIG. 39) formed in the base 510 of the vacuum release actuator 512. The through-bore 532 provides an actuator opening in the base 510 that extends axially therethrough. The central hub 530 is configured to slide axially within the through-bore 532 for an appreciable distance that is sufficient to allow the anchor member 513 to displace relative to the base 510 between a controlled pressure zone sealing position and a controlled pressure zone venting position, while the base remains attached to the object 504. To provide such axial displacement capability, the anchor member 513 may be constructed substantially in accordance with the counterpart anchor members 13, 113, 213, 313 and 413 of previous embodiments, except that the central hub 530 can be made axially longer than the central hubs 30, 130, 230, 330 and 430 of the counterpart anchor members. Similarities between the anchor member 513 and the counterpart anchor members 13, 113, 213, 313 and 413 are shown by the use of corresponding reference numbers respectively incremented to lie within the 500-600 numeric range.

FIG. 39 depicts the universal vacuum connector 502 prior to being mounted to an object 504 (e.g., a handheld electronic device, a handheld device case, or any other type of object). It will be seen that the central hub 530 of the anchor member 513 resides in the through-bore 532 of the base 510, centered on the central axis A-A of the universal vacuum connector 502. The inner seal member 526 of the anchor member 513 faces the object 504 in an initial undeformed state. A shallow circular pocket 512A-1 may be formed in the inner side of the base 510. The pocket 512A-1 is centered about the axial through-bore 532 that seats the anchor member hub 530. The depth of the pocket 512A-1 is selected so as to accommodate the inner seal member 526 as it becomes flattened by the object 504 when it is mounted to the universal vacuum connector 502. Such flattening is shown in FIG. 40, which depicts the universal vacuum connector 502 following attachment thereof to the object 504 using the attachment system 550, but prior to the universal vacuum connector being mounted to a reference surface 506.

Figure 40:
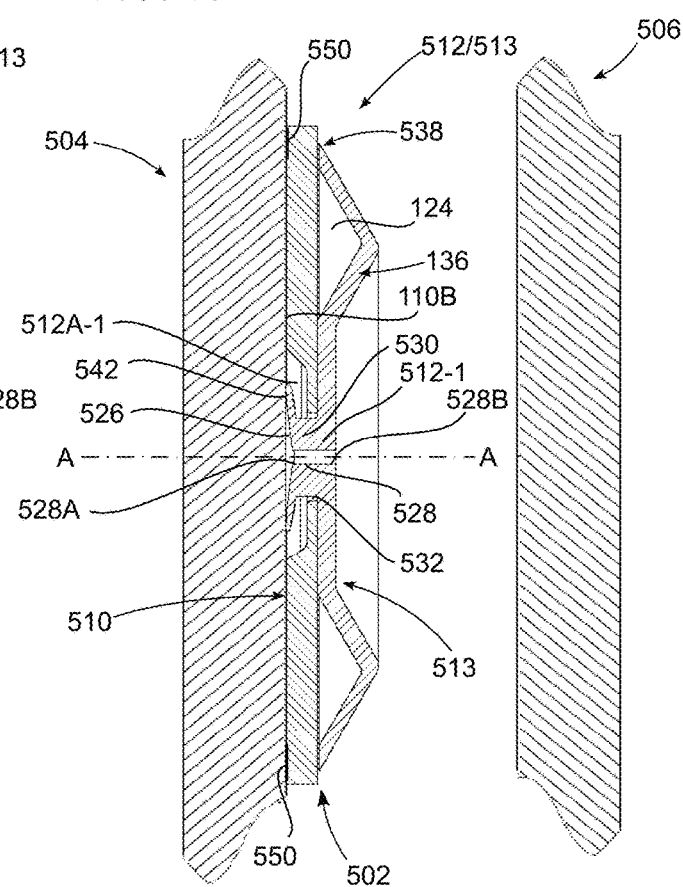
FIG. 40 is an enlarged vertical cross-sectional centerline view depicting the universal vacuum connector of FIG. 37 detachably mounted to an object and ready to be vacuum-mounted to a reference surface.

In FIG. 40, the inner seal member 526 of the anchor member 513 is arranged to engage the object 504 and form a substantially airtight seal therewith. In this position, the inner seal member 526 is in a deformed somewhat flattened state and disposed within the circular pocket 512A-1 formed in the base 510.

FIG. 41 depicts the universal vacuum connector 502 during use thereof to mount the object 504 to the reference surface 506. As shown therein, the inner seal member 526 of the anchor member 513 is configured to establish an inner controlled pressure zone 540 that represents the enclosed air-space region located between the inner seal member and the outer side of the object. In the illustrated embodiment, the inner seal member 526 is shown as being cup-shaped, which allows the inner seal member to function as suction cup or a suction seal stabilizer, depending on the stiffness of the material and the axial force required to adhere it to the object 504. In alternate embodiments, the inner seal member 526 might not be cup-shaped, and could be substantially flat, even when the universal vacuum connector 502 is not installed on the object 504. In the illustrated embodiment, the periphery of the inner controlled pressure zone 540 is defined by a circular ring of contact where an axially protruding outer rim 542 of the inner seal member 526 makes suction contact with the object 504.

As shown in FIG. 40, and as further depicted in FIG. 41, the outer seal member 524 of the anchor member 513 is arranged to engage the reference surface 506 and form a substantially airtight seal therewith that defines an outer controlled pressure zone. The outer controlled pressure zone is shown in by reference number 534 in FIG. 41. FIG. 40 depicts the outer seal member 524 in an initial undeformed state prior to the object 504 being attached to the reference surface 506. FIG. 41 depicts an example configuration of the outer seal member 524 after the object 504 is mounted to the reference surface 506. In this position, the outer seal member 524 is in a deformed somewhat flattened state. The final mounted position of the universal vacuum connector 502 may thus place the reference surface 506 closer to the hub 530 of the anchor member 513.

The outer controlled pressure zone 534 represents the enclosed air-space region located between the outer seal member 524 and the reference surface 506. In the illustrated embodiment, the outer seal member 524 is shown as being cup-shaped, which allows the outer seal member to function as suction cup or a suction seal stabilizer, depending on the stiffness of the material and the axial force required to adhere it to the reference surface 506. In alternate embodiments, the outer seal member 526 might not be cup-shaped, and could be substantially flat, even when the object 502 is in an unmounted state.

As can be seen in FIG. 41, the periphery of the outer controlled pressure zone 534 is defined by a circular ring of contact where an axially protruding medial rim 536 of the outer seal member 524 makes suction contact with the reference surface 506. As in the case of previously-described anchor member embodiments, the medial rim 536 may be situated radially inboard from a circumferential outer edge 538 of the outer seal member 524. The outer edge 538 is axially offset from medial rim 536 so as to form an axially inverted radial outer cup configured so that the outer edge lies against, or in close proximity to, the outer surface of the vacuum release actuator 512.

Again, one practical advantage of forming the outer seal member 524 in this manner is to facilitate insertion of the object 4 into the pocket of a user. If the outer seal member 524 stopped at the medial rim 536, which is axially spaced from the outer surface of the vacuum release actuator 512, the rim could catch on the user's clothing. Notwithstand this advantage, the outer seal member 524 may be formed without the outer radial section that extends from the medial rim 536 to the outer edge 538, such that the medial rim becomes the outer edge. This alternative construction is shown in FIG. 41A.

As can be seen in FIGS. 37 and 38, the vent port 528 has an inner end 528A (FIG. 37) and an outer end 528B (FIG. 38). As can be seen in FIG. 41, the outer end 528B is in fluid communication with the outer controlled pressure zone 534 and the inner end 528A is in fluid communication with the inner controlled pressure zone 540. When the outer seal member 524 is in suction contact with the reference surface 506, and the inner seal member 526 is in suction contact with the object 504, the interconnecting vent port 528 provides an air pathway between the outer controlled pressure zone 534 and the inner controlled pressure zone 540, and thereby facilitates fluid communication between the inner and outer controlled pressure zones. The vent port 528 equalizes the air pressure in the two controlled pressure zones 534/540 and establishes a single composite controlled pressure zone formed by a combination of the vacuum formation-and-release actuator (including the outer seal member 524, the inner seal member 526 and the vent port 528 thereof), the reference surface 506, and the outer side of the object 504. This composite controlled pressure zone establishes a releasable vacuum connection directly between the object 504 and the reference surface 506 in order to detachably mount the object to the reference surface. The composite controlled pressure zone maintains a negative pressure differential relative to an external ambient pressure.

FIG. 41B depicts a modification of the universal vacuum connector 502 that includes a backing portion 510-1 of the base 510. The base backing portion 510-1 may be embodied as any structure that is suitable for forming an airtight seal with the inner seal member 526, such as a flat-surfaced sheet-like member, or otherwise. One side of the base backing portion 510-1 mounts to the base 510. The other side of the base backing portion 510-1 carries the attachment system 550 and mounts to the object 504.

Notwithstanding the equalization of air pressure provided by the vent port 528 between the outer controlled pressure zone 534 and the inner controlled pressure zone 540, the suction force generated by the outer seal member 524 against the reference surface 506 will be significantly larger than the suction force generated by the inner seal member 526 against the object 504 (or the base backing portion 510-1). As in the case of the previously-described anchor members 13, 113, 213, 313 and 413, this is because the area of the outer seal member 524 that lies within its medial rim 536 is substantially larger than the area of the inner seal member 526 that lies within its outer rim 542. As will now be described in connection with FIGS. 41-44, this suction force differential dictates the operational characteristics of the universal vacuum connector 502.

The releasable vacuum connection that mounts the object 504 to the reference surface 506 is releasable by virtue of the relative axial movement capability between the anchor member 513 and the base 510 of the universal vacuum connector 502. When it is desired to detach the object 504 from the reference surface 506, the object can be grasped and maneuvered away from the reference surface. Doing so will cause the base 510 (with or without the backing portion 510-1) to move with the object 504 (relative to the anchor member 513) due to the fixed connection between these components provided by the attachment system 550.

The displacement of the anchor member 513 relative to the object 504 and the base 510 occurs while the anchor member remains affixed to the reference surface 506 due to the strong suction force between the reference surface and the outer seal member 524. The anchor member 513 remains affixed to the reference surface 506 as a result of the negative pressure differential maintained by the composite controlled pressure zone. The outer seal member 524 may deform slightly, but will nonetheless tend to remain attached to the reference surface 506. The suction force provided by the outer seal member 524 acts on the anchor member 513 so as to maintain the central hub 530 thereof in a relatively stable position. At the same time, the object 504 and the base 510 are free to move axially relative to the anchor member 513 along the anchor member's central hub 530. The only appreciable resistance to such relative movement will be the suction force developed by the inner seal member 526 as it is pulled and stretched by the object 504 (or the base backing portion, if present).

The above-described relative movement can be seen by comparing FIGS. 41 and 42. In FIG. 41, the object 504 and the base 510 are positioned close to the reference surface 506. The axial through-bore 532 of the base 510 is situated toward a first end of the anchor member's central hub 530 that is closest to the outer seal member 524. Depending on the exact construction of the universal vacuum connector 502, the faces of the base 510 and the outer seal member 524 that oppose each other may be in contact (or near contact) with each other. Such contact can be seen in FIG. 41. In FIG. 42, the object 504 and the base 510 are positioned away from the reference surface 506. The axial through-bore 532 of the base 510 is situated toward a second end of the anchor member's central hub 530 that is closest to the inner seal member 526. Depending on the exact construction of the universal vacuum connector 502, the faces of the base 510 and the outer seal member 524 that oppose each other may be noticeably spaced from each each other.

As previously noted, during the displacement of the object 504 and the base 510 from the position shown in FIG. 41 to the position shown in FIG. 42, the inner seal member 526 of the anchor member may deform and stretch, but will remain in sealing engagement with the object 504 (or the base backing portion 510-1, if present), so long as pulling force applied to inner seal member does not exceed the maximum suction force capability of the inner seal member. If it does, the inner seal member 526 will separate from the object 504 (or the base backing portion 510-1, if present), causing the inner controlled pressure zone (and the composite controlled pressure zone as whole) to quickly vent. Although not shown, such venting may be facilitated by providing one or more pressure equalization channels between the pocket 512A-1 and the ambient environment outside the universal vacuum connector 502.

This state of affairs is shown in FIG. 43, which depicts the universal vacuum connector 502 just after the object 504 has been pulled away from the reference surface 506 to the point where the inner seal member 526 breaks free from the object (or the base backing portion 510-1, if present). Insofar as this separation causes venting of the inner controlled pressure zone 540, the outer controlled pressure zone 534 will also be vented through the interconnecting vent port 528. As a result, the negative differential pressure previously established in the outer controlled pressure zone 534 is lost, and the suction force between the outer seal member 524 and the reference surface 506 is released.

As shown in FIG. 44, the object 504 will now easily separate from the reference surface 506 without discernible resistance. At the same time, the base 510 and the anchor member 513 will return to the default positions they were in prior to mounting the object 504 to the reference surface 506 (i.e., as shown in FIG. 40). This will result in the inner seal member 526 of the anchor member 513 re-engaging with the object 504 (or the base backing portion 510-1, if present).

The object 504 may be remounted to the reference surface 506 at any time thereafter, or may be mounted to any other reference surface to which it is desired to mount the object. Alternatively, the universal vacuum connector 502 may be detached from the object 504 and used for vacuum-mounting any object that a user wishes to attach to a reference surface.

Turning now to FIGS. 45-50, another universal quick-release vacuum connector 602 is shown. Although this universal vacuum connector embodiment may be used for vacuum mounting any object that a user wishes to attach to a reference surface, it can be specially adapted for use with handheld electronic devices (such as certain smartphones) that have an array of magnets or magnetically-attractive elements for maintaining the device in positional registration with an inductive charger.

The universal vacuum connector 602 consists primarily of a base 610 that carries a vacuum formation-and-release actuator 612/613. The vacuum formation-and-release actuator 612/613 is constructed somewhat differently than the previously-described vacuum formation-and-release actuators 212/213 of FIGS. 27-28, 312/313 of FIGS. 29-30, 412/413 of FIGS. 31-32, and 512/513 of FIGS. 37-38. In particular, as will be described in more detail below, the anchor member 613 includes an outer seal member 624 and a central hub 630, but no inner seal member is required. Although an inner seal member (for establishing an inner controlled pressure zone) can be provided if so desired (see FIG. 59B), the embodiment shown in FIGS. 45-50 uses an alternative construction in which there is only an outer controlled pressure zone 634 (see FIGS. 59-60) that is sealed by way of a closure member 626 on the base 610 that plugs a vent port 628 in the anchor member's central hub 630. FIGS. 46, 47, 49 and 50 depict an embodiment in which the closure member 626 is implemented as an axially-protruding pin. Other embodiments could utilize alternative configurations of the closure member 626, such as a surface that is capable of sealing the vent port 628 without necessarily plugging it. It should also be understood that although the central hub 630 of the anchor member 613 is shown as axially projecting from the central interior portion of the anchor member, it could also be flush therewith so as to be a non-projecting hub. In that case, the central hub 630 would be defined by the portion of the anchor member 613 that immediately surrounds the vent port 628. Apart from the differences noted above, the anchor member 613 may be otherwise similar to the counterpart anchor members 13, 113, 213, 313, 413 and 513 previously described. Such similarities are shown by the use of corresponding reference numbers respectively incremented to lie within the 600-700 numeric range.

As shown in FIGS. 46, 47, 49 and 50, the vacuum formation-and-release actuator 612/613 is configured with an inner side 612A/613A and an outer side 612B/613B. The base 610 of the universal vacuum connector 602 is attachable to an object (such as the handheld electronic device (object 104) shown in FIGS. 53-55, or the handheld device case (object holder 102) shown in FIGS. 56-57), in order to vacuum mount the object to a reference surface.

Figure 50:
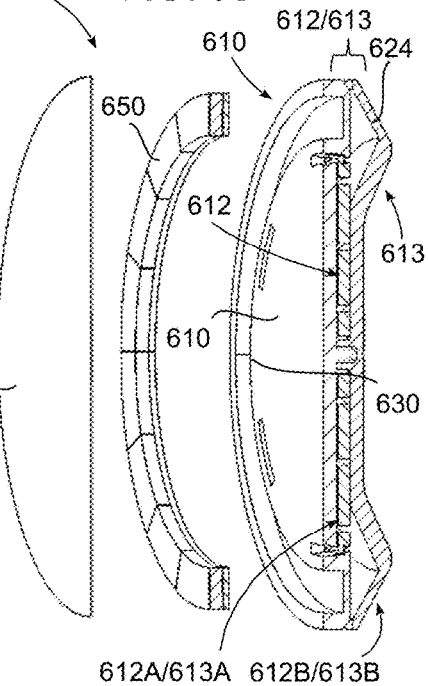
FIG. 50 is a partially exploded, rear perspective centerline cross-sectional view showing the universal quick-release vacuum connector of FIG. 45.

An attachment system 650 may be provided on the base 610 by affixing an attachment device or material on an inner side of the base 610. As best shown in FIG. 50, the attachment system 650 may be provided by a set of one or more magnets or magnetically-attractive materials placed entirely (or partially) around a peripheral region of the base 610. By incorporating the attachment system 650 as part of the base 610 (e.g., as pre-affixed magnets or magnetically-attractive materials), the universal vacuum connector 602 will be self-attachable to any object without the need for separately-provided mounting materials, components or devices. It will be appreciated that alternative self-attachment materials or devices may also provided on base 610, including but not limited to by affixing thereto adhesive materials, hook-and-loop system components, traditional mechanical fasteners made from metal or plastic, such as screws, bolts, rivets and other rigid connectors, etc.

It should be further understood that the illustrated embodiment could be modified so that the base 610 is formed as an integral portion of a handheld device case, such as the device case 602 described above in connection with FIGS. 15-17. In such an embodiment, the base 610 would form part of the device case main body base (object carrier base 110), and the vacuum formation and release actuator 612/613 would be movable relative to the device case. The attachment system 650 of the universal vacuum connector 602 could be provided by the attachment elements of the device case that engage the handheld electronic device 104. As shown in FIGS. 15-17, for the device case 102, such elements would include the object-holding elements 116A-D on the device case's peripheral rim 116 that respectively engage the side edges 118A-D of the handheld electronic device 104 while the inner side 110A of the object carrier base 110 faces (and engages) the handheld device, namely, the outer side 110B thereof that faces the reference surface 106.

Figure 51:
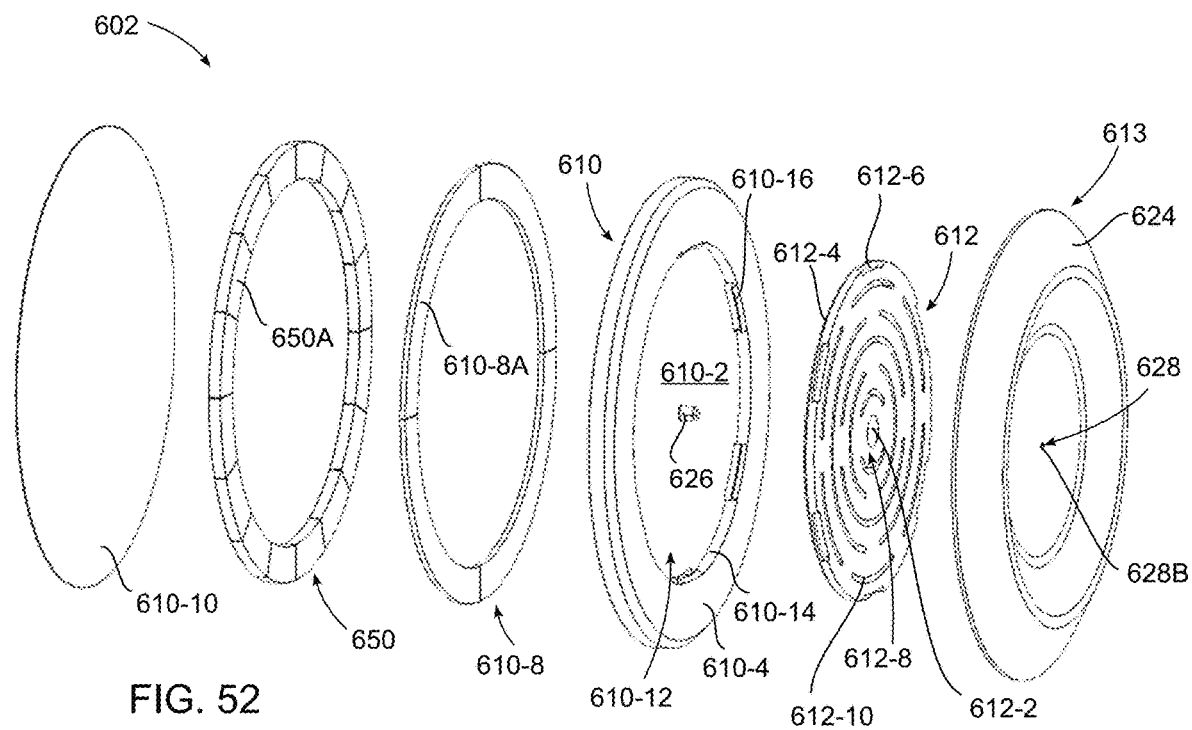
FIG. 51 is a fully exploded, front perspective centerline view showing the universal quick-release vacuum connector of FIG. 45.
Figure 52:
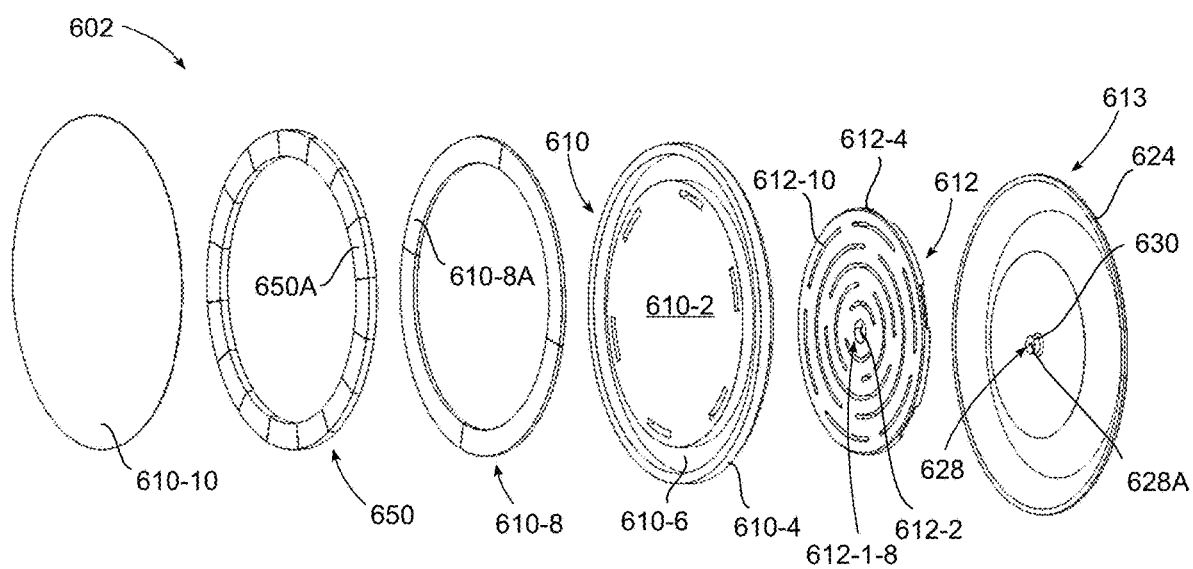
FIG. 52 is a fully exploded, rear perspective centerline view showing the universal quick-release vacuum connector of FIG. 45.

As best shown in FIGS. 51 and 52, the vacuum release actuator 612 and the base 610 of the vacuum release actuator 612 may be embodied as discrete components that are interconnected together. The base 610 may be formed as a circular disk-like structure made from a suitable material such as a rigid or semi-rigid polymer (e.g., ABS plastic). A radially inboard substantially planar portion 610-2 of the base 610 may be surrounded by a radially outboard ring portion 610-4. The inboard planar portion 610-2 may be substantially planar except for the vent port closure member 626, which may be located at the center of the inboard planar portion. As shown in FIG. 52, the outboard ring portion 610-4 may be shaped to form an annular channel 610-6 of circular shape.

The annular channel 610-6 is used to mount the attachment system 650. In the illustrated embodiment, the attachment system 650 may be provided by set of arc-shaped magnets 650A, such as neodymium arc magnets, that are arranged to collectively form a circular magnet array. The magnets 650A are disposed in the annular channel 610-6, and may be held in place by a metal magnet mount 610-8. The metal magnet mount 610-8 may be formed by a set of flat arc-shaped (e.g. quarter-circle) metal (e.g., steel) members 610-8A. Alternatively, the metal magnet mount 610-8 it may be formed as an integral ring member. In either case, the metal magnet mount 610-8 may be secured in any suitable manner to the annular channel 610-6 (such as by way of adhesive bonding). The metal magnet mount 610-8 may then secure the magnets 650A to the annular channel 610-6 by way of magnetic attraction. The magnets 650A may be relatively thin in the axial direction, such that when mounted in the annular channel 610-6, the magnets do not protrude axially outside of the annular channel. When the magnets 650A are so mounted, the exposed side thereof may be covered by a thin circular disk-shaped pad element 610-10 made of a suitable resilient material, such as rubberized tape. The pad element 610-10 may cover the entire inner side of the base 610.

The vacuum release actuator 612 may be formed as a circular disk-like structure whose center is formed with an aperture 612-2 that is sized to receive the central hub 630 of the anchor member 613 when the vacuum release actuator and the anchor member are mounted together. This is shown in FIGS. 46, 47,49 and 50. As can be seen in FIG. 51, the periphery of 612-4 of the vacuum release actuator 612 may be formed with a set of notches 612-6. Several of the notches 612-6 (six are shown) may be provided, and arranged at different angular locations around the periphery 612-4 of the vacuum release actuator 612. As can be seen by comparing FIG. 51 to FIG. 52, the notches 612-6 are formed on the outer side of the vacuum release actuator 612 (i.e., the side shown in FIG. 51) but do not extend axially to the inner side thereof (i.e., the side shown in FIG. 52). The notches 612-6 extend only partially (e.g., 50%) through the thickness of the vacuum release actuator 612, such that each notch is open on the actuator's outer side but has an axially-recessed rear or bottom wall. Each notch 612-6 may have a relatively short circumferential extent, and may have an even shorter inward radial extent.

The vacuum release actuator 612 sized to nest within a circular mounting well 610-12 formed in the base 610. The mounting well 610-12 is formed by axially offsetting the interior planar portion 610-2 of the base 610 from the outboard ring portion 610-4. As shown in FIG. 51, this results in the formation of a mounting well sidewall 610-14. To secure the vacuum release actuator 612 in the mounting well 610-12, the mounting well sidewall 610-14 may be formed with a set of radially inwardly extending lock tabs 610-16 at circumferential locations that correspond to the notches 612-6 of the vacuum release actuator 612. The lock tabs 610-16 do not occupy the full height of the mounting well sidewall 610-14. Rather, the lock tabs 610-16 are formed at the top of the mounting well sidewall 610-14 and have a thickness that extends only partially (e.g., 50%) down the sidewall. This results in an undercut being formed below each lock tab 610-16. The undercut below each lock tab 610-16 is sized to accommodate one of the notches 612-6 of the vacuum release actuator 612. In the illustrated embodiment, the vacuum release actuator 612 may be formed of a material such as ABS or polypropylene plastic. Such material is flexible enough so that the vacuum release actuator 612 can be secured into the mounting well 610-12 of the base 610 by aligning the notches 612-4 with the lock tabs 610-16 and pressing until the notches snap into place below the lock tabs. In this position, the periphery 612-4 of the vacuum release actuator 612 may engage the mounting well sidewall 610-14 so as to provide stable support for the vacuum release actuator in mounted engagement with the base 610.

When the vacuum release actuator 612 is secured to the base 610 in the manner described above, the periphery 612-4 of the vacuum release actuator becomes axially (and radially) fixed in place. In contrast, the central interior 612-8 of the vacuum release actuator 612 is not axially fixed, and is capable of out-of-plane flexing (axial displacement) relative to its periphery 612-4. An example of such flexing is shown in FIG. 60, and is described in more detail below. One way that the vacuum release actuator 612 may implement out-of-plane flexing capability is by forming it with a series of arc-shaped slot apertures 612-10. As can be seen in FIGS. 51-52, the arc-shaped slot apertures 612-10 may be formed in radially spaced sets, with each set having one or more slot apertures, depending on the radial location of the set. For example, in the illustrated embodiment, the movable actuator 612 has five radially spaced sets of slot apertures 612-10. The three innermost sets each have 2 slot apertures 612-10, the fourth set has four slot apertures, and the fifth outermost set has six slot apertures. Other slot configurations may also be used. Alternatively, the vacuum release actuator 612 could utilize other types of apertures to improve its out-of-plane flexibility. Alternatively, out-of-plane flexibility could be provided without the use of slots or other apertures, such as by forming the vacuum release actuator 612, or at least the central interior 612-8 thereof, from a suitably thin and flexible material, such as flexible polymer or a non-magnetically attractive metal.

Figure 46:
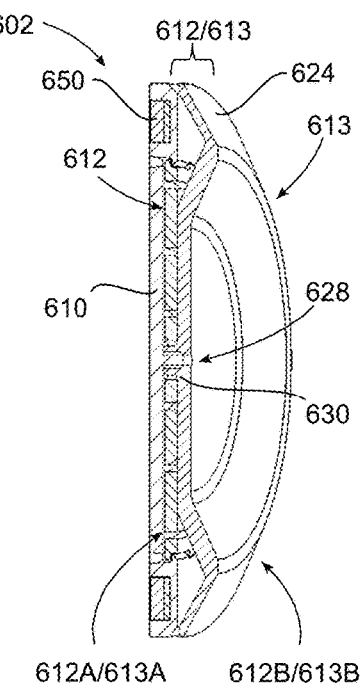
FIG. 46 is a front perspective cross-sectional centerline view showing the universal quick-release vacuum connector of FIG. 45.
Figure 47:
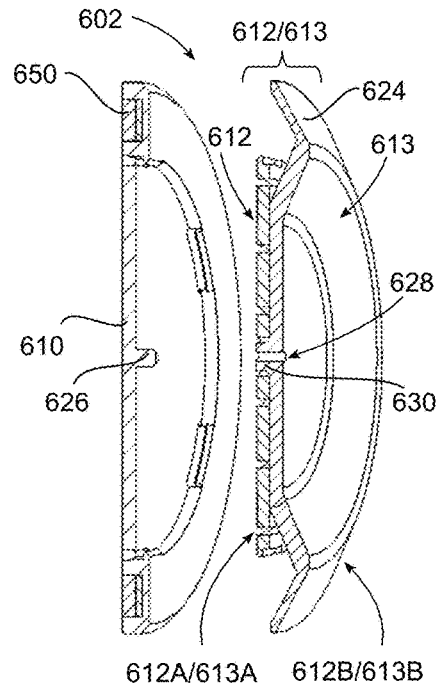
FIG. 47 is a partially exploded, front perspective cross-sectional centerline view showing the universal quick-release vacuum connector of FIG. 45.
Figure 48:
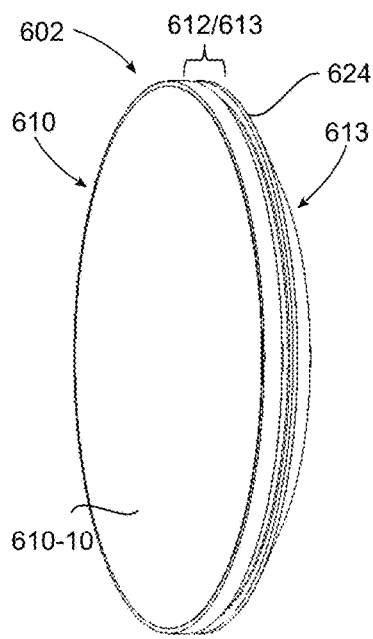
FIG. 48 is a rear perspective view showing the universal quick-release vacuum connector of FIG. 45.
Figure 49:
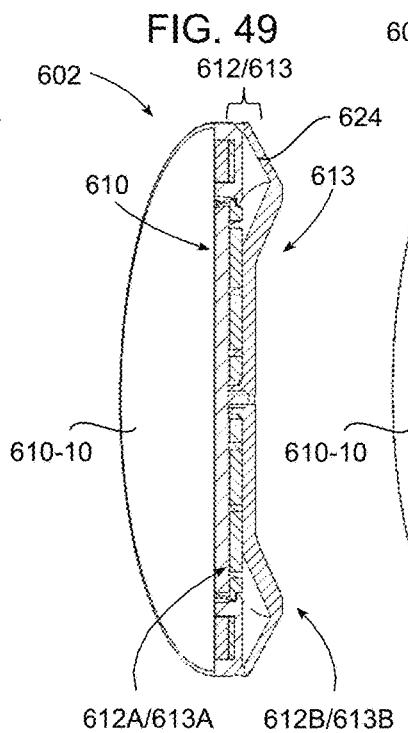
FIG. 49 is a rear perspective cross-sectional centerline view showing the universal quick-release vacuum connector of FIG. 45.

The anchor member 613 may be fixedly mounted to the vacuum release actuator 612, such as by way of adhesive bonding. In this way, when the central interior 612-8 of the vacuum release actuator 612 flexes in an out-of-plane manner, so too does a corresponding central interior portion of the anchor member 613 that includes the hub 630 and the vent port 628. As can be seen in FIG. 47, when the anchor member 613 is mounted to the vacuum release actuator 612, the anchor member's central hub 630 will extend through the central opening 610 located at the center of the vacuum release actuator's central interior 612-8. Alternatively, if the central hub 630 is flush with the central interior portion of the anchor member 613, so as to have no projection therefrom, it will not extend through the central opening 610. As can be seen in FIGS. 46, 49 and 50, when the vacuum release actuator 612 carrying the anchor member 613 is attached to the base 610, the vent port closure member 626 of the base will insert into the vent port 628 of the anchor member. Due to the out-of-plane flexibility of the vacuum release actuator 612, the anchor member 613 mounted thereto is linearly movable relative to the base 610 in the axial direction. Such linear movement capability allows the vent port 628 to separate from the vent port closure member 626 during use of the universal vacuum connector 502, as described in more detail below in connection with FIG. 60.

Figure 53:
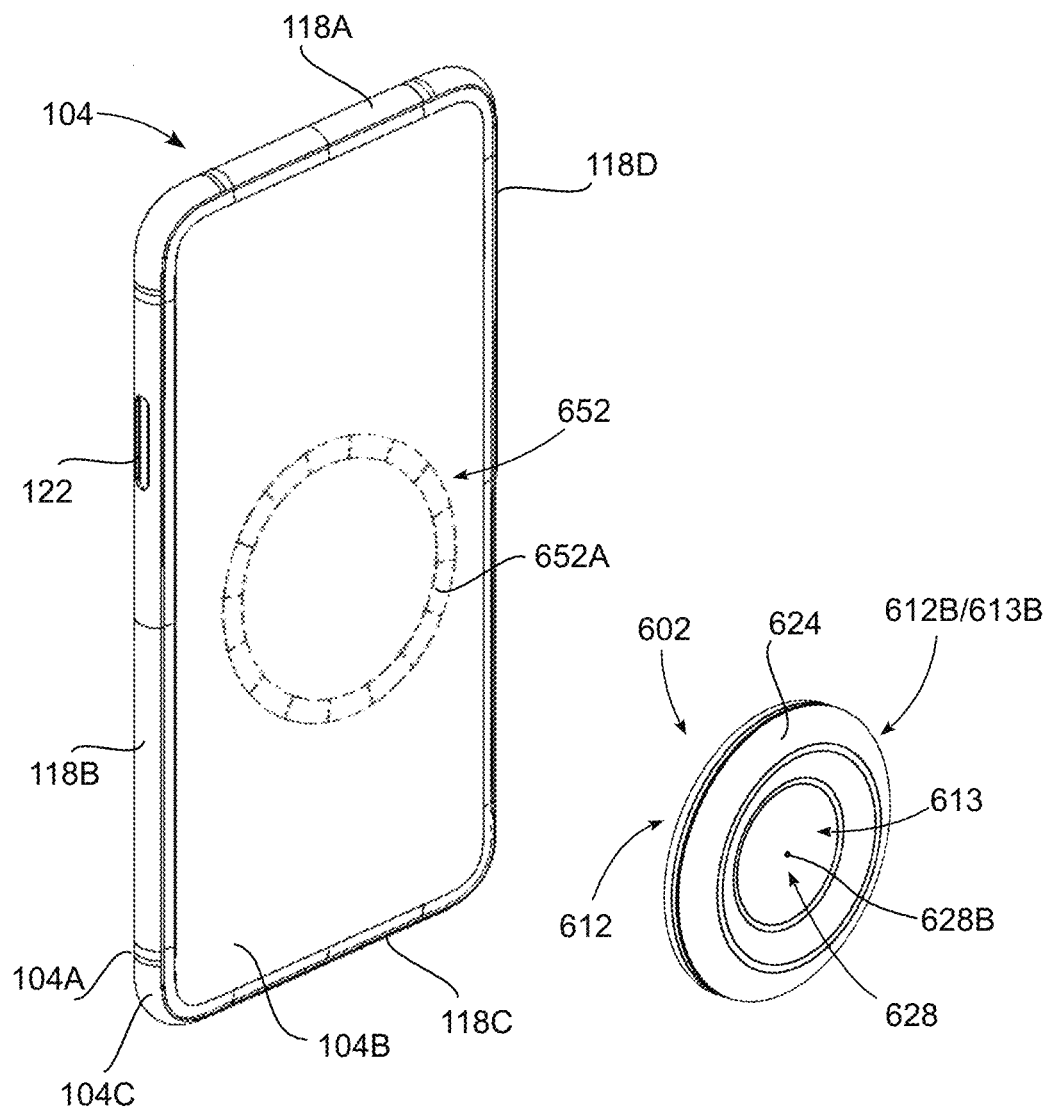
FIG. 53 is an exploded rear perspective view an example embodiment of the universal vacuum connector of FIG. 45 arranged for detachable mounting to an object in order to vacuum mount the object to a reference surface.
Figure 54:
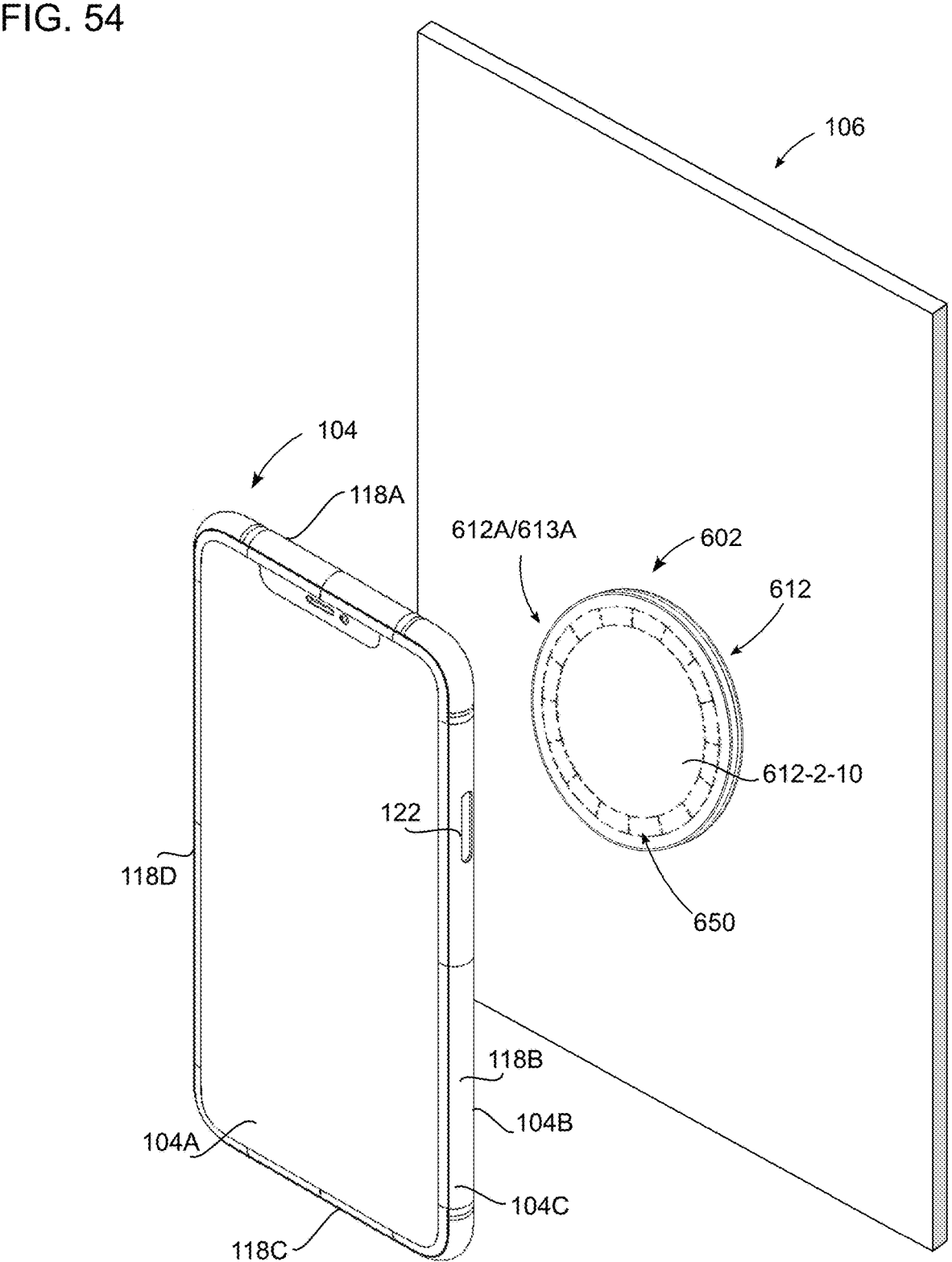
FIG. 54 is an exploded front perspective view showing the universal vacuum connector of FIG. 45 arranged for detachable mounting to an object.
Figure 55:
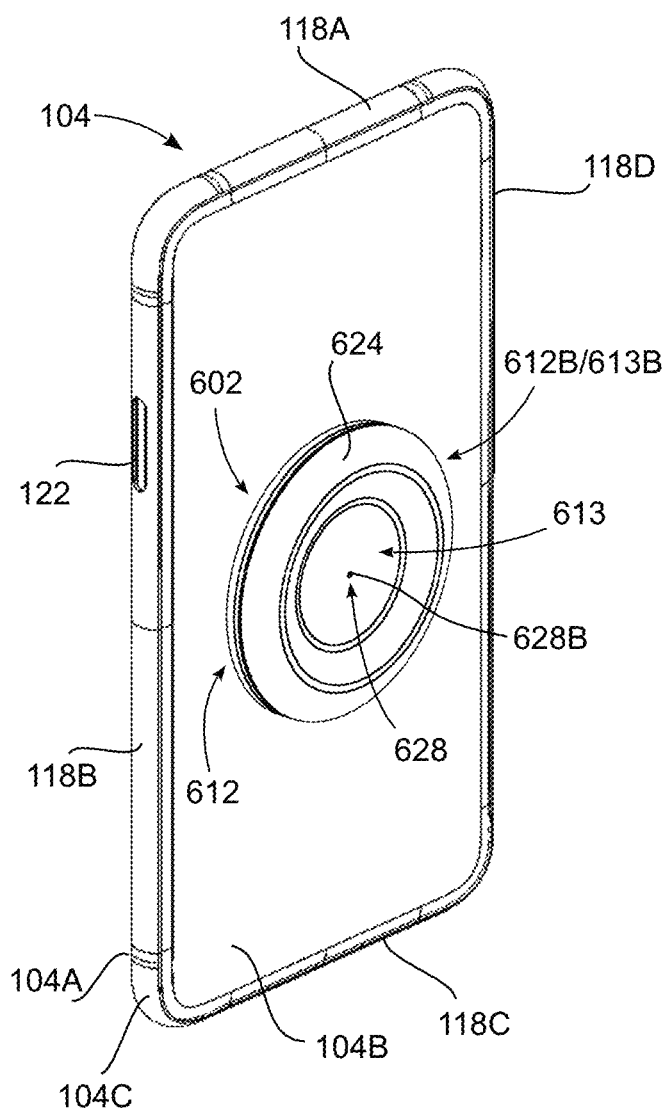
FIG. 55 is a rear perspective view showing the universal vacuum connector of FIG. 45 detachably mounted to an object.
Figure 56:
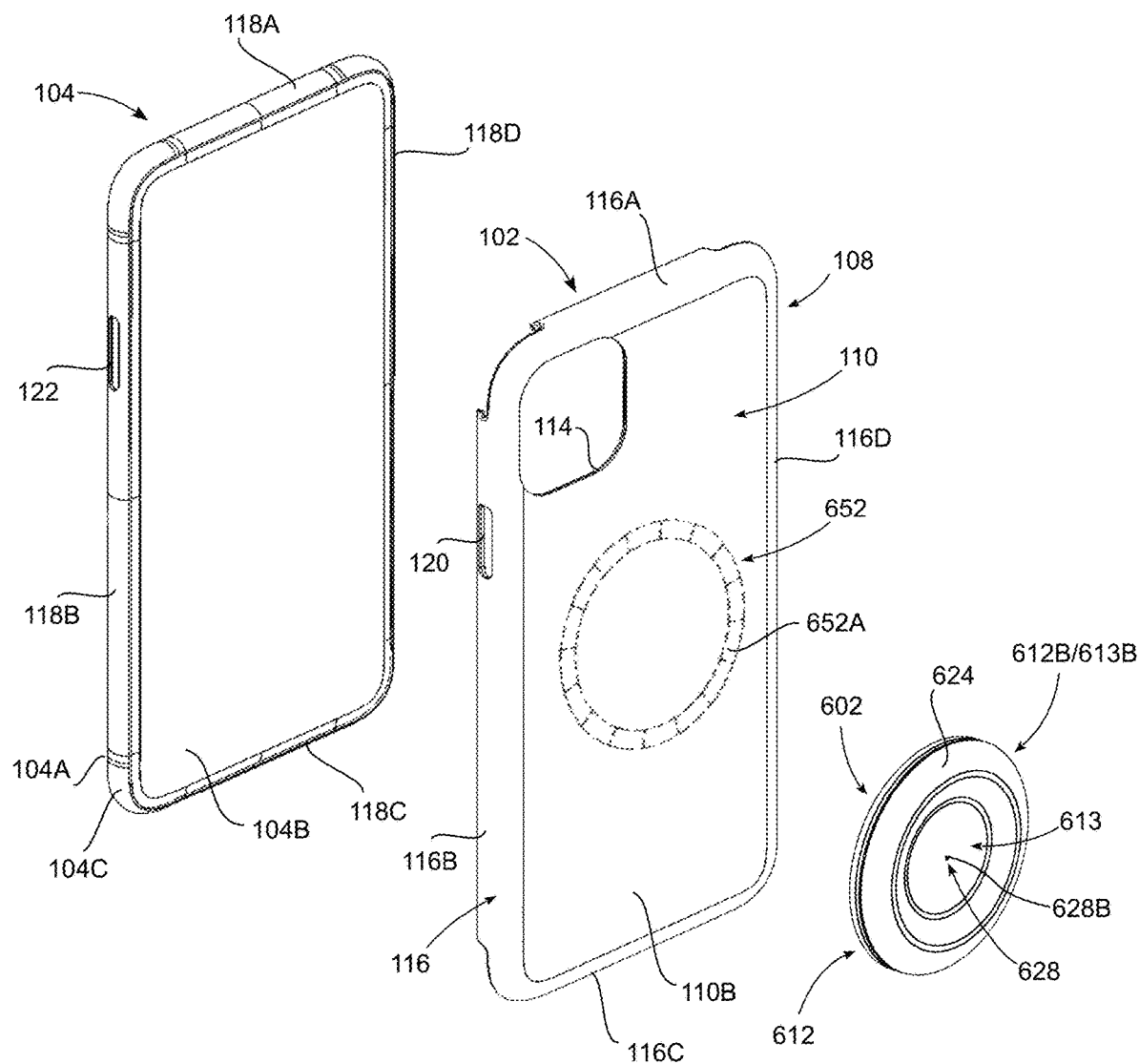
FIG. 56 is an exploded rear perspective view an example embodiment of the universal vacuum connector of FIG. 45 arranged for detachable mounting to a case for an object in order to vacuum mount the object to a reference surface.
Figure 57:
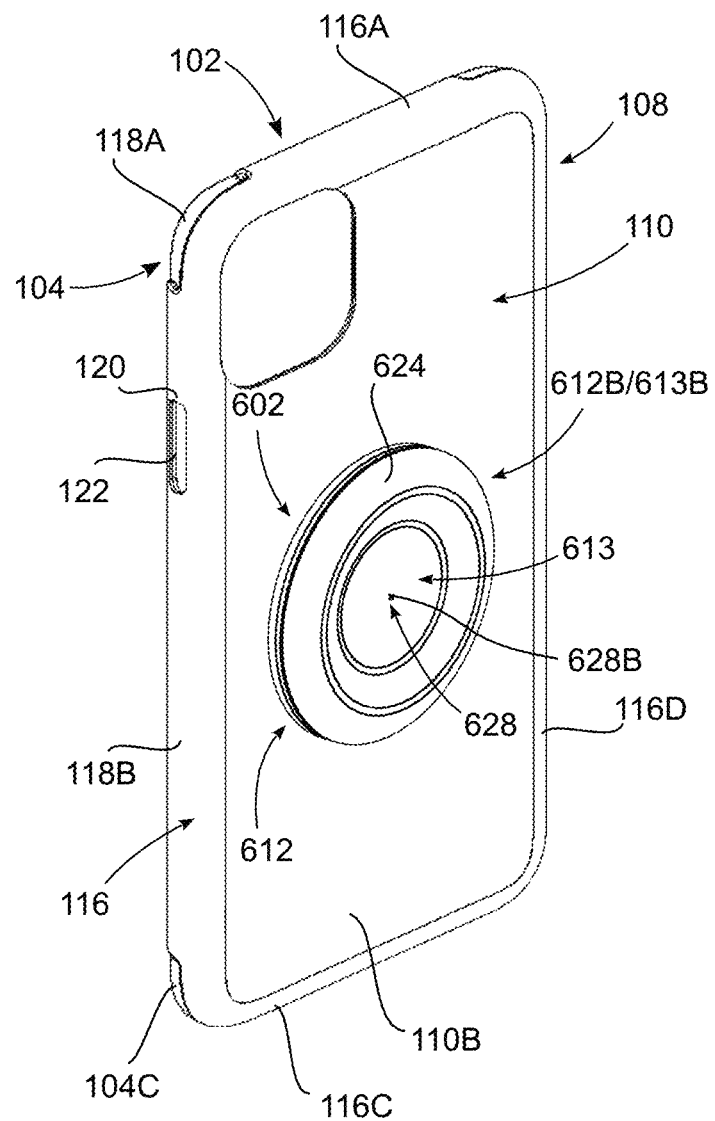
FIG. 57 is a rear perspective view showing the universal vacuum connector of FIG. 45 detachably mounted to an object case that holds an object in order to vacuum mount the object to a reference surface.

The universal vacuum connector 602 can be used to mount any object to any reference surface. FIGS. 53-55 depict a use case wherein the universal vacuum connector 602 is directly connectable to the handheld electronic device 104 (e.g., smartphone) of previous embodiments in order to mount the handheld device to the previously-discussed reference 106. FIGS. 56-57 depict a use case wherein the universal vacuum connector 602 is directly connectable to the handheld device case 102 (e.g., smartphone case) of previous embodiments in order to provide a handheld electronic device case with quick-release anchoring capability that can be used to mount the previously-discussed handheld electronic device 104 when it is carried by the device case.

In the embodiment of FIGS. 53-55, the handheld device 104 is a smartphone configured with a magnetic attachment array 652 constructed as a circular arrangement of magnets or magnetically-attractive elements 652A for maintaining the device in positional registration with an inductive charger. Insofar as the attachment array 652 will typically be situated inside the handheld device 104, the array is depicted by way of hidden line representation in FIG. 53. The magnets 650A of the universal vacuum connector's attachment system 650 are arranged to oppose and magnetically interact with the handheld device's magnetic attachment array 652. In the illustrated embodiment, the shape, size, number and array configuration of the universal vacuum connector's magnets 650A may be selected to match the shape, size, number and array configuration of the handheld electronic device's magnets or magnetically-attractive elements 652A. In this way, each individual magnet 650A will magnetically couple with a corresponding individual magnet or magnetically-attractive element 652A. All that is required in order to render the handheld electronic device 104 vacuum-mountable is to secure the universal vacuum connector 502 to the device's rear major surface 104B. This may be accomplished by bringing the inner side of the universal vacuum connector 502 (i.e., the side that exposes the pad element 610-10) into close proximity with the handheld electronic device's magnetic attachment array 652. Magnetic attraction will then result in the universal vacuum connector 602 becoming removably affixed to the handheld electronic device 104. The resultant combination is shown in FIG. 55.

In the embodiment of FIGS. 56-57, the universal vacuum connector 602 can be attached to the handheld device case 102 in a similar manner. In this case, the handheld device case may be constructed to incorporate the magnetic attachment array 652, such as on the inner (or outer) surface of the device case's outer side 110B. The universal vacuum connector 602 may then be magnetically attached to the handheld device case 102 so as to configure the handheld electronic device case 102 as a handheld device case with quick-release anchoring capability. As shown in FIG. 57, the configured handheld device case 102 may then be used as a case for the handheld electronic device 104.

As an alternative to the embodiment shown in FIGS. 56-57, the universal vacuum connector 602 could be attached to the handheld device case 102 without the use of magnets. According to this embodiment, the handheld device case 102 would not require the magnetic attachment array 652, and the universal vacuum connector 602 would not require an attachment system 650 that uses magnets. Instead, the attachment system 650 could utilize other attachment schemes, such as adhesive bonding, hook-and-loop system components, traditional mechanical fasteners made from metal or plastic, such as screws, bolts, rivets and other rigid connectors, etc. As previously discussed, a portion of the universal vacuum connector 602, such as the base 610, could also be integrally formed with the handheld device case 102, such as on the object carrier base 110 thereof.

Figure 58:
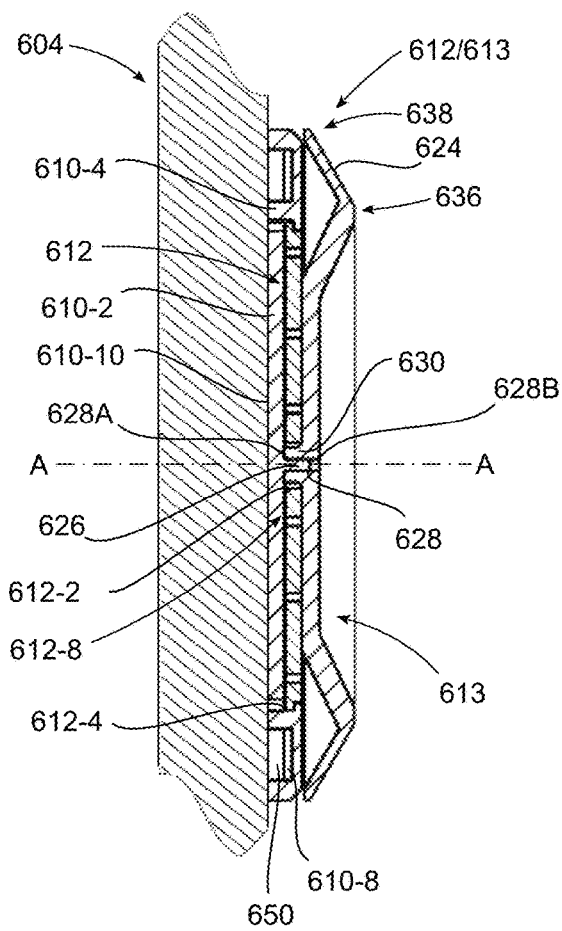
FIG. 58 is an enlarged vertical cross-sectional centerline view depicting the universal vacuum connector of FIG. 45 detachably mounted to an object and ready to be vacuum-mounted to a reference surface.

FIG. 58 depicts depicts the universal vacuum connector 602 after it has been mounted to an object 604 (e.g., a handheld electronic device, a handheld device case, or any other type of object). It will be seen that the attachment system 650 is engaged with the object 604, the vacuum release actuator 612 is non-flexed, and the vent port closure member 626 is inserted into the vent port 628.

FIG. 59 depicts the universal vacuum connector 502 during use thereof to mount the object 604 to a reference surface 606. The outer seal member 624 of the anchor member 613 is arranged to engage the reference surface 606 and form a substantially airtight seal therewith that defines an outer controlled pressure zone 634. In this position, the outer seal member 624 is in a deformed somewhat flattened state. The final mounted position of the universal vacuum connector 602 may thus place the reference surface 606 closer to the hub 630 of the anchor member 613.

The outer controlled pressure zone 634 represents the enclosed air-space region located between the outer seal member 624 and the reference surface 606. In the illustrated embodiment, the outer seal member 624 is shown as being cup-shaped, which allows the outer seal member to function as suction cup or a suction seal stabilizer, depending on the stiffness of the material and the axial force required to adhere it to the reference surface 606. In alternate embodiments, the outer seal member 636 might not be cup-shaped, and could be substantially flat, even when the object 602 is in an unmounted state.

As can be seen in FIG. 59, the periphery of the outer controlled pressure zone 634 is defined by a circular ring of contact where an axially protruding medial rim 636 of the outer seal member 624 makes suction contact with the reference surface 606. As in the case of previously-described anchor member embodiments, the medial rim 636 may be situated radially inboard from a circumferential outer edge 638 of the outer seal member 624. The outer edge 638 is axially offset from medial rim 636 so as to form an axially inverted radial outer cup configured so that the outer edge lies against, or in close proximity to, the outer surface of the vacuum release actuator 612.

Again, one practical advantage of forming the outer seal member 624 in this manner is to facilitate insertion of the object 604 into the pocket of a user. If the outer seal member 624 stopped at the medial rim 636, which is axially spaced from the outer surface of the vacuum release actuator 612, the rim could catch on the user's clothing. Notwithstanding this advantage, the outer seal member 624 may be formed without the outer radial section that extends from the medial rim 636 to the outer edge 638, such that the medial rim becomes the outer edge. This alternative construction is shown in FIG. 59A.

As can be seen in FIGS. 51 and 52, the vent port 628 has an inner end 628A (FIG. 52) and an outer end 628B (FIG. 51). As can be seen in FIG. 59, the outer end 628B is in fluid communication with the outer controlled pressure zone 634 and the inner end 628A is plugged by the vent port closure member 626. When the outer seal member 624 is in suction contact with the reference surface 606, and the vent port 628 is blocked by the vent port closure member 626, the outer controlled pressure zone 634 establishes a releasable vacuum connection directly between the base 610 and the reference surface 606 in order to detachably mount the object 604 to the reference surface. The outer controlled pressure zone 634 maintains a negative pressure differential relative to an external ambient pressure.

FIG. 59B depicts a modification of the universal vacuum connector 602 in which the anchor member 613 includes an inner seal 626A that seals against the interior planar portion 610-2 of the base 610 in order to seal the vent port 628. In this embodiment, the vent port outer end 628B is in fluid communication with the outer controlled pressure zone 634 and the vent port inner end 628A is in fluid communication with an inner controlled pressure zone 640. When the outer seal member 624 is in suction contact with the reference surface 606, and the inner seal member 626A is in suction contact with the interior planar portion 610-2 of the base 610, the interconnecting vent port 628 provides an air pathway between the outer controlled pressure zone 634 and the inner controlled pressure zone 640, and thereby facilitates fluid communication between the inner and outer controlled pressure zones. The vent port 628 equalizes the air pressure in the two controlled pressure zones 634/640 and establishes a single composite controlled pressure zone formed by a combination of the anchor member 613 (including the outer seal member 624, the inner seal member 626A and the vent port 628), the reference surface 606, and the interior planar portion 610-2 of the base 610. This composite controlled pressure zone establishes a releasable vacuum connection directly between the base 610 and the reference surface 606 in order to detachably mount the object 604 to the reference surface. The composite controlled pressure zone maintains a negative pressure differential relative to an external ambient pressure.

With continuing reference to FIG. 59B, notwithstanding the equalization of air pressure provided by the vent port 628 between the outer controlled pressure zone 634 and the inner controlled pressure zone 640, the suction force generated by the outer seal member 624 against the reference surface 606 will be significantly larger than the suction force generated by the inner seal member 626A against the interior interior planar portion 610-2 of the base 610. As in the case of the previously-described anchor members 13, 113, 213, 313, 413 and 513, this is because the area of the outer seal member 624 that lies within its medial rim 636 is substantially larger than the area of the inner seal member 626A that lies within its outer rim 642. This suction force differential dictates the operational characteristics of the universal vacuum connector 602.

Turning now to FIG. 60, the releasable vacuum connection that mounts the object 604 to the reference surface 606 is releasable by virtue of the relative axial movement capability between the vacuum release actuator 612 and the anchor member 613, moving as a unit, and the base 610. When it is desired to detach the object 604 from the reference surface 606, the object can be grasped and maneuvered away from the reference surface. Doing so will cause the base 610 to move with the object 604 (relative to the anchor member 613 and the central interior 612-8 of the vacuum release actuator 612) due to the fixed interconnection between the object and the base provided by the attachment system 650. The periphery 612-4 of the vacuum release actuator 612 will likewise move with the base 610 by virtue of the fixed interconnection between these components provided by the notches 612-6 of the movable actuator and the lock tabs 610-16 of the base (as previously described in connection with FIGS. 51-52).

The displacement of the anchor member 613 and the central interior 612-8 of the vacuum release actuator 612 relative to the object 604, the base 610, and the periphery 612-4 of the vacuum release actuator occurs while the anchor member remains affixed to the reference surface 606 due to the strong suction force between the reference surface and the outer seal member 624. So long as the vent port blocking member 626 of the base 610 remains inserted in the vent port 628 of the anchor member 613, the anchor member will remain affixed to the reference surface 606 as a result of the negative pressure differential maintained by the outer controlled pressure zone 634. The outer seal member 624 may deform slightly, but will nonetheless tend to remain attached to the reference surface 606. The suction force provided by the outer seal member 624 acts on the anchor member 613 so as to maintain the central hub 630 thereof in a relatively stable position. At the same time, the object 604, the base 610 and the periphery 612-4 of the vacuum release actuator 612 are free to move axially (along the axis A-A) relative to the anchor member 613 and the central interior 612-8 of the vacuum release actuator 612. The only appreciable resistance to such relative movement will be the suction force developed by the vent port blocking member 626 as it is pulled out of the vent port 628, together with such force as may be required to flex the vacuum release actuator 612 from the default position shown in FIG. 59 to the flexed position shown in FIG. 60 as the outer seal member 624 maintains suction force on the reference surface 606.

The above-described relative movement can be seen by comparing FIGS. 59 and 60. In FIG. 59, the object 604, the base 610, and the periphery 612-4 of the vacuum release actuator 612 are positioned close to the reference surface 606. The vent port blocking member 626 of the base 610 is inserted into the vent port 628 so as to block and seal the vent port. In FIG. 60, the object 604, the base 510, and the periphery 612-4 of the vacuum release actuator 612 are positioned away from the reference surface 606. The vent port blocking member 626 of the base 610 has been displaced axially to the extent that it is no longer inserted into the vent port 628, such that the vent port has become unsealed. This unplugging of the vent port 628 causes the outer controlled pressure zone 634 to quickly vent, allowing the object to be removed from the reference surface.

This state of affairs is shown in FIG. 61, which depicts the universal vacuum connector 602 just after the object 604 has been pulled away from the reference surface 606. Insofar as the vent port 628 has become vented, the outer controlled pressure zone 634 will also be vented through the vent port 628. As a result, the negative differential pressure previously established in the outer controlled pressure zone 634 is no longer present, and the suction force between the outer seal member 624 and the reference surface 606 has been released.

As shown in FIG. 61, the object 604 will now easily separate from the reference surface 606 without discernible resistance. At the same time, the base 610, the vacuum release actuator 612, and the anchor member 613 will return to the default positions they were in prior to mounting the object 604 to the reference surface 606 (i.e., as shown in FIG. 58). This will result in the vent port blocking member 626 re-inserting into the vent port 628.

The object 604 may be remounted to the reference surface 606 at any time thereafter, or may be mounted to any other reference surface to which it is desired to mount the object. Alternatively, the universal vacuum connector 602 may be detached from the object 604 and used for vacuum-mounting any object that a user wishes to attach to a reference surface.

Accordingly, a universal quick-release vacuum connector has been disclosed, together with a combination including the universal vacuum connector and an object to be vacuum-mounted, and a related method of use. Reference in the present disclosure to an "embodiment" means that a particular feature, structure or characteristic described in connection with the embodiment may be included in at least one embodiment of the disclosed device. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples have been given throughout this description. These examples are merely descriptions of specific embodiments of the invention. The scope of the claimed subject matter is not limited to the examples given.

As used herein, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

Although example embodiments have been shown and described, it should be apparent that many variations and alternate embodiments could be implemented in accordance with the present disclosure. It is understood, therefore, that the invention is not to be limited except in accordance with the appended claims and equivalents thereof.

What is claimed is:

1. A universal quick-release vacuum connector, comprising:
   a base attachable to an object;
   a vacuum formation-and-release actuator operable to establish a releasable vacuum connection between the object and a surface;
   the vacuum formation-and-release actuator comprising an anchor member arranged for movement relative to the base;
   the base comprising an attachment system operable to attach the universal vacuum connector to the object, the attachment system being selected from the group consisting of (1) adhesives, (2) magnets or magnetically attractive materials, (3) hook-and-loop system components, (4) mechanical fastening, and (5) elements of a protective case for the object that engage plural independent side edges of the object such that the protective case engages at least one major face of the object;
   the anchor member comprising a first seal member, a central hub integrally formed with the first seal member, and a vent port extending through the central hub from a first end to a second end thereof;
   a vent port closure member arranged to close or assist in closing the vent port first end depending on the position of the anchor member relative to the base;
   the releasable vacuum connection being provided by a controlled pressure zone formed by a combination that includes the vent port closure member, the vent port, the first seal member, and the surface;
   the controlled pressure zone maintaining a negative pressure differential relative to an external ambient pressure when the vent port first end is closed; and
   the releasable vacuum connection being releasable by virtue of the anchor member and the base being movable relative to each other in a manner that vents the controlled pressure zone while the base remains attached to the object.

2. The universal quick-release vacuum connector of claim 1, wherein the base comprises a substantially planar structure configured to face a substantially planar side of the object that faces the surface during use of the vacuum connector.

3. The universal quick-release vacuum connector of claim 1, wherein the attachment system comprises adhesive.

4. The universal quick-release vacuum connector of claim 1, wherein the attachment system comprises magnets or magnetically attractive materials.

5. The universal quick-release vacuum connector of claim 1, wherein the attachment system comprises a circular array of magnets or magnetically attractive materials arranged to engage a circular array of magnets or magnetically attractive materials on the object or on a case for the object.

6. The universal quick-release vacuum connector of claim 5, wherein the object comprises a handheld electronic device and the circular array of magnets or magnetically attractive materials on the object are for maintaining the device in positional registration with an inductive charger.

7. The universal quick-release vacuum connector of claim 1, wherein the anchor member is indirectly connected to the base by a vacuum release actuator.

8. The universal quick-release vacuum connector of claim 7, wherein the vacuum release actuator and the base are integrally formed with each other.

9. The universal quick-release vacuum connector of claim 7, wherein the vacuum release actuator and the base comprise discrete components that are mechanically interconnected to each other.

10. The universal quick-release vacuum connector of claim 9, wherein the vacuum release actuator comprises a peripheral portion that is rigidly coupled to the base, and a central portion that carries the anchor member and is flexibly deformable away from the base.

11. The universal quick-release vacuum connector of claim 10, wherein the central portion of the vacuum release actuator is formed with plural apertures that aid its flexibility away from the base.

12. The universal quick-release vacuum connector of claim 1, wherein the anchor member is directly connected to the base.

13. The universal quick-release vacuum connector of claim 12, wherein the anchor member is slidably coupled to the base for linear movement away from the base.

14. The universal quick-release vacuum connector of claim 13, wherein the anchor member hub is slidably disposed in a bore formed in the base.

15. The universal quick-release vacuum connector of claim 1, wherein the first seal member defines a first portion of the controlled pressure zone, the first portion of the controlled pressure zone including a region located between the first seal member and the surface.

16. The universal quick-release vacuum connector of claim 1, wherein the vent port closure member comprises a flexible second seal member on the anchor member hub that surrounds the vent port first end, the second seal member being arranged to engage the object or a backing portion of the base and form a substantially airtight seal therewith that defines a second portion of the controlled pressure zone, the second portion of the controlled pressure zone comprising a region located between the second seal member and the object or the backing portion of the base.

17. The universal quick-release vacuum connector of claim 1, wherein the vent port closure member comprises a region or structure of the base that engages and blocks the vent port first end.

18. The universal quick-release vacuum connector of claim 1, wherein the vent port closure member comprises a plug on the base that inserts into the vent port first end.

19. A combination universal quick-release vacuum connector and an object to be vacuum mounted to a reference surface, comprising:

an object to be vacuum mounted to a reference surface;
base removably attached to the object that is to be vacuum-mounted to the reference surface;
a vacuum formation-and-release actuator operable to establish a releasable vacuum connection between the object and the reference surface;
the vacuum formation-and-release actuator comprising an anchor member arranged for movement relative to the base;
the base comprising an attachment system operable to removably attach the universal vacuum connector to the object, the attachment system being selected from the group consisting of (1) adhesives, (2) magnets or magnetically attractive materials, (3) hook-and-loop system components, (4) mechanical fasteners, and (5) elements of a protective case for the object that engage plural independent side edges of the object such that the protective case engages at least one major face of the object;
the anchor member comprising a flexible outer seal member, a central hub integrally formed with the flexible outer seal member, and a vent port extending through the central hub from inner end to an outer end thereof;
an inner closure member arranged to close or assist in closing the vent port inner end depending on the position of the anchor member relative to the base;
the releasable vacuum connection being provided by a controlled pressure zone formed by a combination that includes the inner closure member, the vent port, the outer seal member, and the reference surface;
the controlled pressure zone maintaining a negative pressure differential relative to an external ambient pressure when the vent port inner end is closed; and
the releasable vacuum connection being releasable by virtue of the anchor member and the base being movable relative to each other in a manner that vents the controlled pressure zone while the base remains attached to the object.

20. A method for vacuum-mounting an object to a reference surface, comprising:
attaching an object to be vacuum-mounted to a reference surface to a universal quick-release vacuum connector;
the vacuum formation-and-release actuator comprising:
a base removably attachable to the object that is to be vacuum-mounted to a reference surface;
a vacuum formation-and-release actuator operable to establish a releasable vacuum connection between the object and the reference surface;
the vacuum formation-and-release actuator comprising an anchor member arranged for movement relative to the base;
the base comprising an attachment system operable to removably attach the universal vacuum connector to the object, the attachment system being selected from the group consisting of (1) adhesives, (2) magnets or magnetically attractive materials, (3) hook-and-loop system components, (4) mechanical fasteners, and (5) elements of a protective case for the object that engage plural independent side edges of the object such that the protective case engages at least one major face of the object;
the anchor member comprising a flexible outer seal member, a central hub integrally formed with the flexible outer seal member, and a vent port extending through the central hub from inner end to an outer end thereof;
an inner closure member arranged to close or assist in closing the vent port inner end depending on the position of the anchor member relative to the base;
the releasable vacuum connection being provided by a controlled pressure zone formed by a combination that includes the inner closure member, the vent port, the outer seal member, and the reference surface;
the controlled pressure zone maintaining a negative pressure differential relative to an external ambient pressure when the vent port inner end is closed; and
the releasable vacuum connection being releasable by virtue of the anchor member and the base being movable relative to each other in a manner that vents the controlled pressure zone while the base remains attached to the object;
the method comprising:
vacuum-mounting the object to the reference surface by maneuvering the object so that outer seal member engages the reference surface, pressing the object against the reference surface, and releasing the object to establish the negative pressure differential in the controlled pressure zone that attaches the object to the reference surface; and
thereafter detaching the object from the reference surface by pulling the object away from the reference surface with the object remaining immovably engaged with the base but with the outer seal member remaining engaged with the reference surface, until the vent port closure member separates unseals the vent port and thereby vents the controlled pressure zone to release the outer seal member from the reference surface.

* * * * *